(12) United States Patent
Graham et al.

(10) Patent No.: US 12,118,201 B2
(45) Date of Patent: Oct. 15, 2024

(54) DEVICES, METHODS, AND GRAPHICAL USER INTERFACES FOR A UNIFIED ANNOTATION LAYER FOR ANNOTATING CONTENT DISPLAYED ON A DEVICE

(71) Applicant: Apple Inc., Cupertino, CA (US)

(72) Inventors: David C. Graham, Columbus, OH (US); Kenneth L. Kocienda, San Jose, CA (US); Caelan G. Stack, Belmont, CA (US); Christopher P. Foss, San Francisco, CA (US); Freddy A. Anzures, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/107,819

(22) Filed: Nov. 30, 2020

(65) Prior Publication Data

US 2021/0081102 A1   Mar. 18, 2021

Related U.S. Application Data

(63) Continuation of application No. 15/691,715, filed on Aug. 30, 2017, now Pat. No. 10,852,936.
(Continued)

(51) Int. Cl.
*G06F 3/04883* (2022.01)
*G06F 3/0354* (2013.01)
(Continued)

(52) U.S. Cl.
CPC ...... *G06F 3/04883* (2013.01); *G06F 3/03545* (2013.01); *G06F 3/0488* (2013.01); *G06F 40/169* (2020.01); *G06F 2203/04804* (2013.01)

(58) Field of Classification Search
None
See application file for complete search history.

(56) References Cited

U.S. PATENT DOCUMENTS

| | | | |
|---|---|---|---|
| 7,409,633 B2 * | 8/2008 | Lerner | G06F 40/169 |
| | | | 715/205 |
| 7,705,861 B2 * | 4/2010 | Mielke | G06F 16/9577 |
| | | | 715/252 |

(Continued)

FOREIGN PATENT DOCUMENTS

| | | |
|---|---|---|
| CN | 103428359 A | 12/2013 |
| CN | 104142782 A | 11/2014 |
| EP | 2 667 293 A2 | 11/2013 |

OTHER PUBLICATIONS

First Action Interview Pilot Program Pre-Interview Communication, dated Apr. 22, 2019, received in U.S. Appl. No. 15/691,715, 4 pages.

(Continued)

*Primary Examiner* — Tamara T Kyle
*Assistant Examiner* — Koorosh Nehchiri
(74) *Attorney, Agent, or Firm* — Morgan, Lewis & Bockius LLP

(57) ABSTRACT

An electronic device with a display device displays a user interface that includes content. The electronic device, while displaying the user interface that includes content, detects a first input. The electronic device, in response to detecting the first input, displays an annotation layer over the displayed content. At least a portion of the content is visible through the annotation layer. The electronic device, while displaying the annotation layer, displays a set of markup tools, including a plurality of tools for adding marks to the annotation layer. The electronic device detects a second input selecting a first markup tool of the set of markup tools. The electronic device adds one or more marks on the annotation layer in accordance with one or more additional inputs using the selected first markup tool.

33 Claims, 87 Drawing Sheets

Related U.S. Application Data

(60) Provisional application No. 62/399,201, filed on Sep. 23, 2016.

(51) Int. Cl.
*G06F 3/0488* (2022.01)
*G06F 40/169* (2020.01)

(56) References Cited

U.S. PATENT DOCUMENTS

| | | | | |
|---|---|---|---|---|
| 8,314,790 | B1 * | 11/2012 | Zeiger | G06T 19/00 345/592 |
| 8,941,559 | B2 * | 1/2015 | Bar-Zeev | G09G 3/001 345/204 |
| 9,715,326 | B2 * | 7/2017 | Yuan | G06F 16/78 |
| 2003/0206169 | A1 * | 11/2003 | Springer | G06F 3/04845 345/442 |
| 2004/0143796 | A1 * | 7/2004 | Lerner | G06F 40/169 715/263 |
| 2006/0061597 | A1 * | 3/2006 | Hui | G06F 3/0481 345/629 |
| 2008/0046837 | A1 * | 2/2008 | Beauchamp | G06F 3/0481 715/768 |
| 2008/0109751 | A1 * | 5/2008 | Fitzmaurice | G06F 3/0488 715/793 |
| 2008/0307342 | A1 | 12/2008 | Furches et al. | |
| 2009/0027418 | A1 * | 1/2009 | Maru | G06F 16/29 345/629 |
| 2010/0185733 | A1 | 7/2010 | Hon et al. | |
| 2010/0325527 | A1 * | 12/2010 | Estrada | G06F 40/169 715/230 |
| 2011/0181524 | A1 | 7/2011 | Hinckley et al. | |
| 2011/0285748 | A1 * | 11/2011 | Slatter | G06T 11/60 345/629 |
| 2012/0030568 | A1 * | 2/2012 | Migos | G06F 3/0486 345/173 |
| 2012/0065944 | A1 * | 3/2012 | Nielsen | G06Q 50/06 703/1 |
| 2012/0235930 | A1 | 9/2012 | Lazaridis et al. | |
| 2012/0306749 | A1 * | 12/2012 | Liu | G06F 3/0488 345/173 |
| 2013/0141371 | A1 * | 6/2013 | Hallford | G06F 3/04883 345/173 |
| 2013/0159941 | A1 * | 6/2013 | Langlois | H04M 1/7243 715/863 |
| 2013/0222385 | A1 * | 8/2013 | Dorsey | G06T 15/005 345/427 |
| 2013/0331152 | A1 * | 12/2013 | Park | G06F 3/04883 455/566 |
| 2014/0168142 | A1 | 6/2014 | Sasselli et al. | |
| 2014/0232671 | A1 | 8/2014 | Chaudhri | |
| 2014/0236720 | A1 | 8/2014 | Shunock et al. | |
| 2014/0365945 | A1 | 12/2014 | Karunamuni et al. | |
| 2015/0074615 | A1 * | 3/2015 | Han | H04L 9/3231 715/863 |
| 2015/0370757 | A1 * | 12/2015 | Duns | G06F 40/169 715/229 |
| 2018/0088323 | A1 * | 3/2018 | Bao | G02B 27/017 |
| 2018/0088794 | A1 | 3/2018 | Graham et al. | |

OTHER PUBLICATIONS

First Action Interview Office Action Summary, dated Jun. 13, 2019, received in U.S. Appl. No. 15/691,715, 6 pages.
Final Office Action, dated Oct. 30, 2019, received in U.S. Appl. No. 15/691,715, 17 pages.
Office Action, dated Mar. 20, 2020, received in U.S. Appl. No. 15/691,715, 18 pages.
Notice of Allowance, dated Jul. 27, 2020, received in U.S. Appl. No. 15/691,715, 10 pages.
Office Action, dated Mar. 19, 2019, received in Chinese Patent Application No. 201780053635.X, which corresponds with U.S. Appl. No. 15/691,715, 3 pages.
International Search Report and Written Opinion, dated Dec. 6, 2017, received in International Patent Application No. PCT/US2017/049638, which corresponds with U.S. Appl. No. 15/691,715, 11 pages.
Office Action, dated Sep. 24, 2021, received in Chinese Patent Application No. 201780053635.X, which corresponds with U.S. Appl. No. 15/691,715, 5 pages.
Office Action, dated Sep. 21, 2021, received in European Patent Application No. 17768304.2, which corresponds with U.S. Appl. No. 15/691,715, 6 pages.
Office Action, dated Mar. 23, 2022, received in Chinese Patent Application No. 201780053635.X, which corresponds with U.S. Appl. No. 15/691,715, 1 page.
Notice of Allowance, dated Jun. 1, 2022, received in Chinese Patent Application No. 201780053635.X, which corresponds with U.S. Appl. No. 15/691,715, 1 page.
Patent, dated Jul. 15, 2022, received in Chinese Patent Application No. 201780053635.X, which corresponds with U.S. Appl. No. 15/691,715, 6 pages.
Office Action, dated Jun. 27, 2024, received in Chinese Patent Application No. 202210802611.2, which corresponds with U.S. Appl. No. 17/107,819, 3 pages.

\* cited by examiner

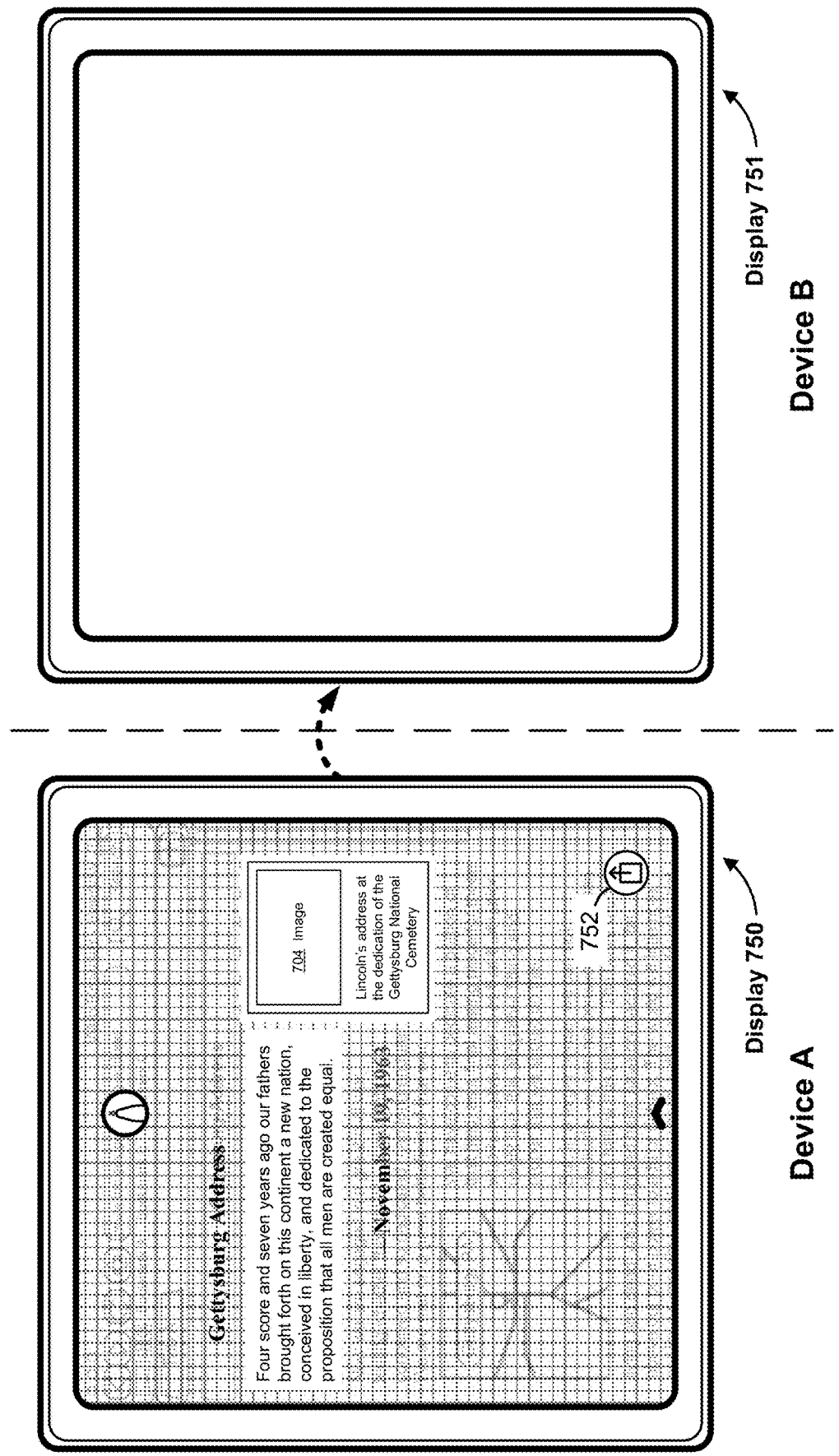

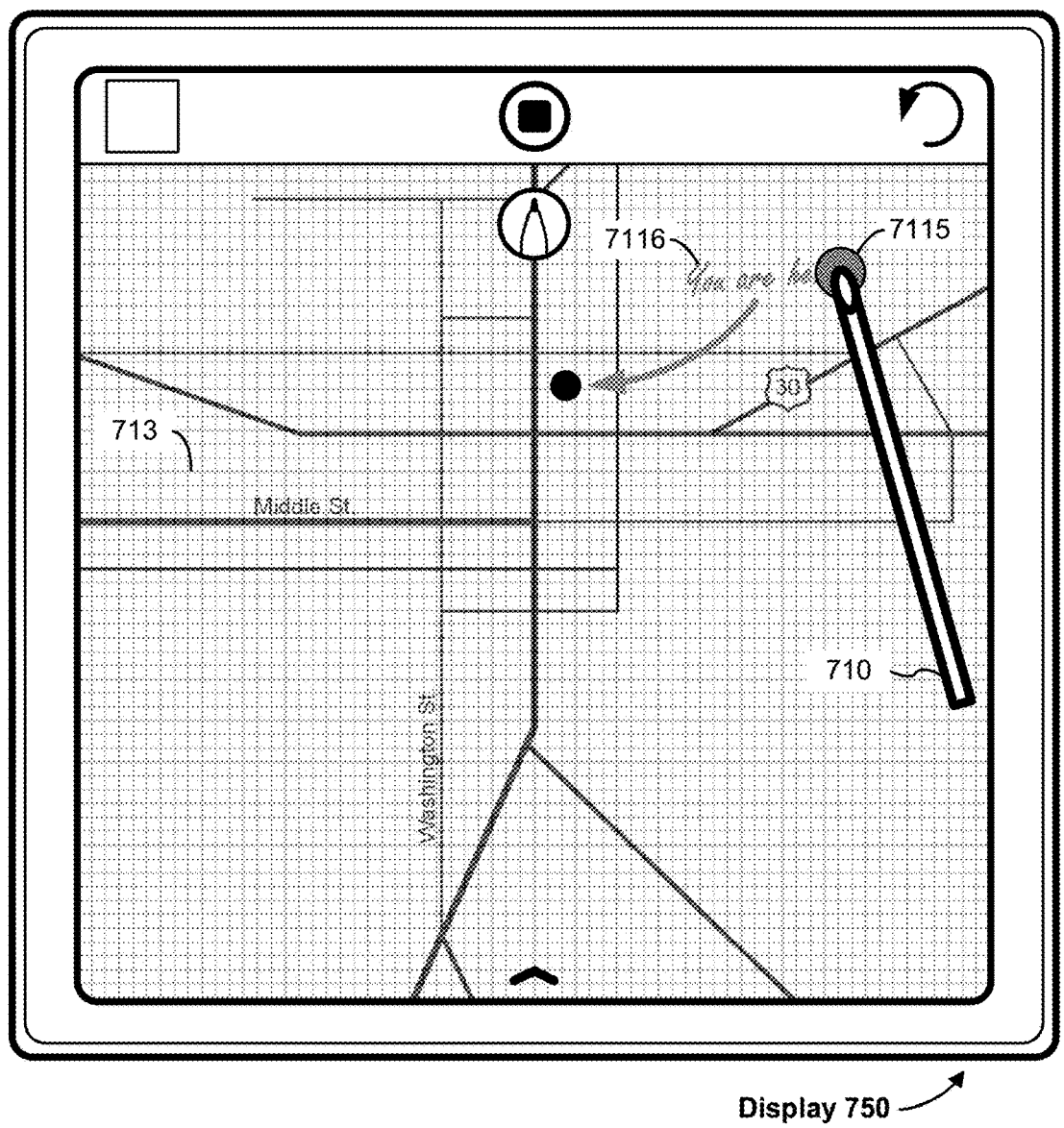
Figure 7AAA

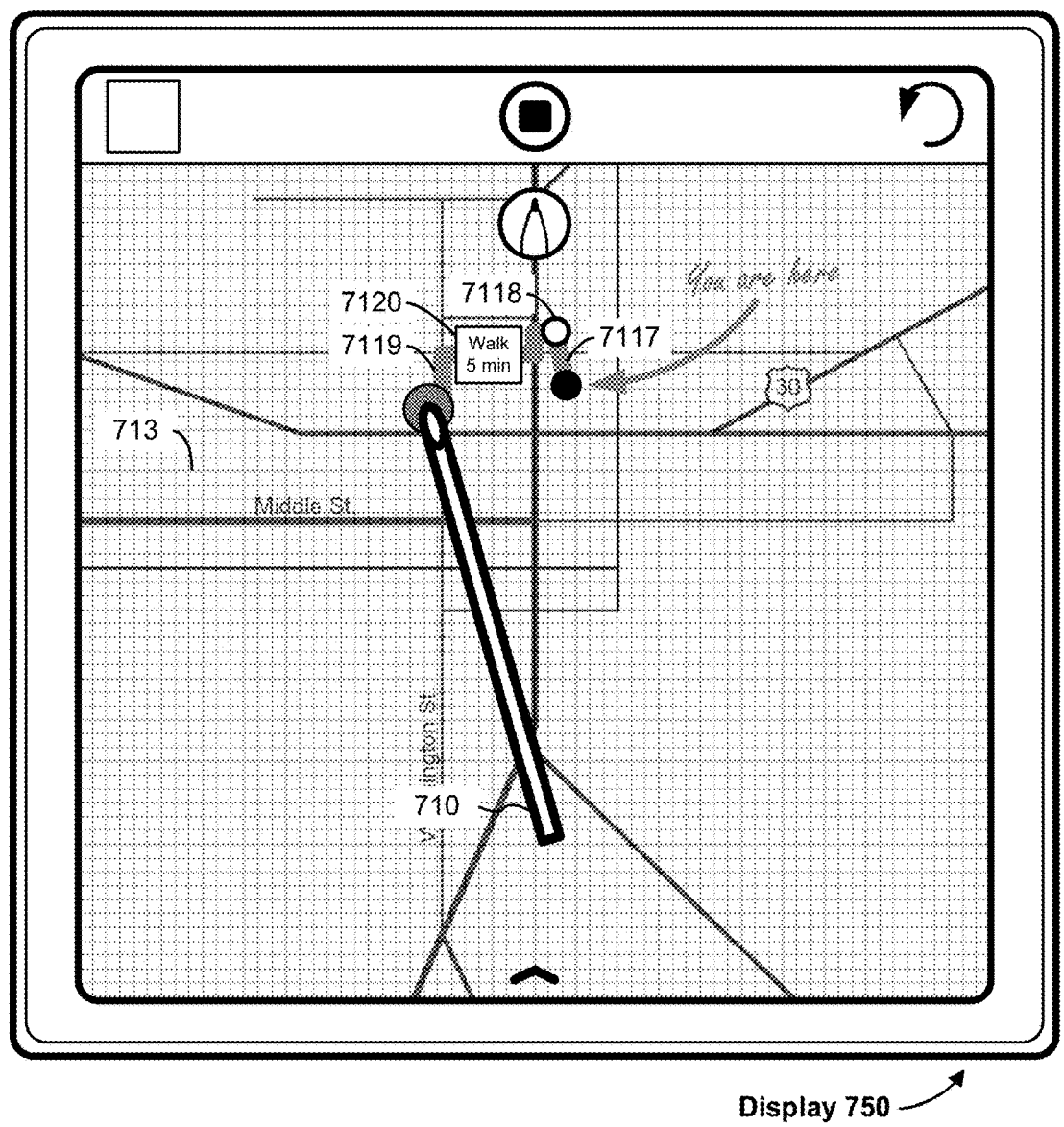
Figure 7BBB

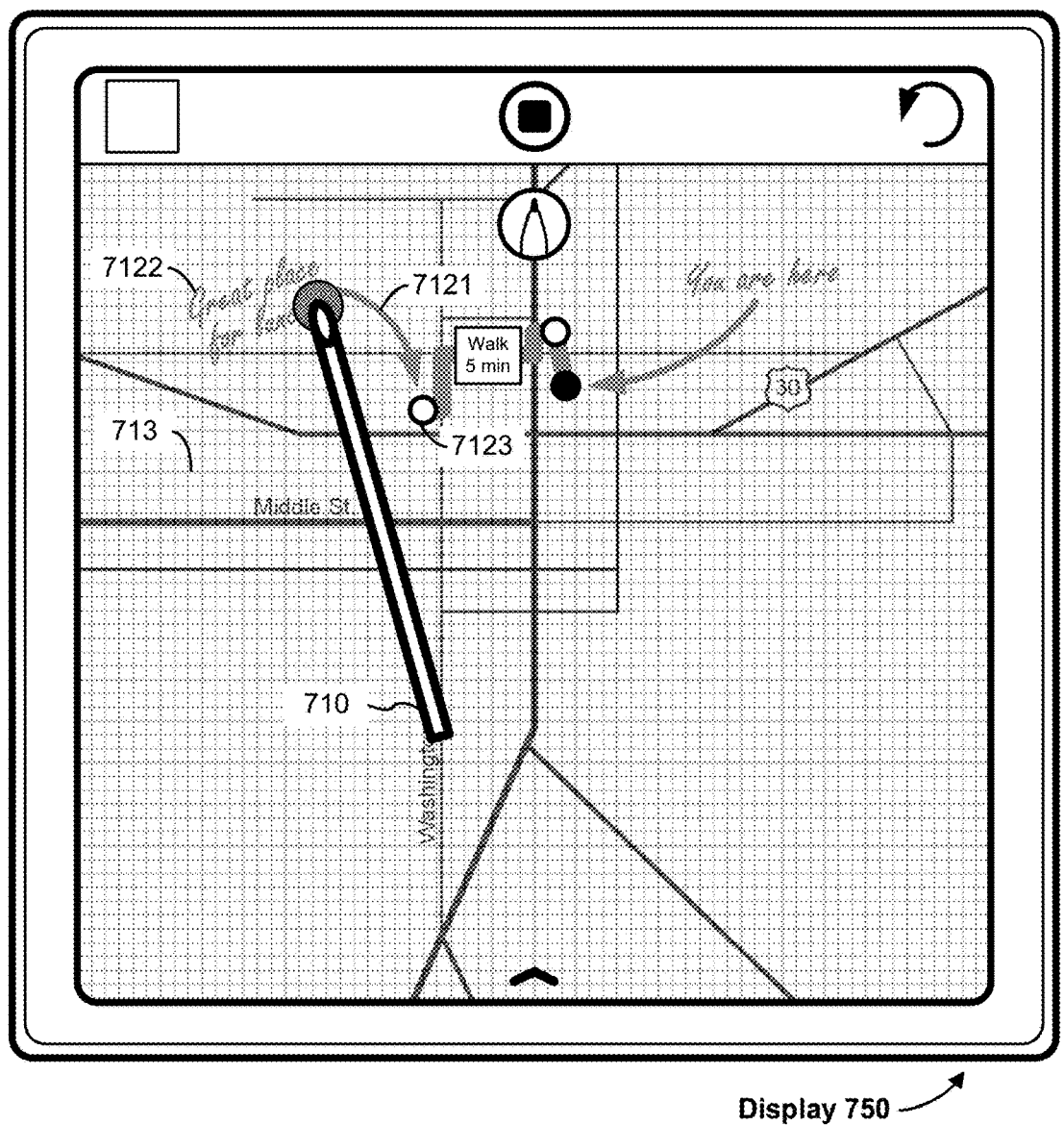
Figure 7CCC

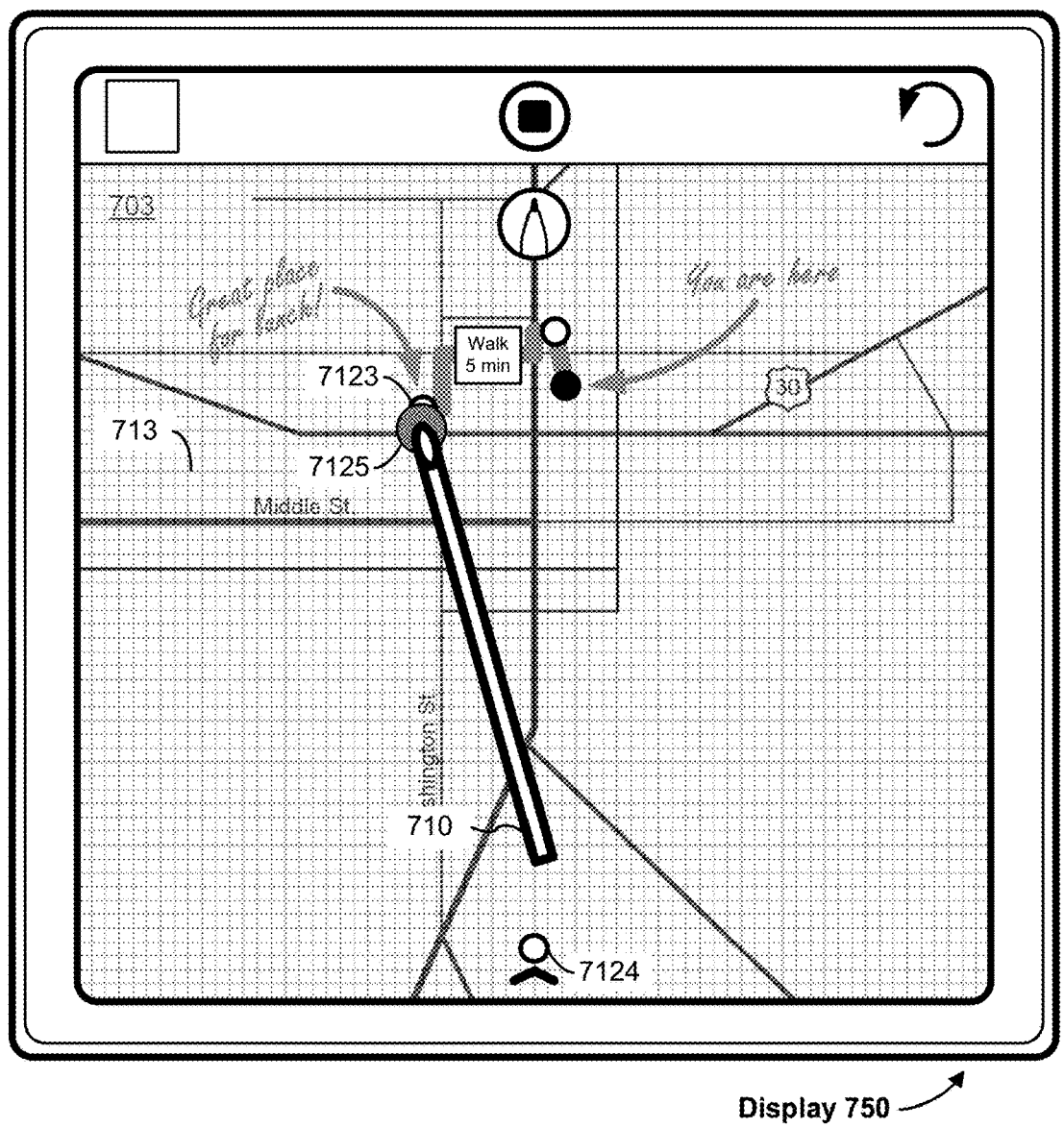
Figure 7DDD

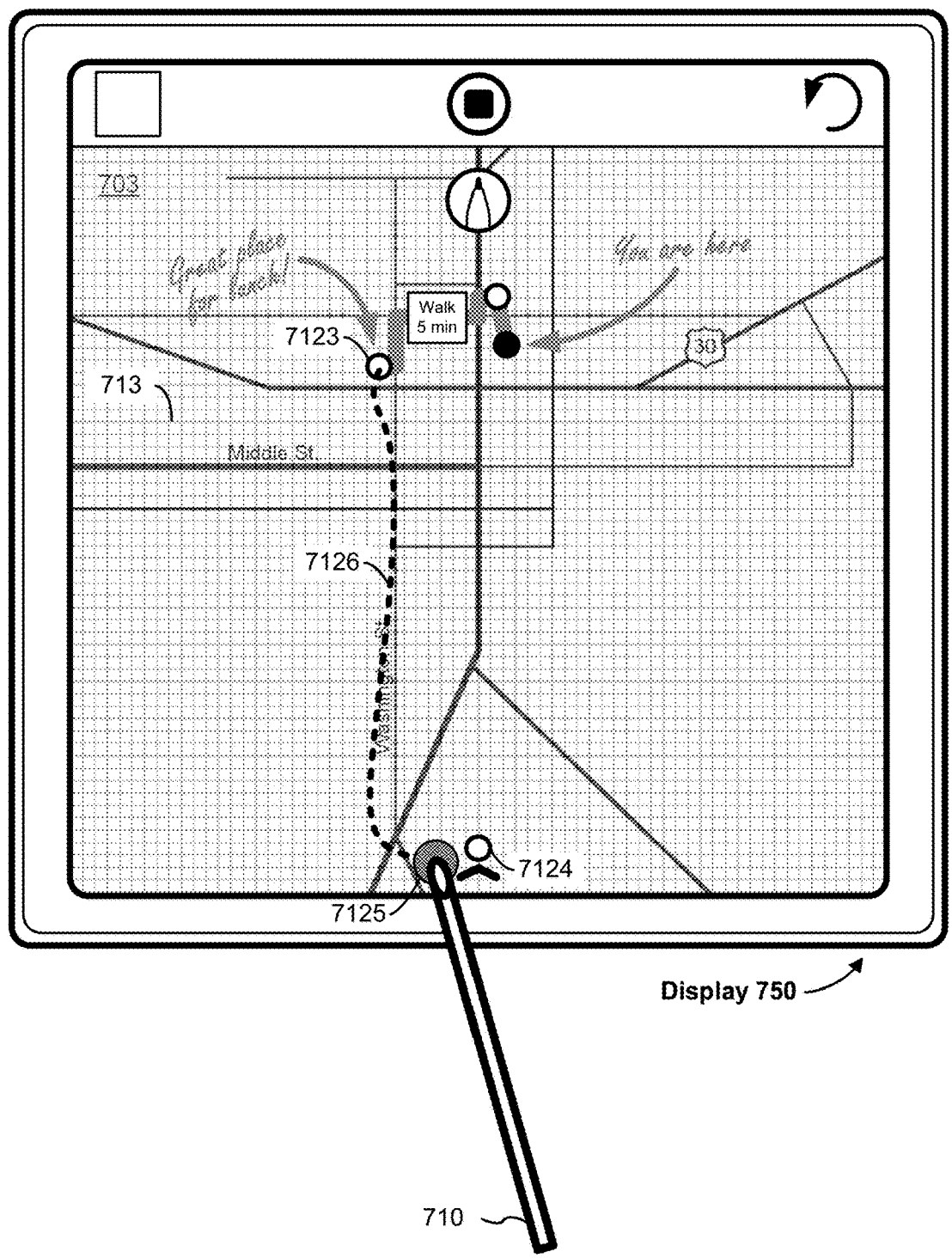
Figure 7EEE

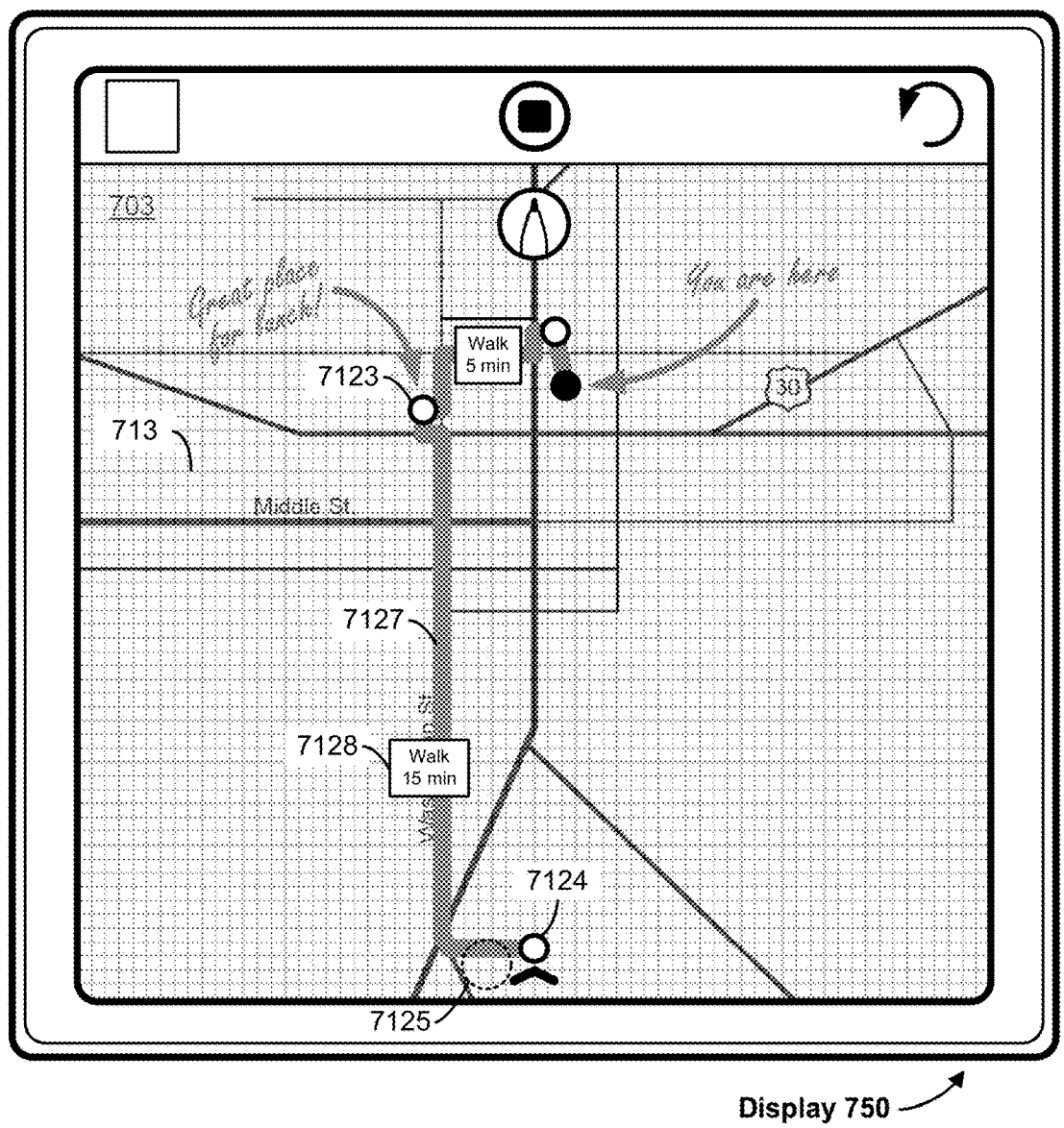
Figure 7FFF

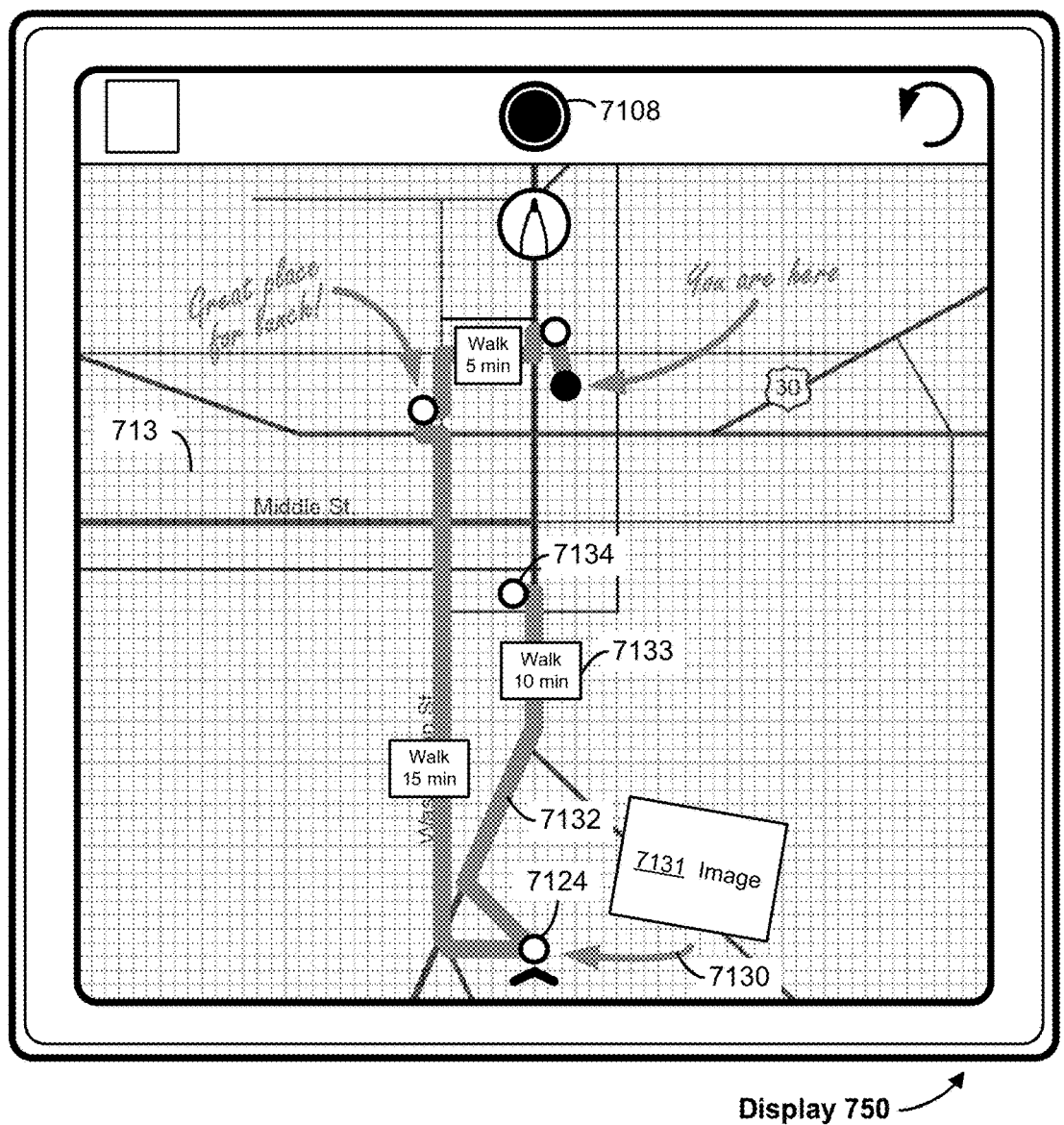
Figure 7GGG

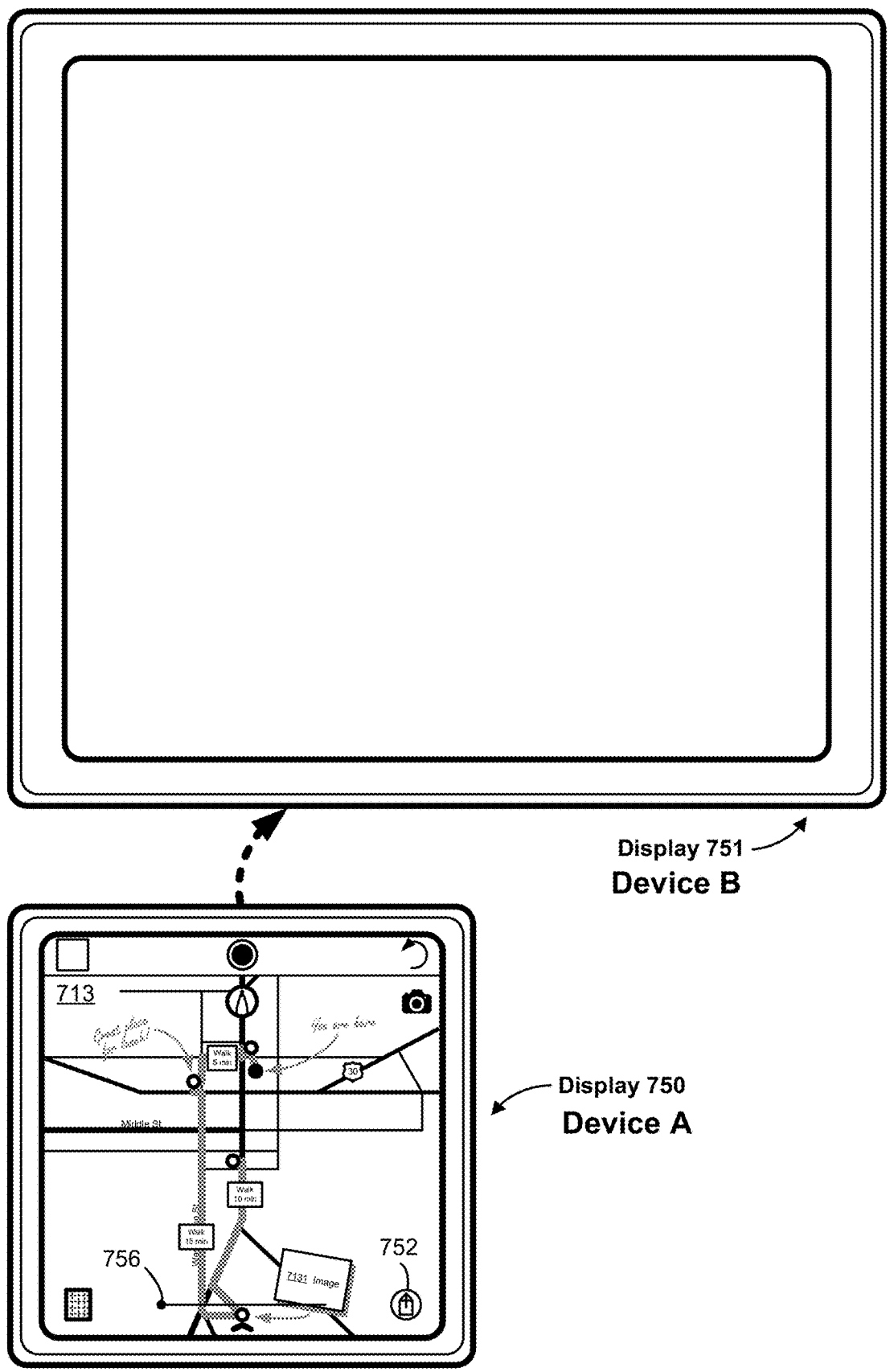
Figure 7HHH

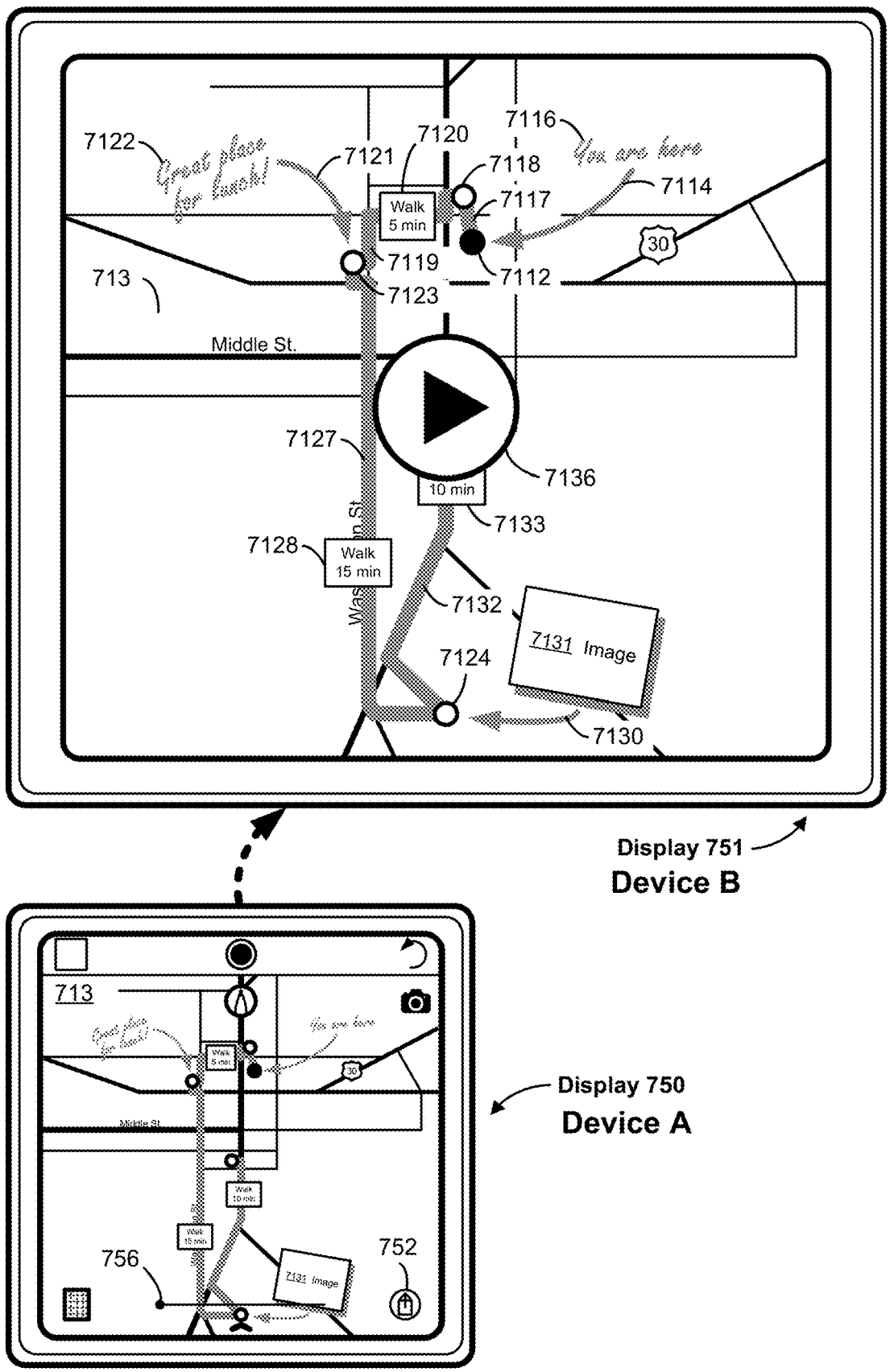
Figure 7III

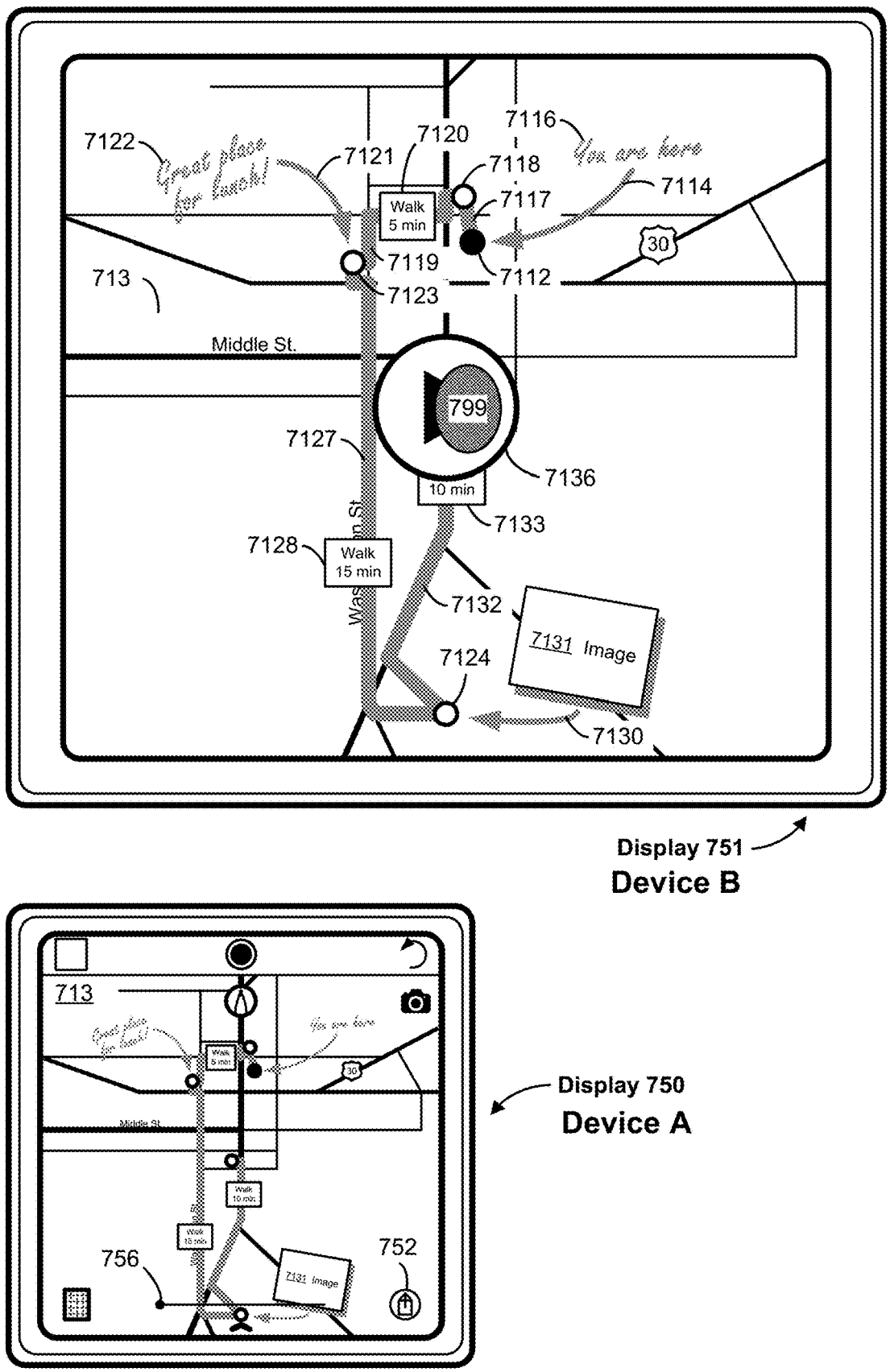
Figure 7JJJ

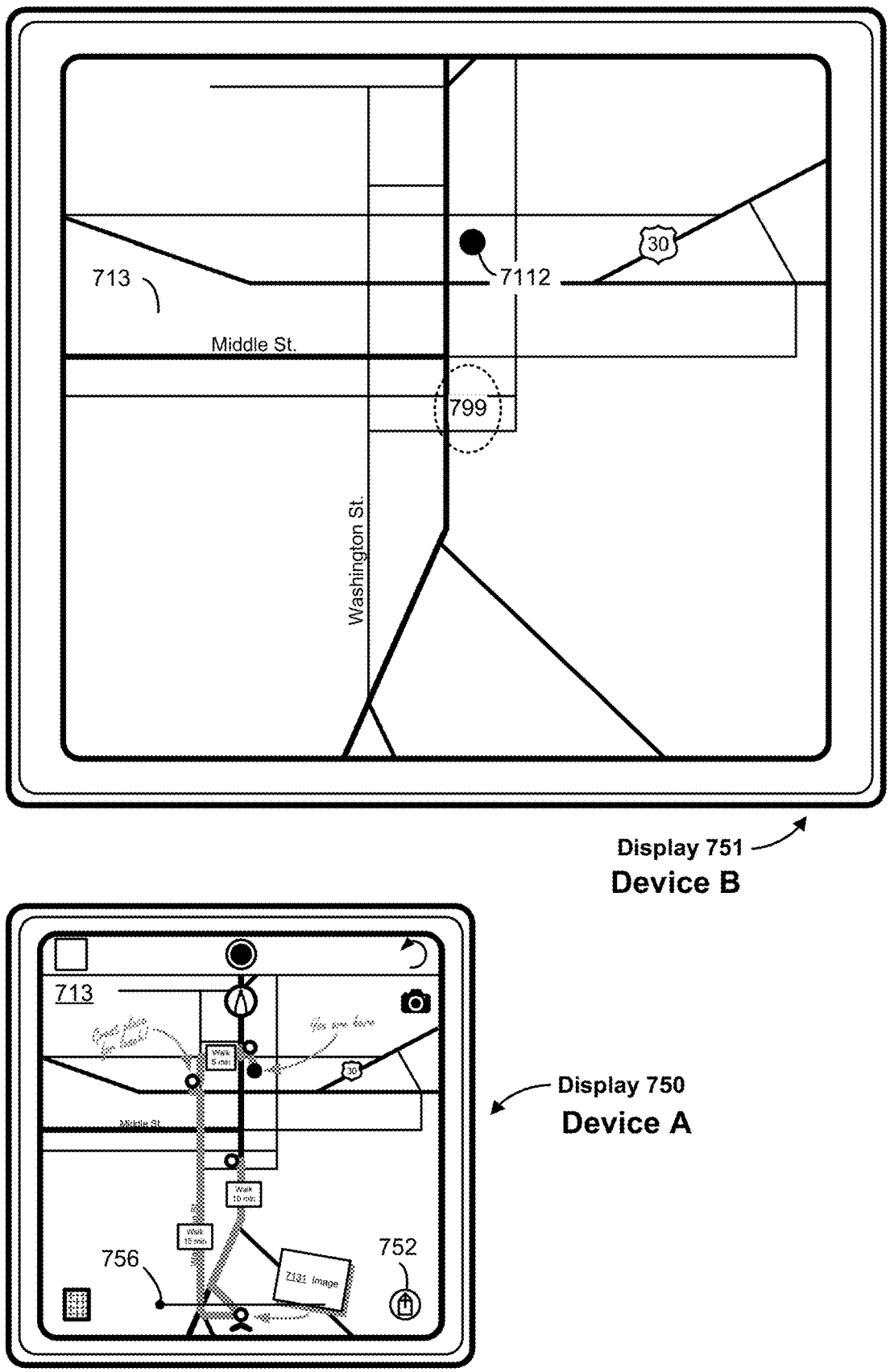
Figure 7KKK

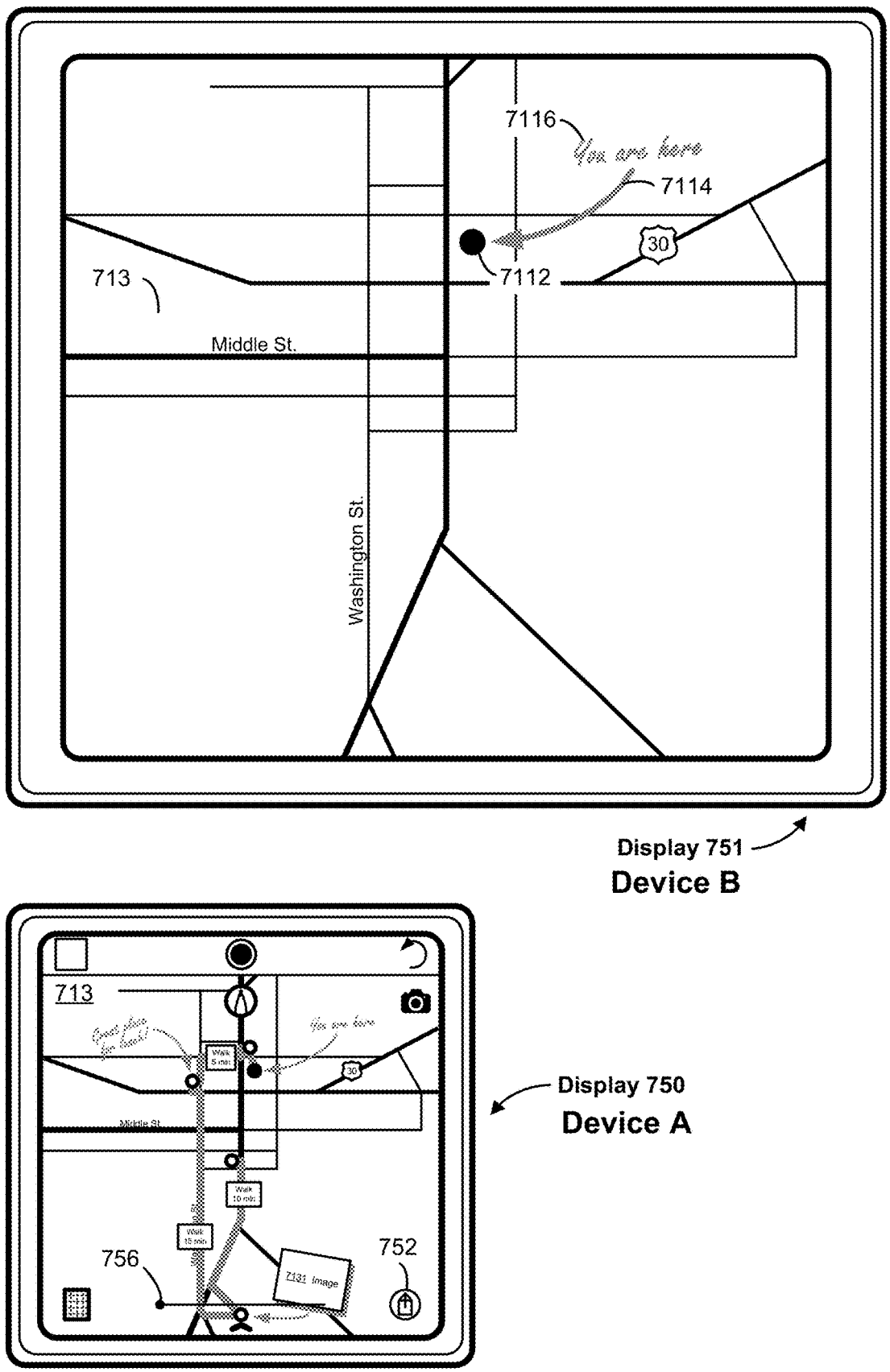
Figure 7LLL

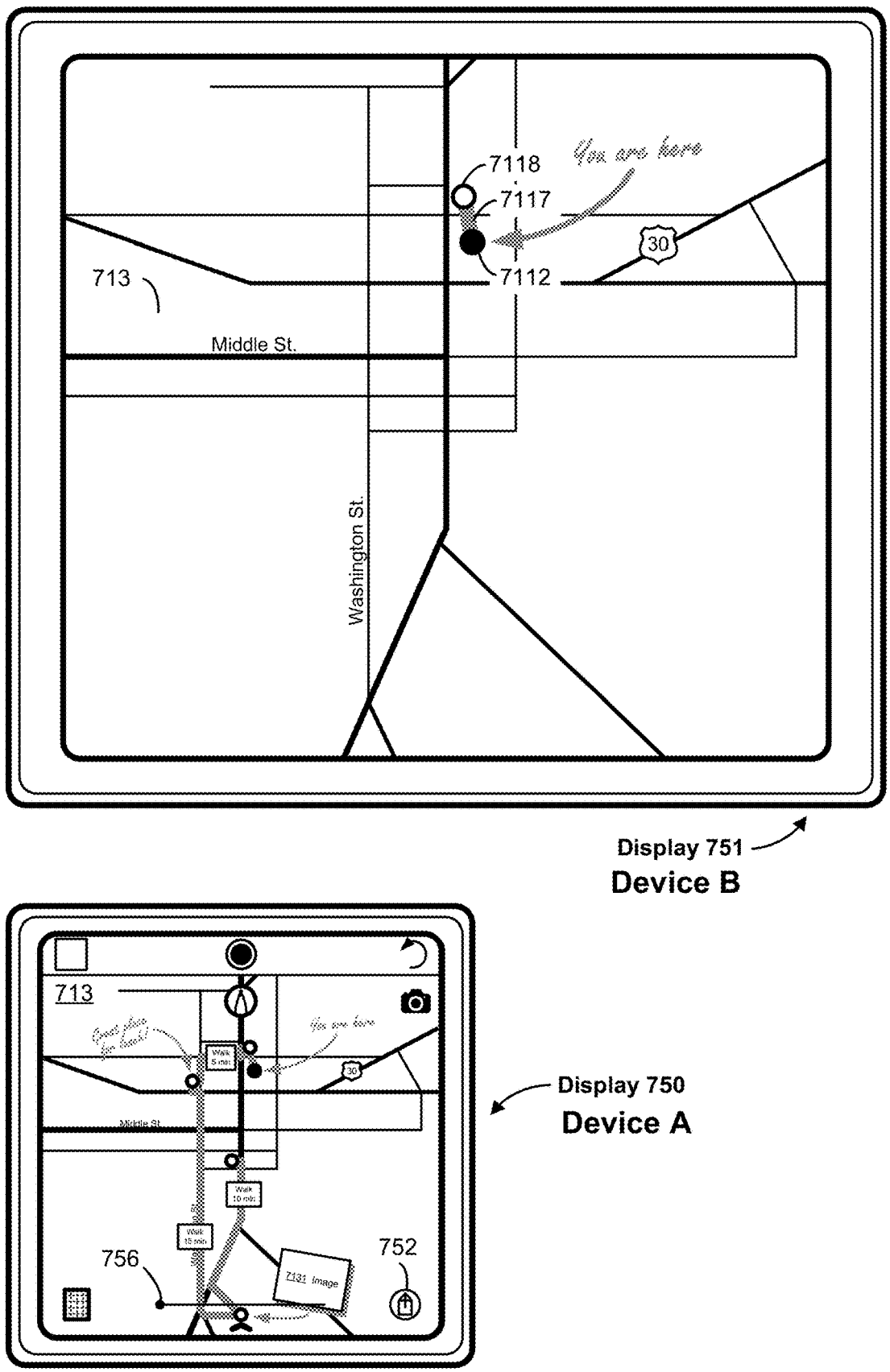
Figure 7MMM

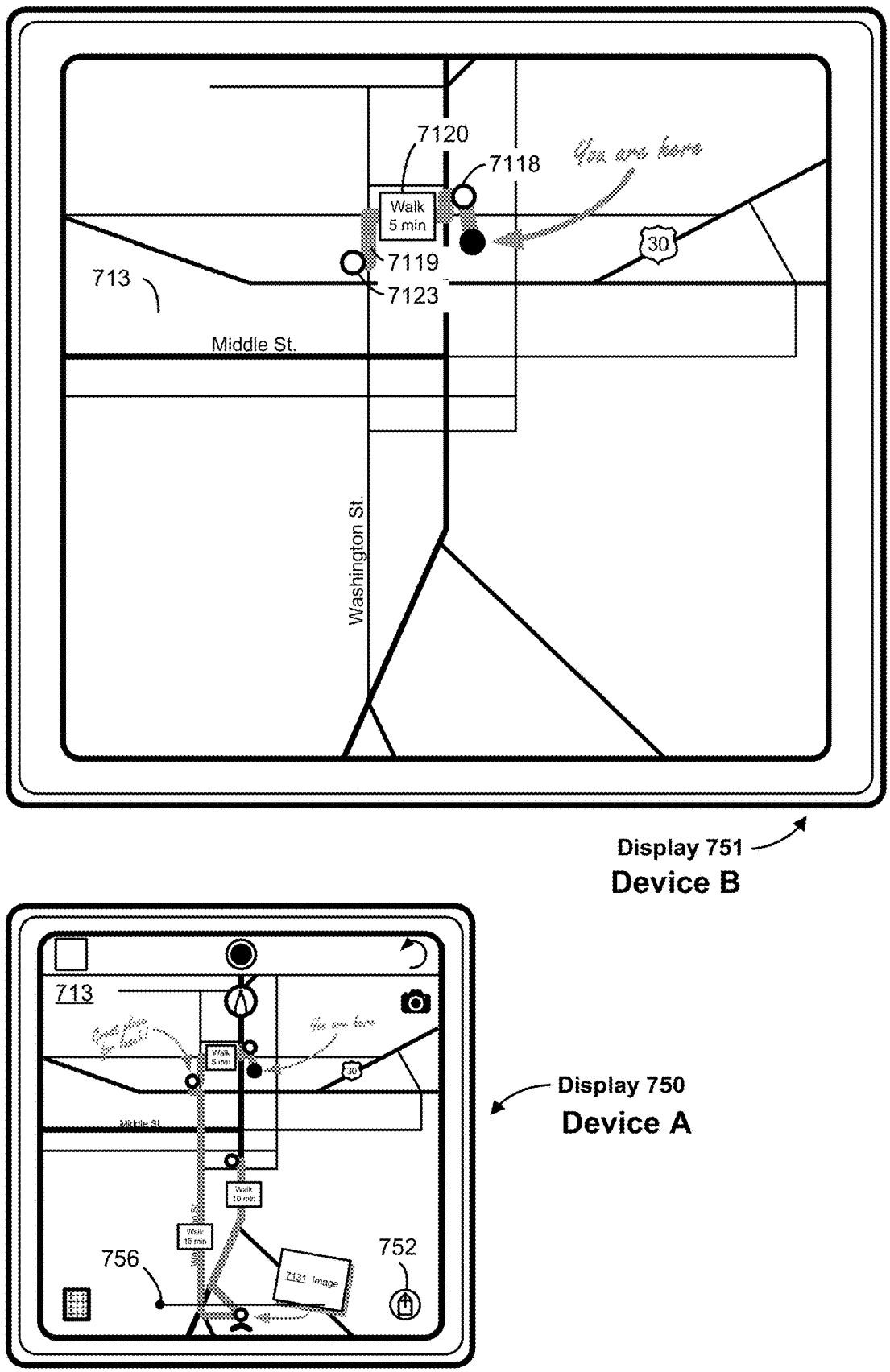
Figure 7NNN

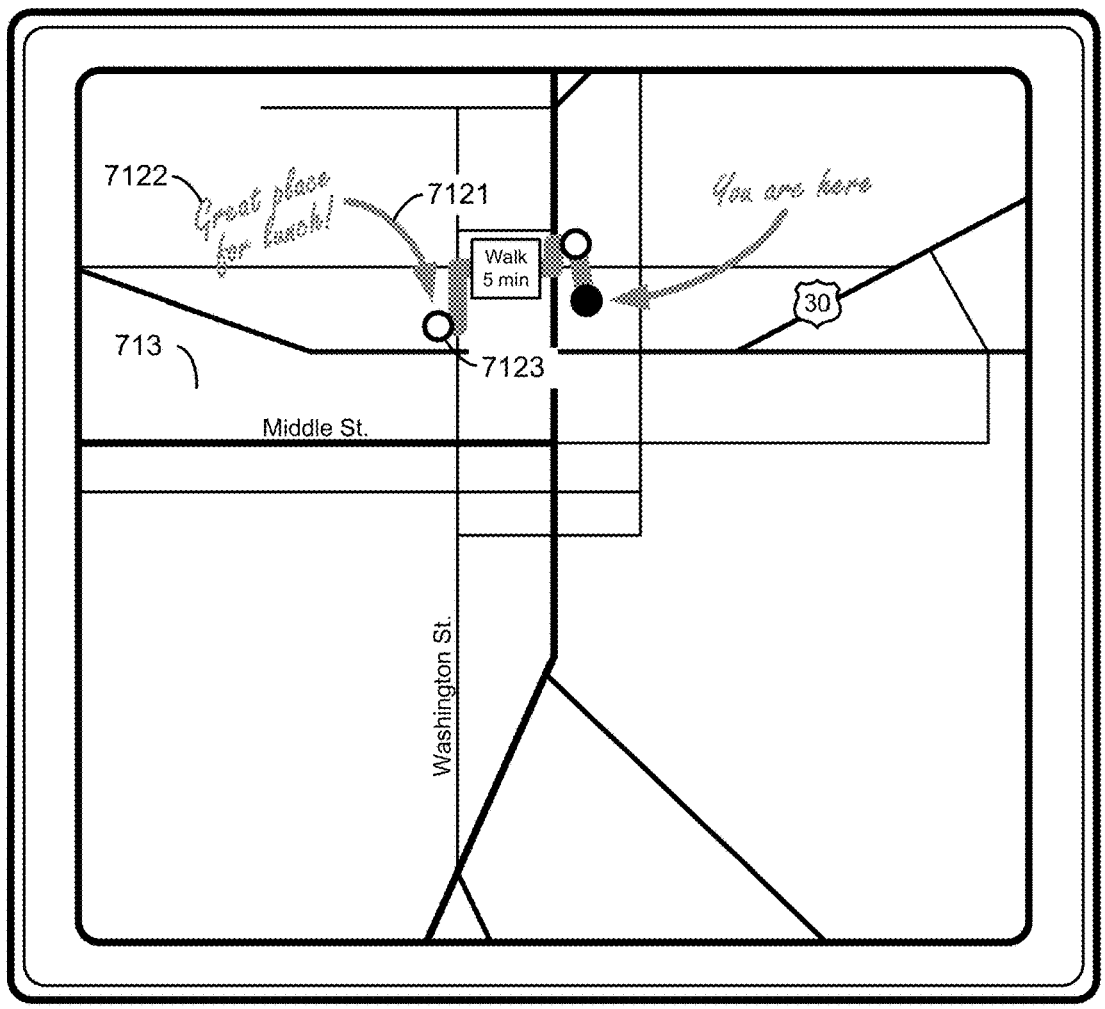
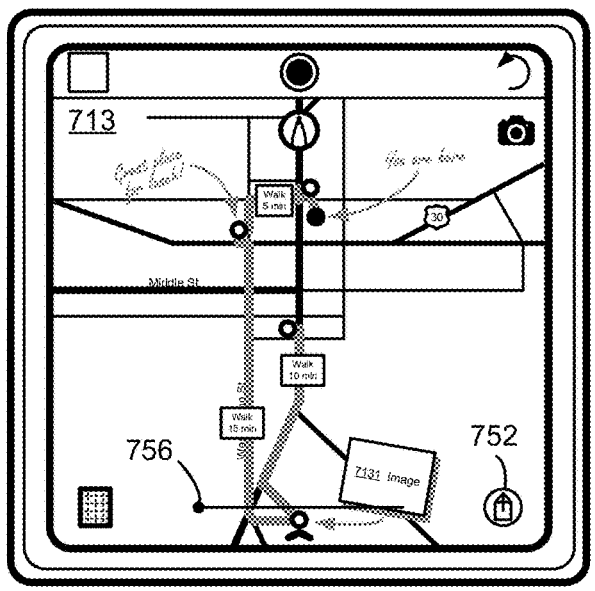
Figure 7OOO

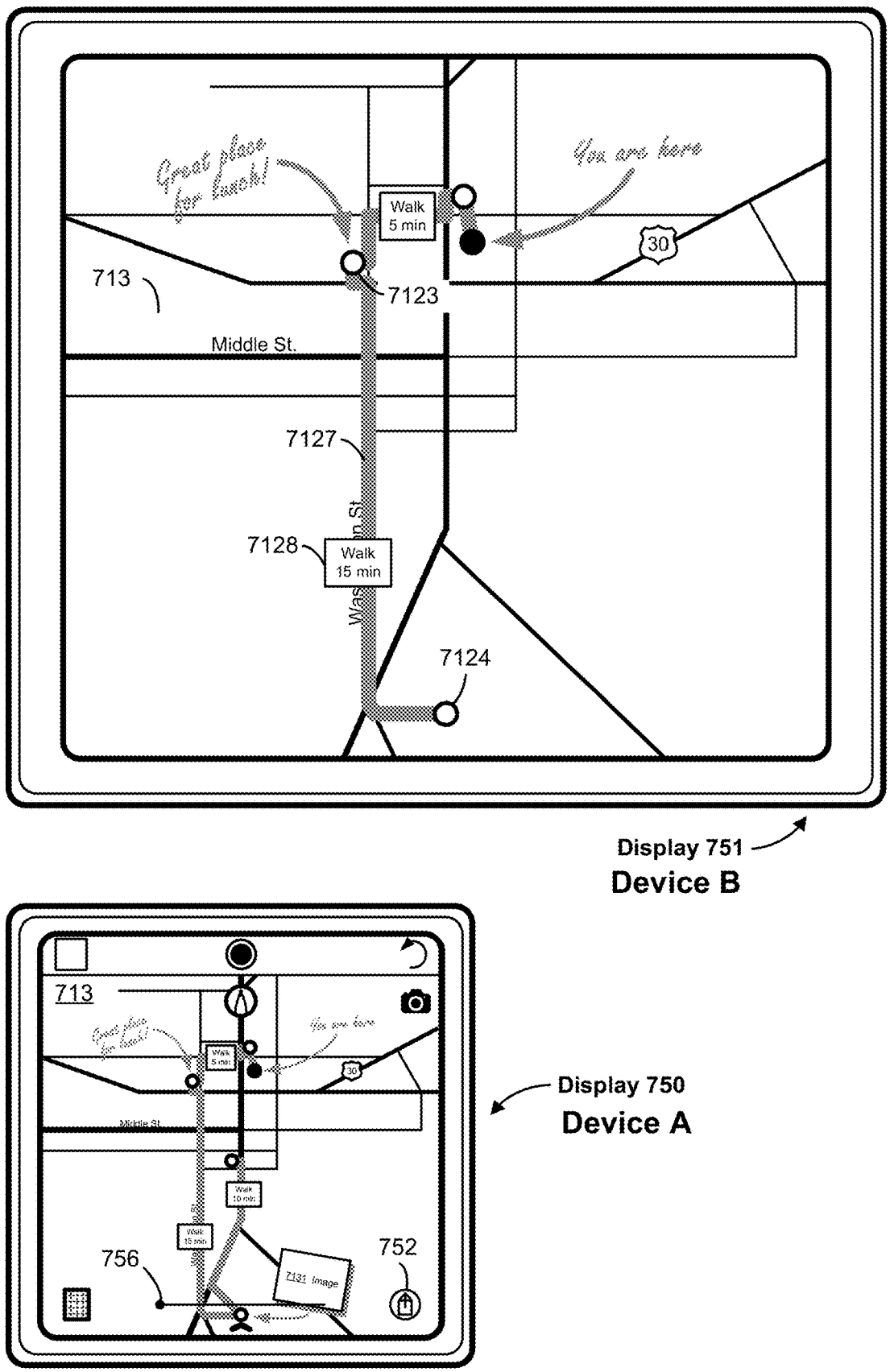
Figure 7PPP

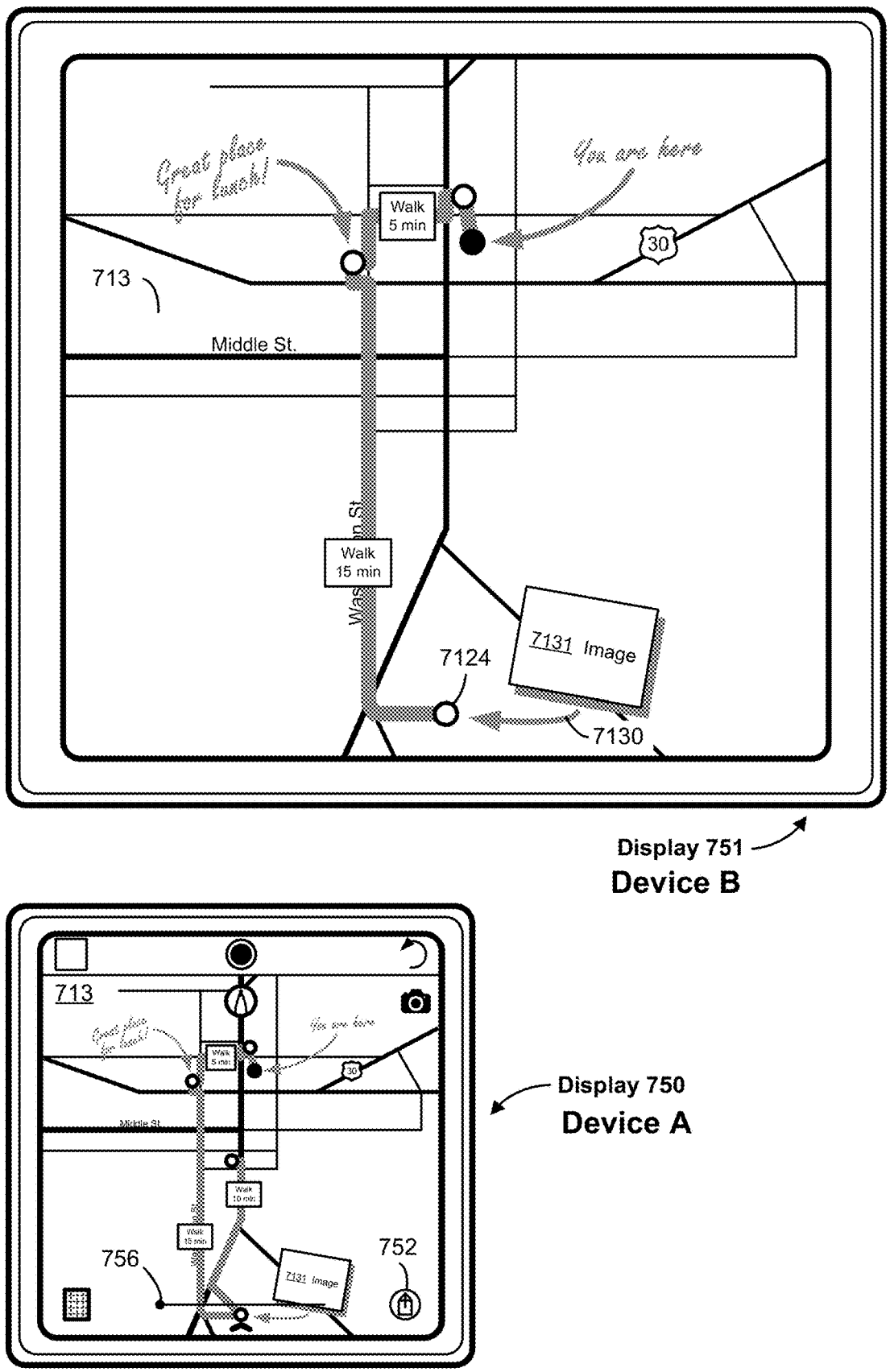
Figure 7QQQ

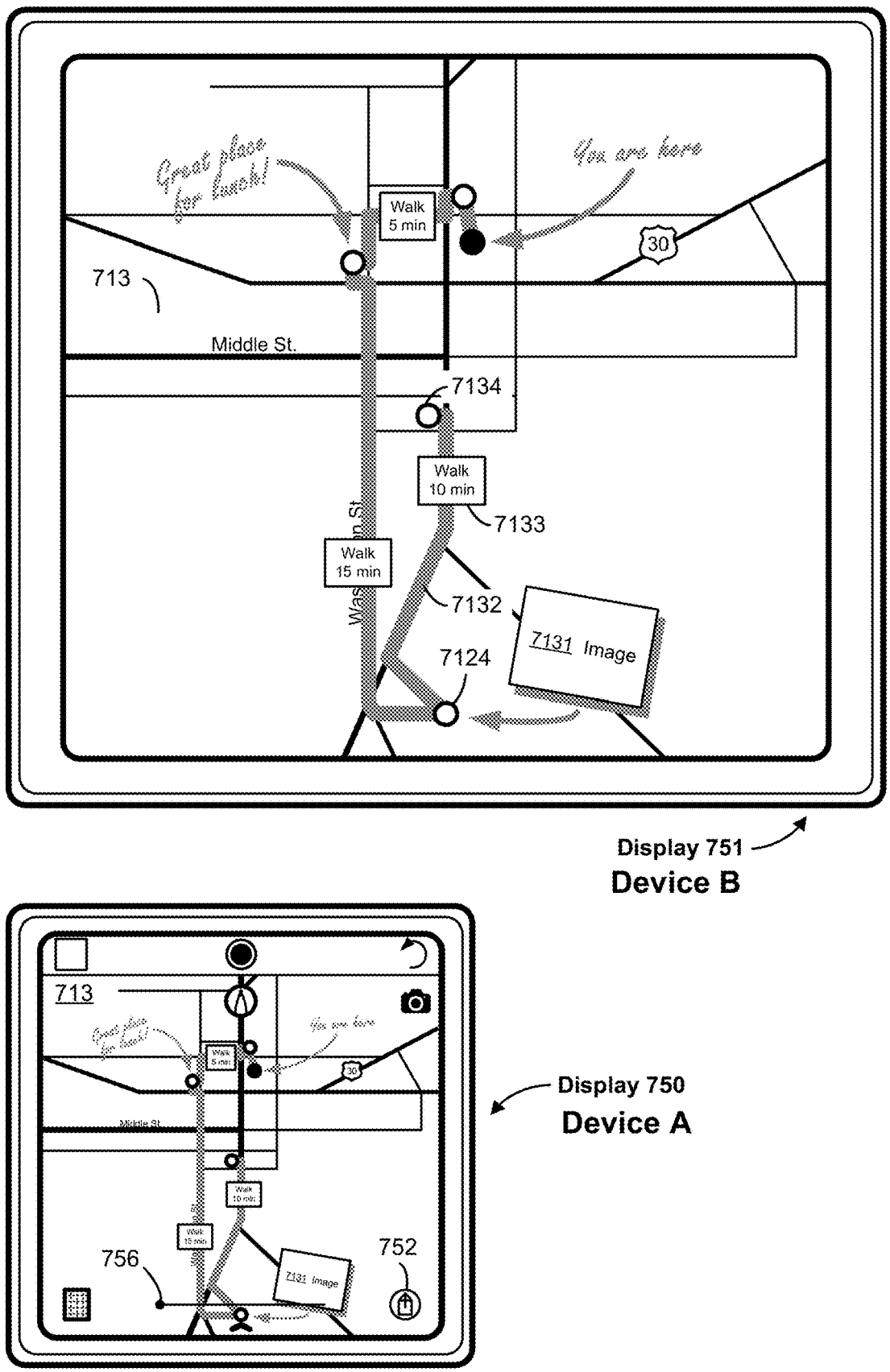
Figure 7RRR (A)

↓

914 In response to detecting the first input, continue to display the first application content and, in addition, display an annotation layer over at least a first portion of the first user interface. The annotation layer is associated with a user application distinct from the plurality of applications > 916 The annotation layer has an adjustable opacity. Change the opacity of the annotation layer in response to a fifth input. Increasing the opacity of the annotation layer decreases the visibility of application content that is displayed underneath the annotation layer.

> 918 The annotation layer has an adjustable texture, and the adjustable texture is solid, ruled, grid, dotted, or semitransparent

↓

920 While displaying the annotation layer over at least the first portion of the first user interface, detect a second input

↓

922 In response to detecting the second input

> 924 Create the representation of at least the second portion of the user interface that is added to the annotation layer

926 Add a representation of at least a second portion of the first user interface to the annotation layer > 928 The second input is a gesture having a path, and a boundary of the second portion of the user interface to be represented in the annotation layer is determined based on the path of the second input gesture

930 While displaying the representation in the annotation layer, detect a set of one or more additional inputs

932 In response to detecting the set of one or more additional inputs, add annotations to the annotation layer

934 The representation is added to the annotation layer under control of the user application distinct from the plurality of applications, and the annotations are added to the annotation layer under control of the user application distinct from the plurality of applications

936 Adding annotations to the annotation layer is responsive to both the set of one or more additional inputs and application content that is displayed underneath the annotation layer

938 The representation is a first representation, the set of one or more additional inputs is a first set of one or more additional inputs, the annotations are a first set of annotations, and, after adding the first set of annotations to the annotation layer, display a second user interface of a second application of the plurality of applications. The second user interface includes second application content. While displaying the second user interface of the second application, detect a third input. In response to detecting the third input, continue to display the second application content and, in addition, display the annotation layer over at least a first portion of the second user interface. While displaying the annotation layer over at least the first portion of the second user interface, detect a fourth input. In response to detecting the fourth input, add a second representation of at least a second portion of the second user interface to the annotation layer. While displaying the second representation in the annotation layer, detect a second set of one or more additional inputs. In response to detecting the second set of one or more additional inputs, add a second set of annotations to the annotation layer.

Figure 9C

932 In response to detecting the set of one or more additional inputs, add annotations to the annotation layer (C)

940 The annotation layer is a first annotation layer, the representation is a first representation, the set of one or more additional inputs is a first set of one or more additional inputs, the annotations are a first set of annotations, and, after adding the first set of annotations to the annotation layer, display a second user interface of a second application of the plurality of applications. The second user interface includes second application content. While displaying the second user interface of the second application, detect a third input. In response to detecting the third input, continue to display the second application content and, in addition, display a second annotation layer distinct from the first annotation layer over at least a first portion of the second user interface. While displaying the second annotation layer over at least the first portion of the second user interface, detect a fourth input. In response to detecting the fourth input, add a second representation of at least a second portion of the second user interface to the second annotation layer. While displaying the second representation in the second annotation layer, detect a second set of one or more additional inputs. In response to detecting the second set of one or more additional inputs, add a second set of annotations to the second annotation layer.

932 In response to detecting the set of one or more additional inputs, add annotations to the annotation layer (D)

942 The electronic device further includes one or more sensors to detect signals from a stylus associated with the device; the set of one or more additional inputs includes a first additional input; and the first additional input is input to the electronic device using the stylus

944 The set of one or more additional inputs includes a second additional input; and the second additional input includes an input from both the stylus and one or more finger contacts

946 At least one of the annotations is a handwritten annotation that is input using the stylus

948 Process the handwritten annotation to generate searchable text associated with the handwritten annotation

950 The set of one or more additional inputs include a third additional input, and, in accordance with a determination that the third additional input is provided using a finger, display a set of annotation controls for the annotation layer

952 Detect a sixth input; and in response to the sixth input, send or communicate an object that includes at least the annotation layer

954 Store an object that includes at least the annotation layer; after storing the object that includes at least the annotation layer, detect a subsequent input; and in response to detecting the subsequent input, display at least the annotation layer

956 The object that includes at least the annotation layer further includes a sequence of annotations made to produce the annotation layer; and displaying at least the annotation layer in response to detecting the subsequent input includes: playing back the sequence of annotations made to produce the annotation layer; and, after playing back the sequence of annotations, displaying the annotation layer

Figure 9E

DEVICES, METHODS, AND GRAPHICAL USER INTERFACES FOR A UNIFIED ANNOTATION LAYER FOR ANNOTATING CONTENT DISPLAYED ON A DEVICE

RELATED APPLICATION

This application is a continuation of U.S. patent application Ser. No. 15/691,715, filed Aug. 30, 2017, entitled "Devices, Methods, and Graphical User Interfaces for a Unified Annotation Layer for Annotating Content Displayed on a Device," which claims the benefit of, and priority to, U.S. Provisional Patent Application Ser. No. 62/399,201, filed Sep. 23, 2016, which are incorporated by reference herein in their entirety.

TECHNICAL FIELD

This relates generally to electronic devices with touch-sensitive displays, including but not limited to electronic devices with touch-sensitive displays that manipulate user interfaces through the addition of annotations to a unified annotation layer.

BACKGROUND

The use of touch-sensitive surfaces as input devices for computers and other electronic computing devices has increased significantly in recent years. Examples of touch-sensitive surfaces include touchpads and touch-screen displays. Such surfaces are widely used to manipulate user interface objects on a display.

User interfaces can be manipulated through the addition of annotations. Conventional methods for adding annotations to a user interface are cumbersome and inefficient.

SUMMARY

Accordingly, there is a need for electronic devices with faster, more efficient methods and interfaces for adding annotations to user interfaces. Such methods and interfaces optionally complement or replace conventional methods for adding annotations to user interfaces. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a touch-sensitive display and optionally one or more sensors to detect signals from a stylus associated with the device. The method includes: displaying a first user interface of a first application. The first application is a respective application of a plurality of applications, and the first user interface includes first application content. The method also includes, while displaying the first user interface of the first application, detecting a first input; and, in response to detecting the first input, continuing to display the first application content and, in addition, displaying an annotation layer over at least a first portion of the first user interface. The annotation layer is associated with a user application distinct from the plurality of applications. The method further includes, while displaying the annotation layer over at least the first portion of the first user interface, detecting a second input; in response to detecting the second input, adding a representation of at least a second portion of the first user interface to the annotation layer; while displaying the representation in the annotation layer, detecting a set of one or more additional inputs; and in response to detecting the set of one or more additional inputs, adding annotations to the annotation layer.

In accordance with some embodiments, an electronic device includes a touch-sensitive display unit configured to display a first user interface of a first application and receive user inputs, and a processing unit coupled with the touch-sensitive display unit. In some embodiments, the electronic device includes one or more sensor units (e.g., coupled with the processing unit) to detect signals from a stylus associated with the device. The processing unit is configured to enable display of the first user interface of the first application. The first application is a respective application of a plurality of applications, and the first user interface includes first application content. The processing unit is also configured to, while the first user interface of the first application is displayed, detect a first input; and, in response to detecting the first input, enable continued display of the first application content and, in addition, enable display of an annotation layer over at least a first portion of the first user interface. The annotation layer is associated with a user application distinct from the plurality of applications. The processing unit is further configured to, while the annotation layer is displayed over at least the first portion of the first user interface, detect a second input; in response to detecting the second input, add a representation of at least a second portion of the first user interface to the annotation layer; while the representation is displayed in the annotation layer, detect a set of one or more additional inputs; and in response to detecting the set of one or more additional inputs, add annotations to the annotation layer.

In accordance with some embodiments, an electronic device includes a touch-sensitive display, optionally one or more sensors to detect signals from a stylus associated with the device, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions, which, when executed by an electronic device with a touch-sensitive display and optionally one or more sensors to detect signals from a stylus associated with the device, cause the device to perform or cause performance of the operations of any of the methods described herein. In accordance with some embodiments, a graphical user interface on an electronic device with a touch-sensitive display, optionally one or more sensors to detect signals from a stylus associated with the device, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a touch-sensitive display, optionally one or more sensors to detect signals from a stylus associated with the device, and means for performing or causing performance of the operations of any of the methods described herein. In accordance with some embodiments, an information processing apparatus, for use in an electronic device with a touch-sensitive display and optionally one or more sensors to detect signals from a stylus associated with the device, includes means for performing or causing performance of the operations of any of the methods described herein.

Thus, electronic devices with touch-sensitive displays and optionally one or more sensors to detect signals from styluses associated with the devices are provided with faster, more efficient methods and interfaces for adding annotations to user interfaces using a unified annotation layer, thereby increasing the effectiveness, efficiency, and user satisfaction with such devices. Such methods and interfaces may complement or replace conventional methods for adding annotations to user interfaces.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9E are flow diagrams illustrating a method of adding annotations to an annotation layer in accordance with some embodiments.

DESCRIPTION OF EMBODIMENTS

Many electronic devices have a number of applications that are used to view and edit documents. Some of these applications allow a user to add annotations to a document. However, existing methods for annotating documents are slow and inefficient. For example, different applications use different methods for annotating documents and/or saving annotated documents and annotations. Further, for documents associated with applications that do not allow adding annotations, separate applications are required for annotation. Further, annotations added to a document in one application may not be preserved for display or editable in other applications. The embodiments below address these problems by providing a method that enables the addition of annotations to a unified annotation layer that operates in conjunction with a plurality of applications and is controlled by an annotation application independent of the plurality of applications.

Figure 7A:
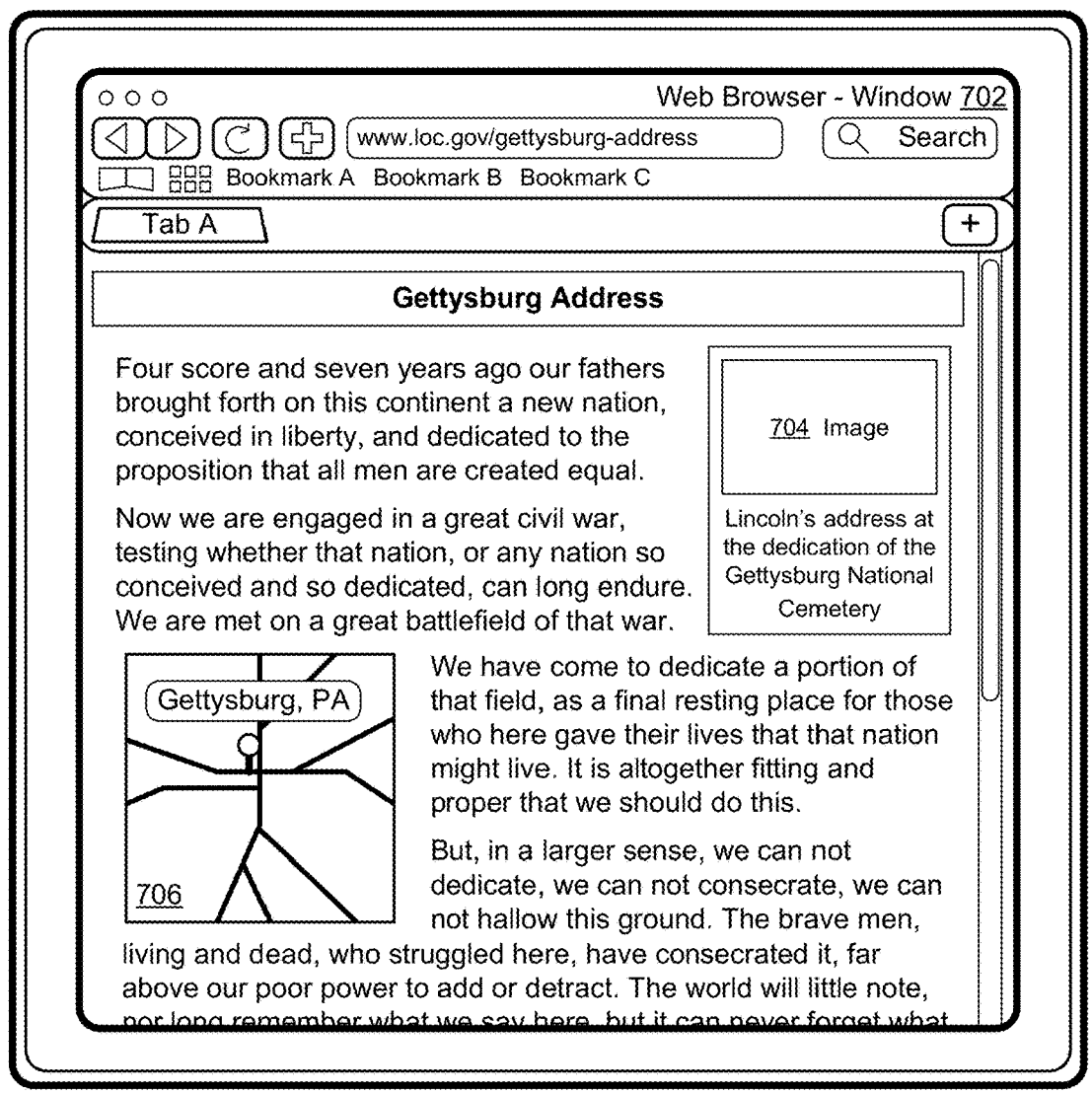
FIGS. 7A-7RRR illustrate example user interfaces for adding annotations to an annotation layer in accordance with some embodiments.
Figure 7R:
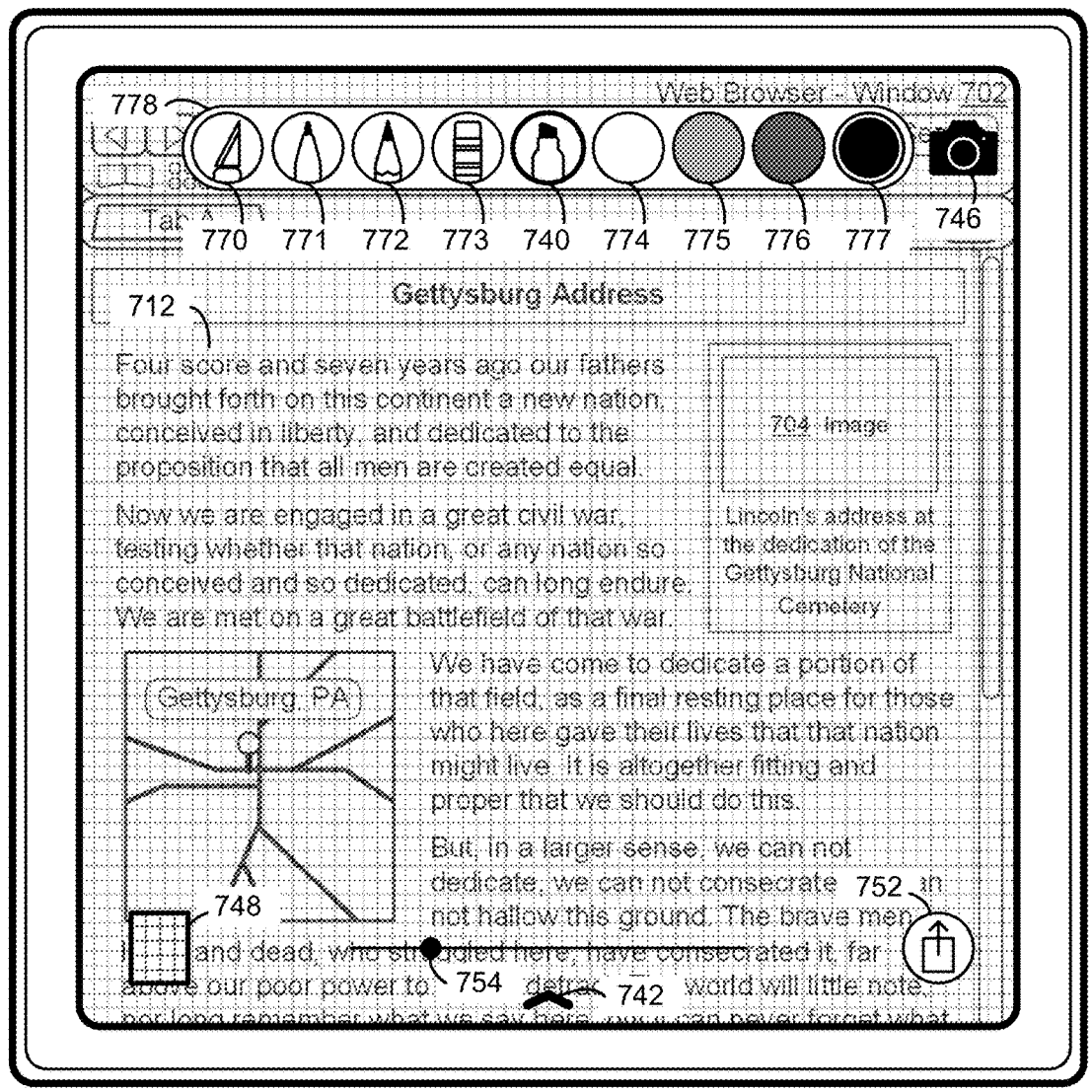
Figure 8A:
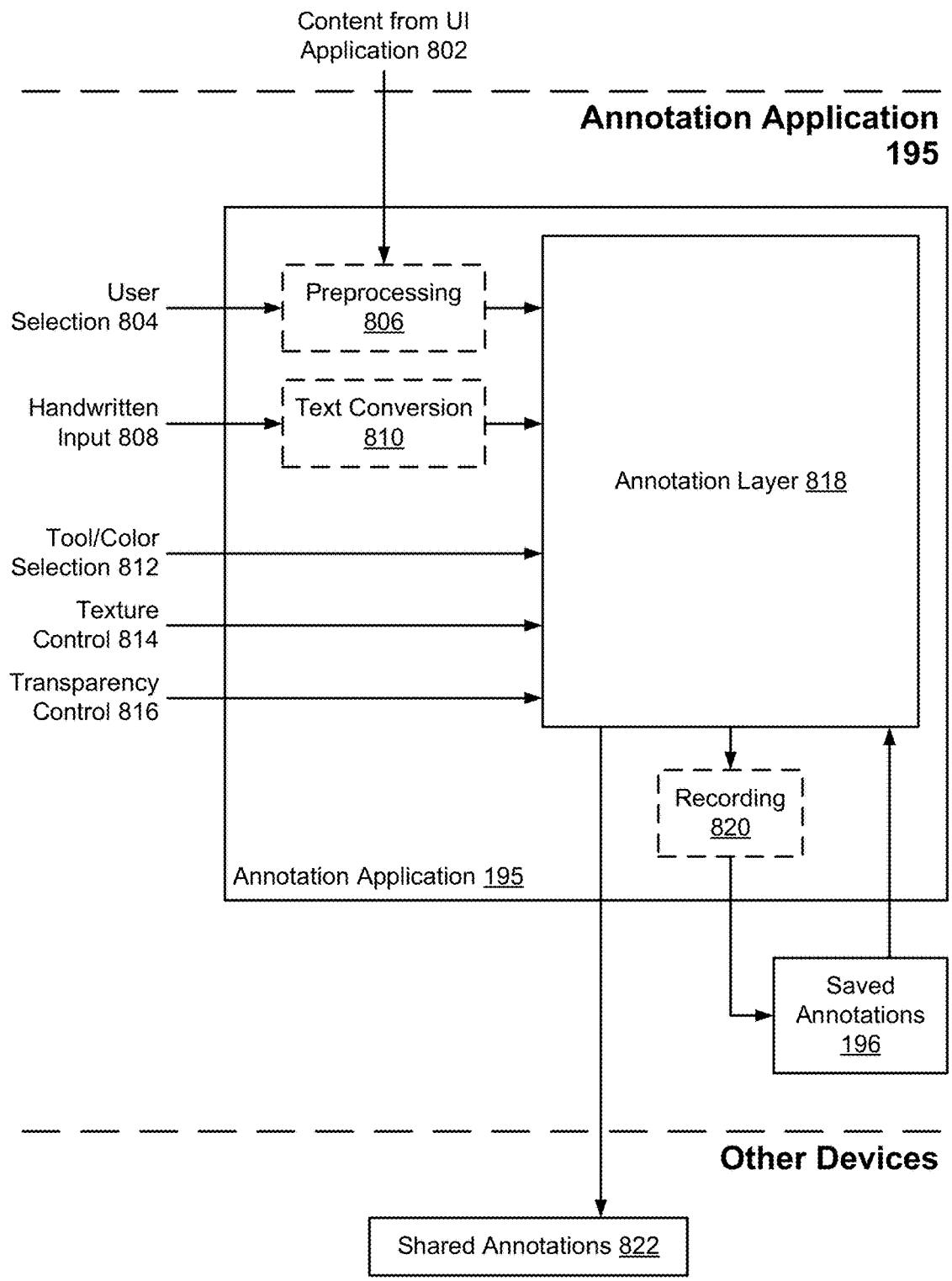
FIG. 8A is a block diagram of an annotation application in accordance with some embodiments.
Figure 8B:
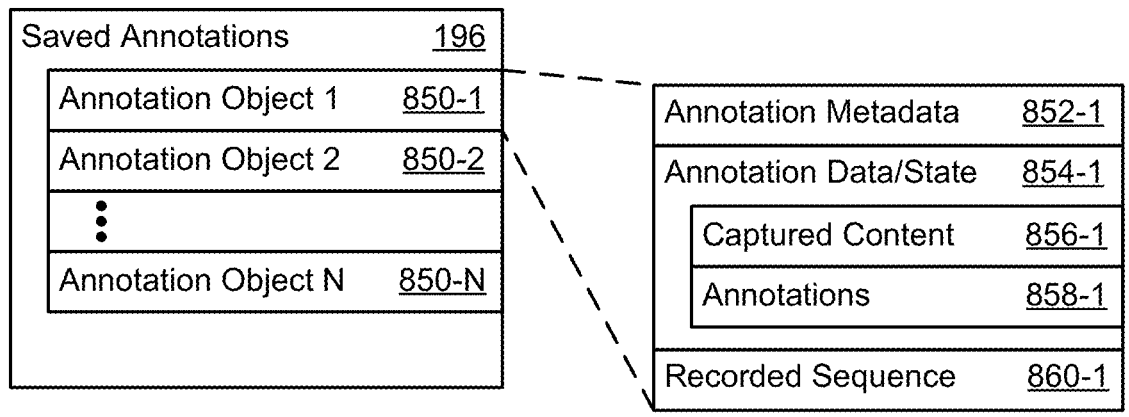
FIG. 8B is a block diagram illustrating example components for saved annotation layers in accordance with some embodiments.
Figure 9A:
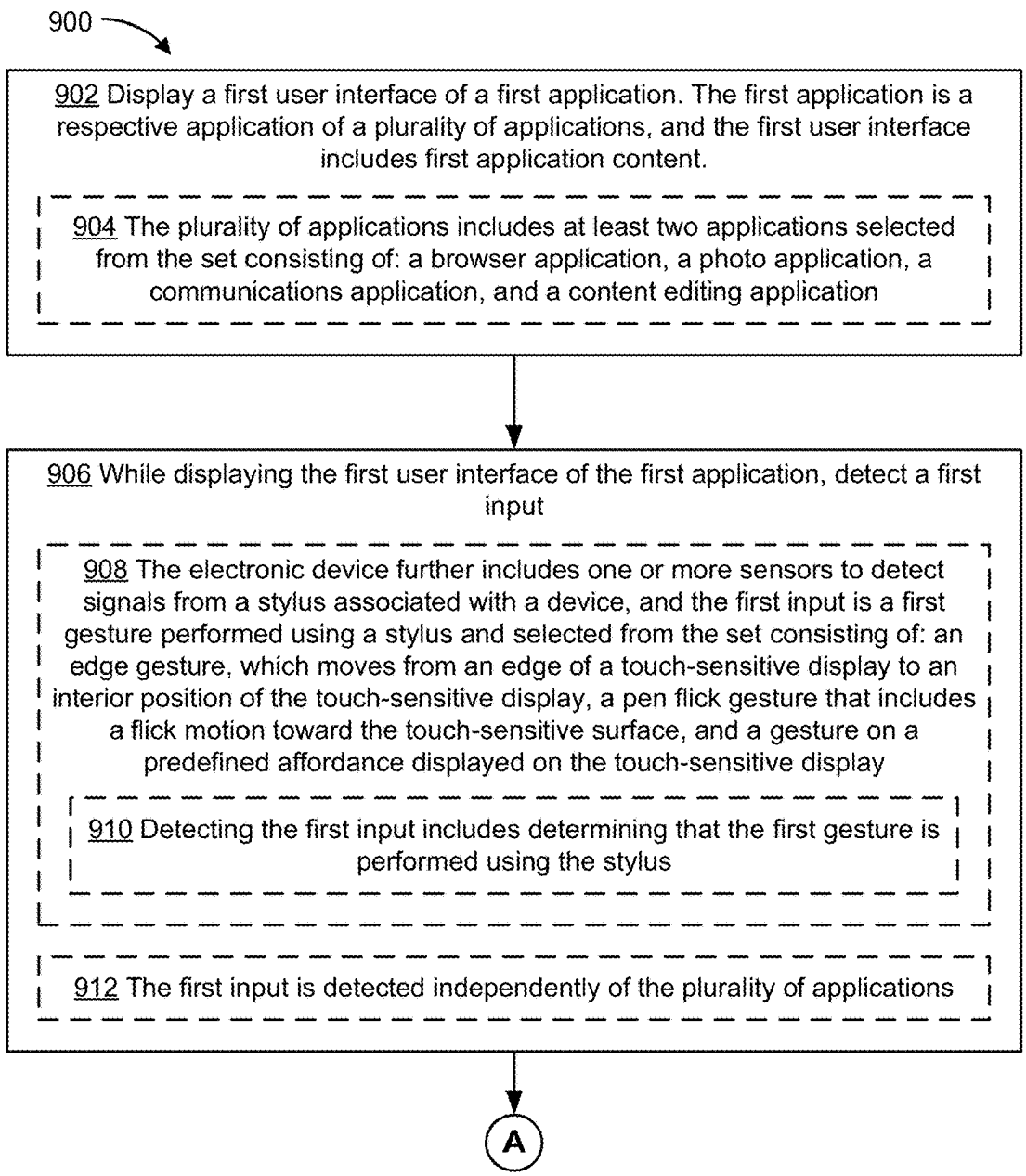

Below, FIGS. 1A-1B, 2, 3, 4, 5A-5B, and 6A-6B provide a description of example devices. FIGS. 7A-7RRR illustrate example user interfaces for adding annotations to an annotation layer. FIGS. 8A-8B are example block diagrams of an annotation application and associated annotation layers. FIGS. 9A-9E are flow diagrams illustrating a method of adding annotations to an annotation layer. The user interfaces in FIGS. 7A-7RRR are used to illustrate the processes in FIGS. 9A-9E.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
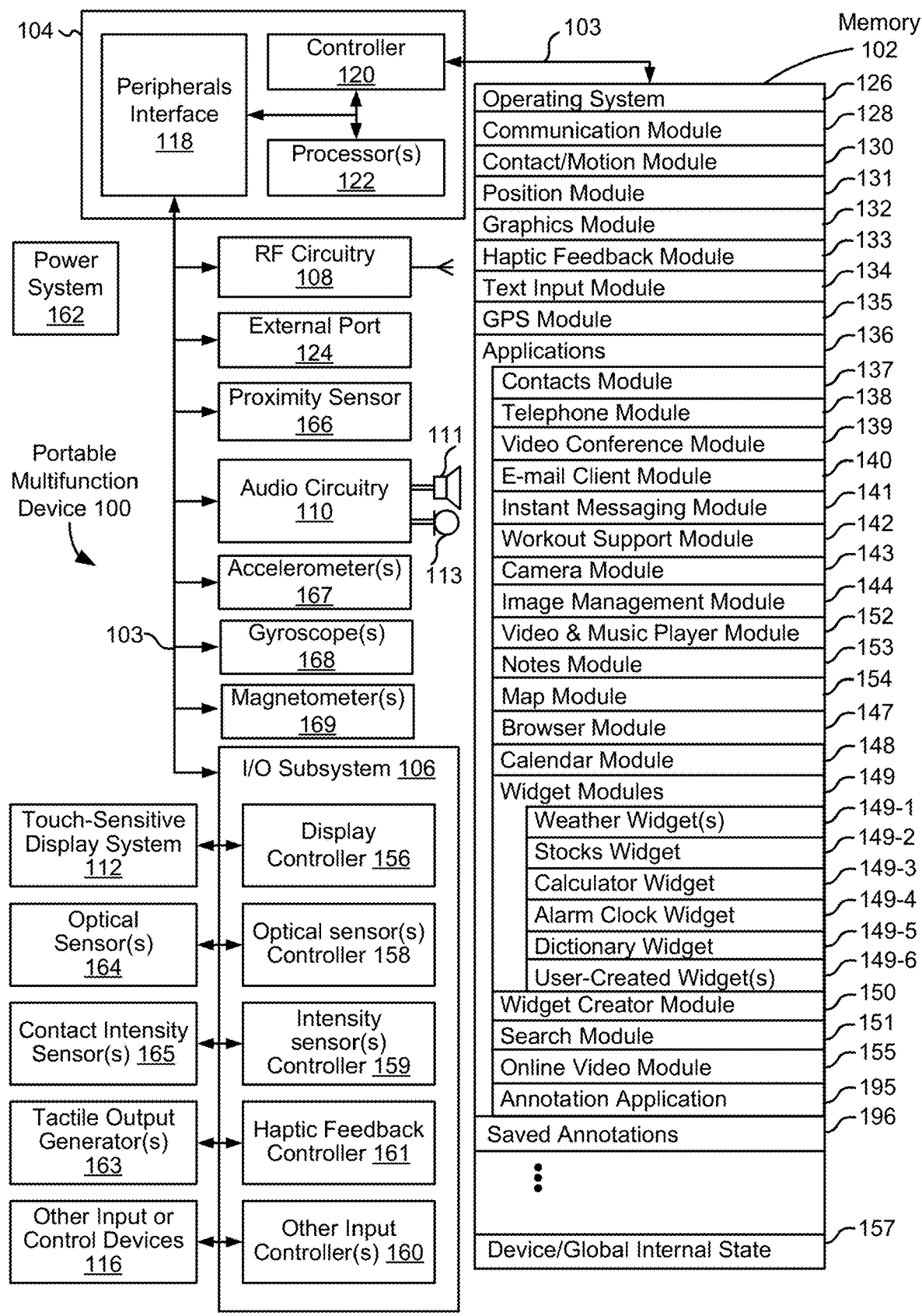
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, position module (or set of instructions) 131, graphics module (or set of instructions)

Figure 3:
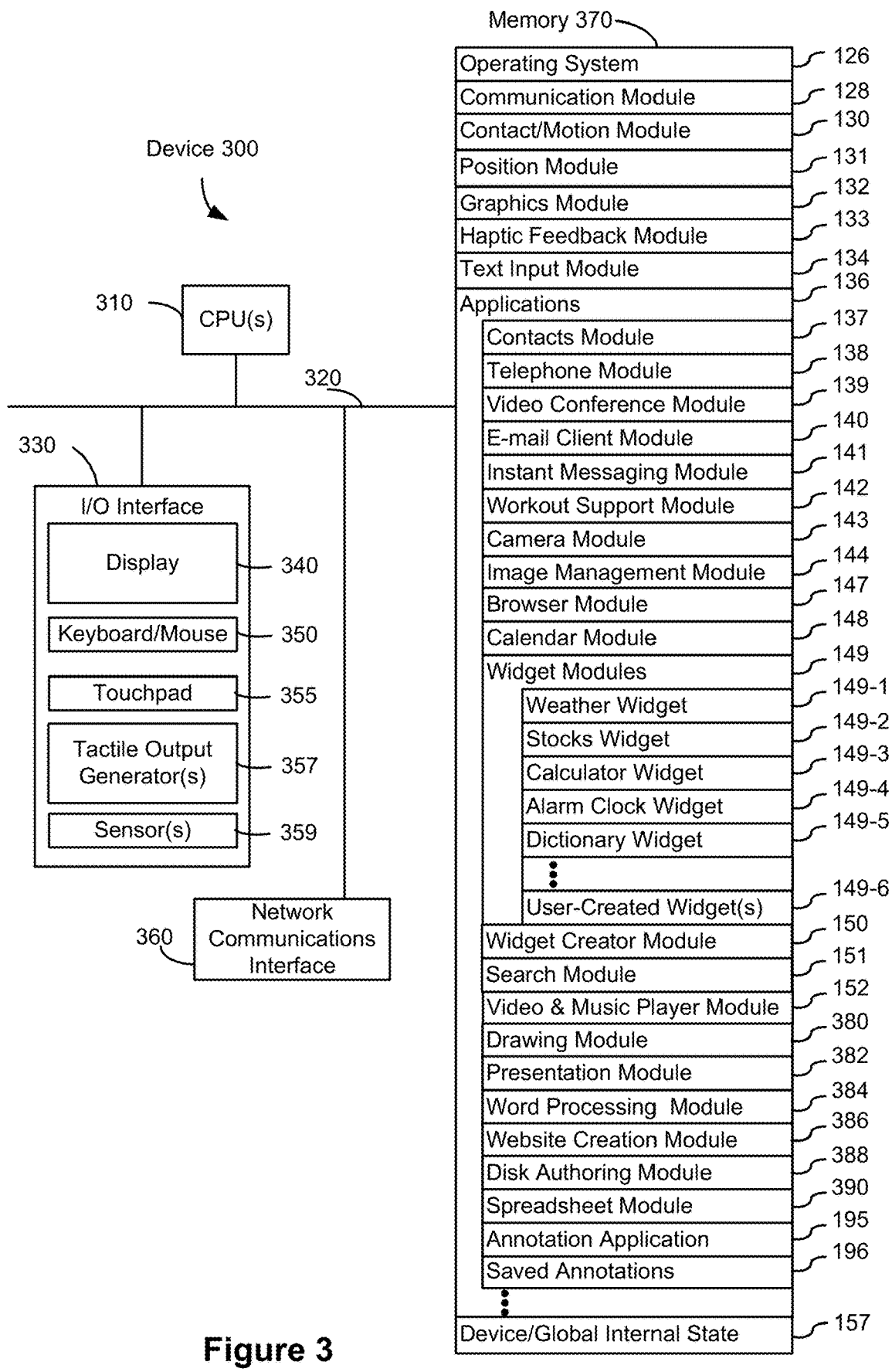
FIG. 3 is a block diagram of an example multifunction device with a display and a touch-sensitive surface in accordance with some embodiments.

132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 130 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);

telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154;
online video module 155; and/or
annotation application 195, which is used for providing annotations to user interfaces and optionally storing and/or accessing saved annotations 196 in memory 102.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
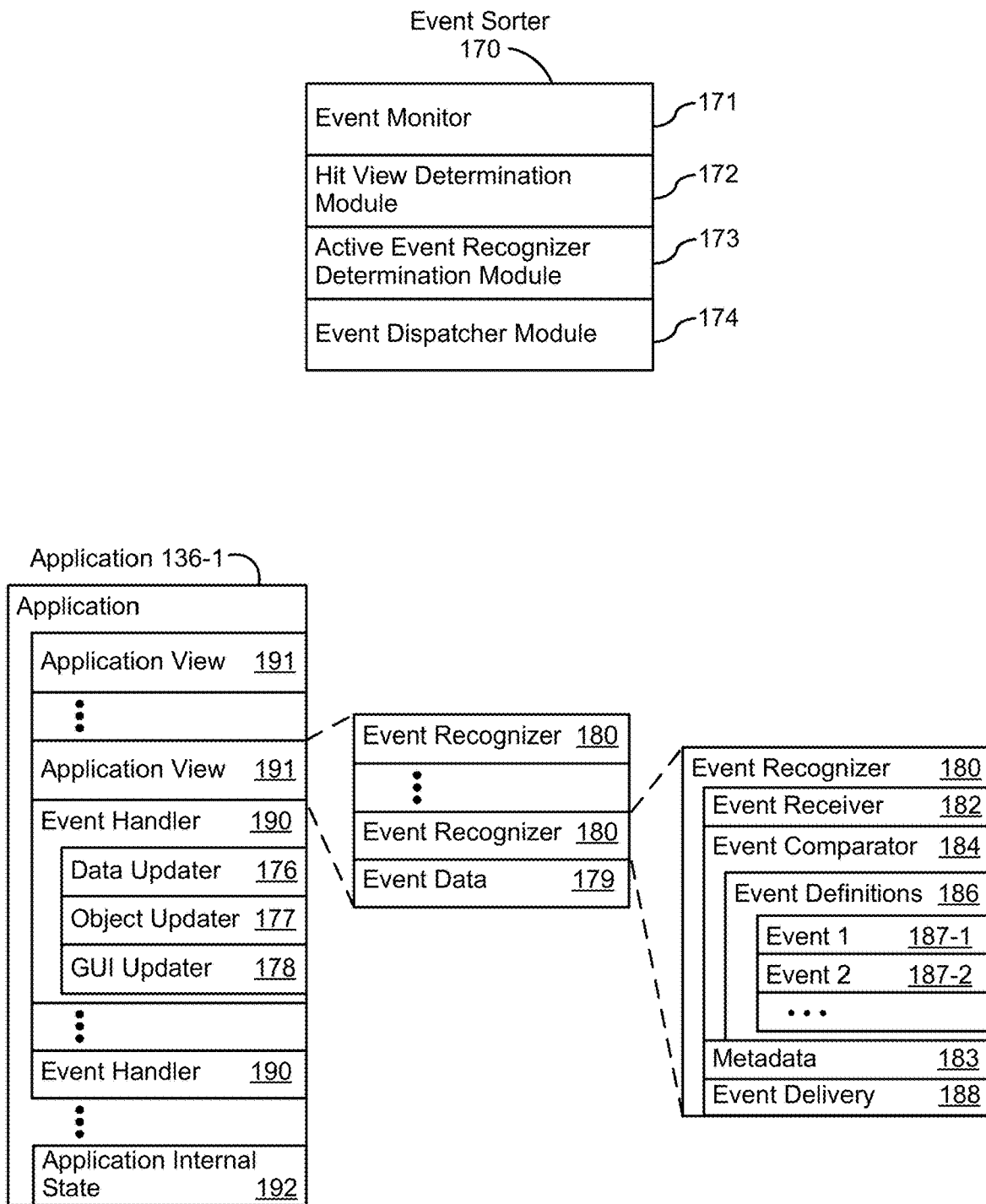
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
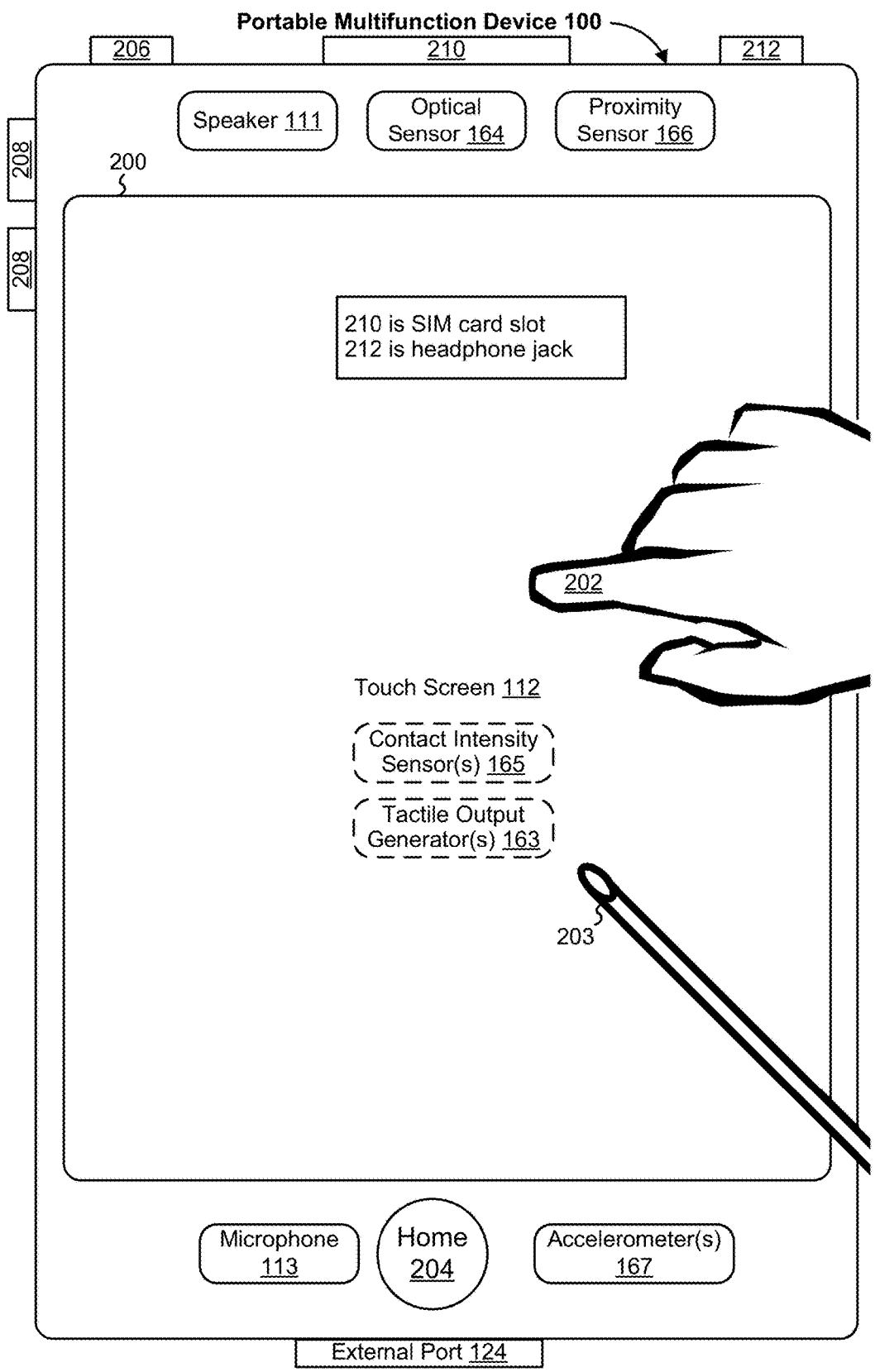
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
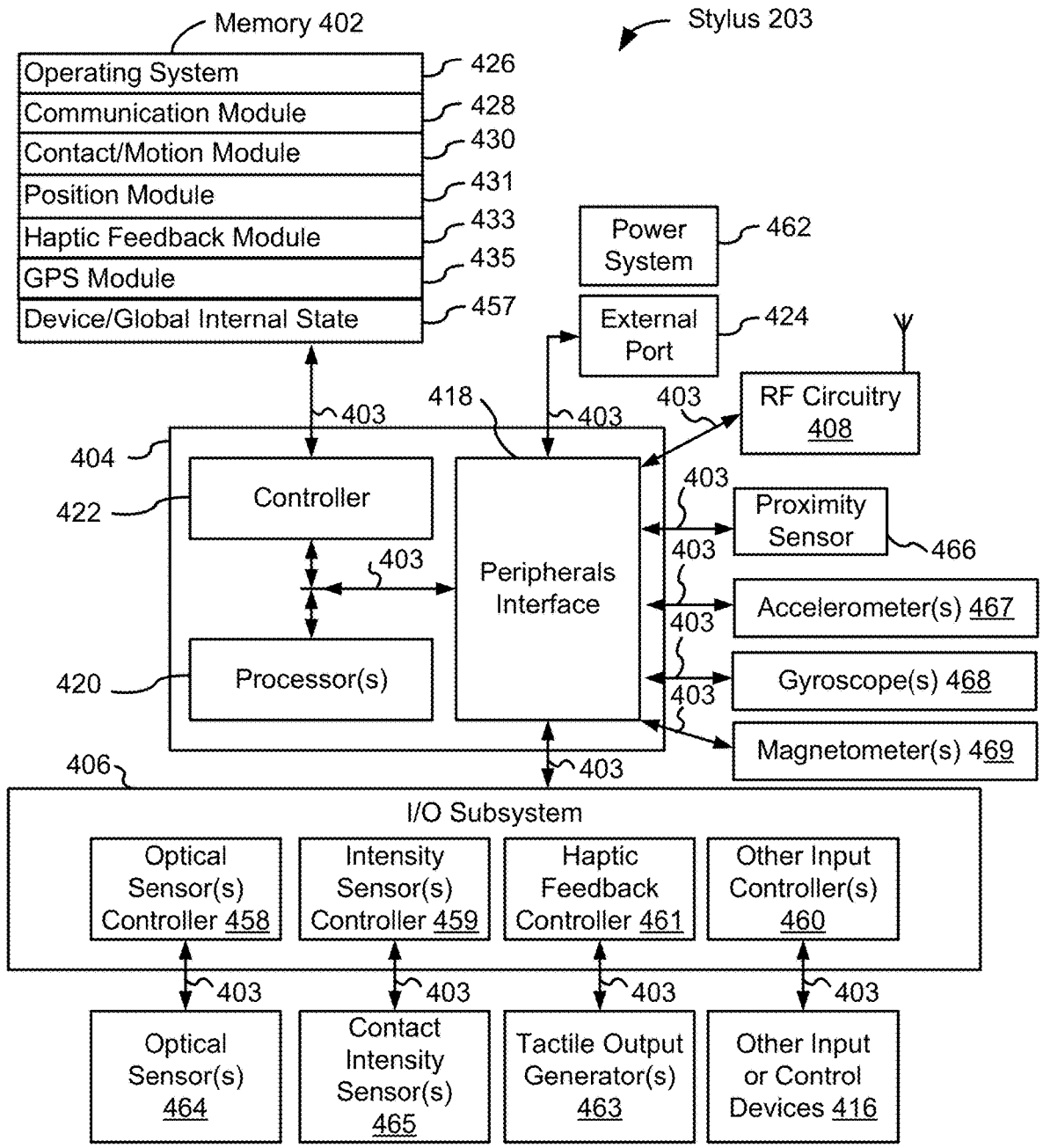
FIG. 4 is a block diagram of an example electronic stylus in accordance with some embodiments.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensity of contacts of stylus 203 on device 100 (e.g., when stylus 203 is used with a touch-sensitive surface such as touch-sensitive display system 112 of device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of a device (e.g., device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components.

The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 receive/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 receive light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 receive contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 463 receive tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 469 (e.g., as part of an inertial measurement unit (IMU)) for obtaining information concerning the location and positional state of stylus 203. FIG. 4 shows sensors 467, 468, and 469 coupled with peripherals interface 418. Alternately, sensors 467, 468, and 469 are, optionally, coupled with an input controller 460 in I/O subsystem 406. Stylus 203 optionally includes a GPS (or GLONASS or other global navigation system) receiver (not shown) for obtaining information concerning the location of stylus 203.

Figure 5A:
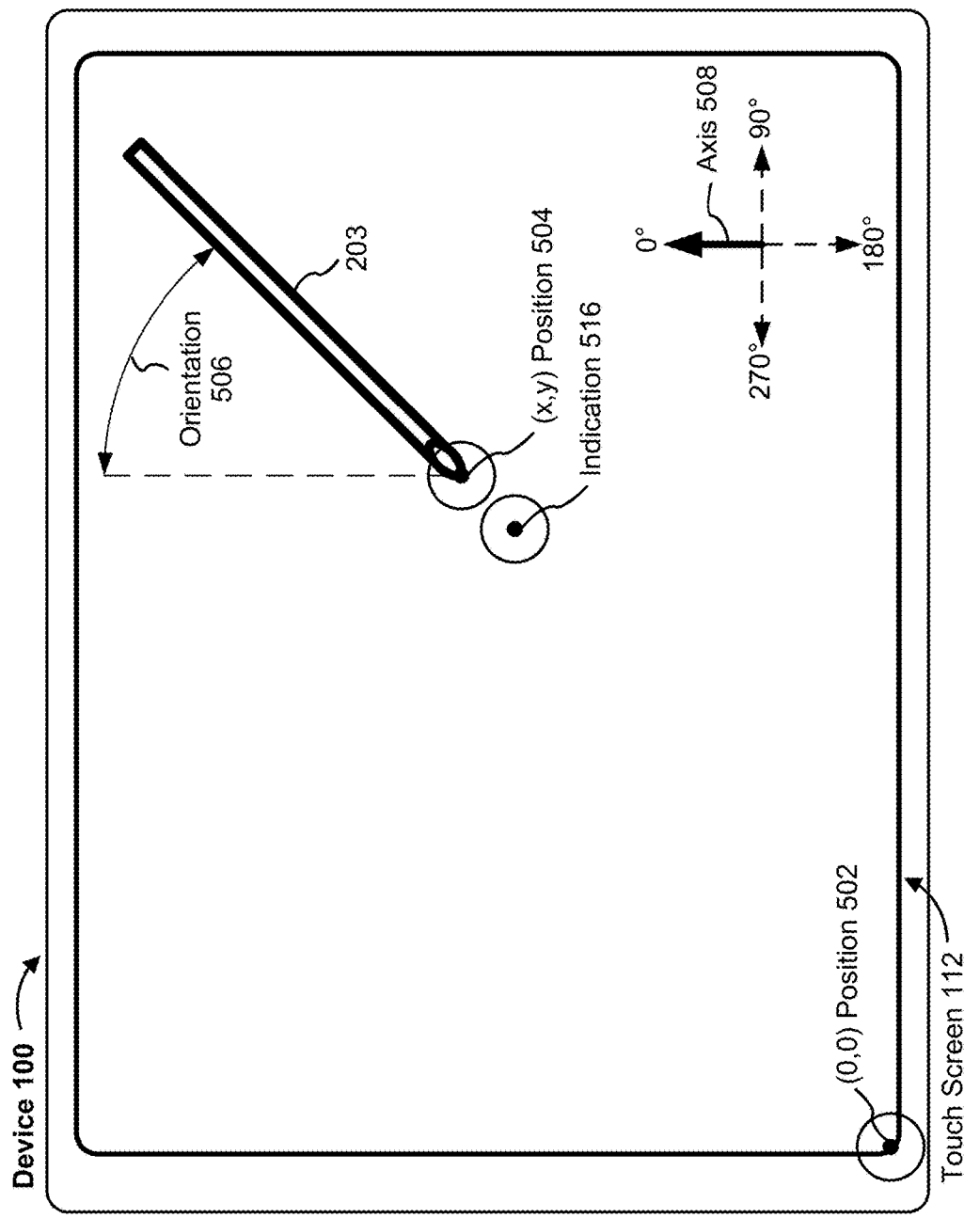
FIGS. 5A-5B illustrate a positional state of a stylus relative to a touch-sensitive surface in accordance with some embodiments.
Figure 5A:
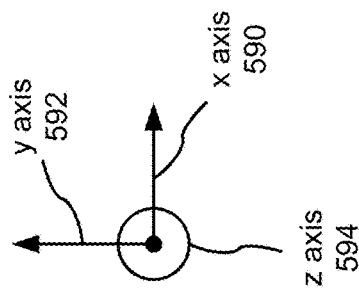
Figure 5B:
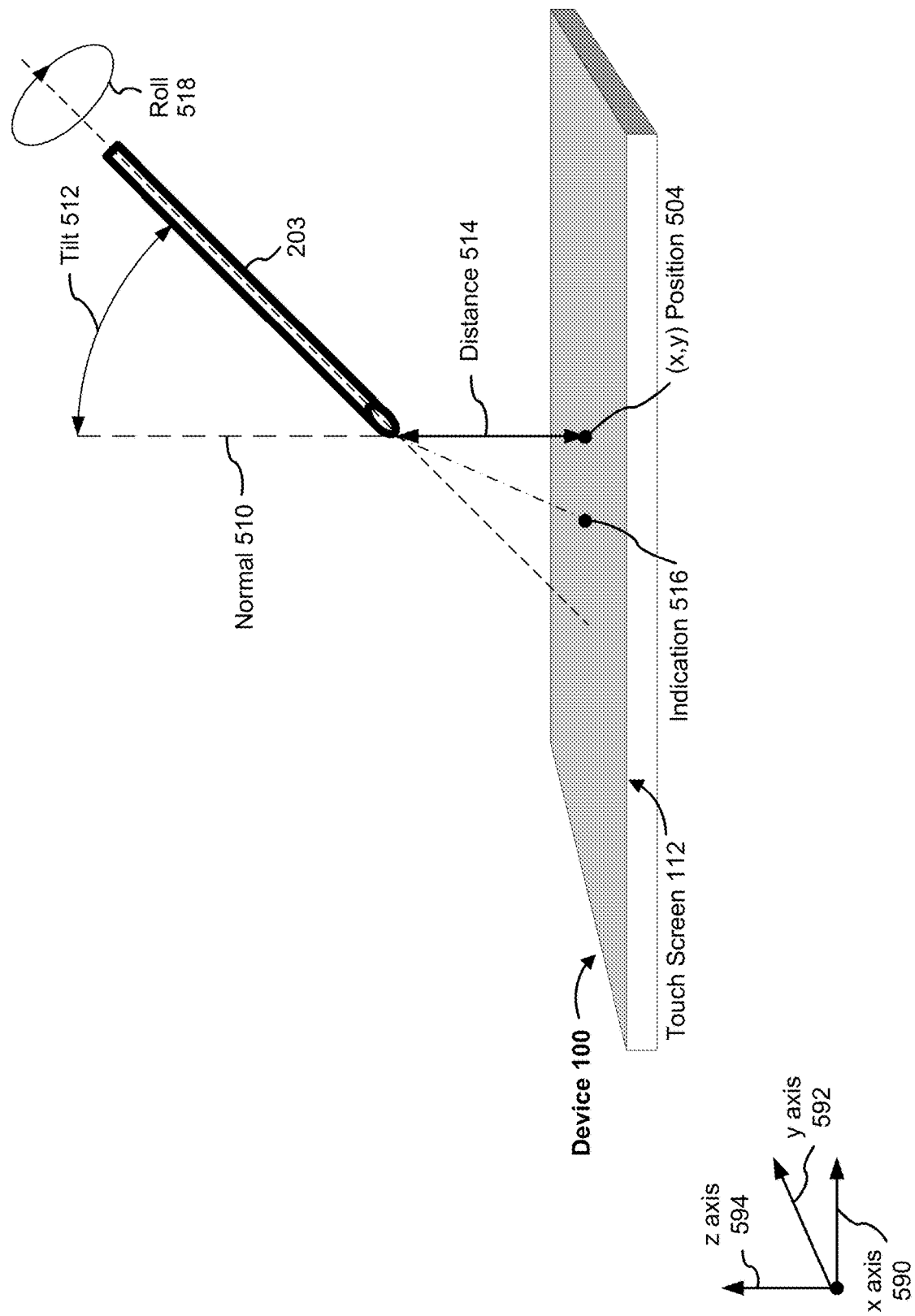

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to a device (e.g., device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of device 100), and determining if the contact has ceased (e.g., detecting a lift-off event or a break in contact). In some embodiments, contact/motion module 430 receives contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431, in conjunction with accelerometers 467, gyroscopes 468, and/or magnetometers 469, optionally detects stylus movement gestures, such as flicks, taps, and rolls of the stylus. Position module 431 includes software components for performing various operations related to detecting the position of the stylus and detecting changes to the position of the stylus in a particular frame of reference. In some embodiments, position module 431 detects the positional state of the stylus relative to the device and detects changes to the positional state of the stylus relative to the device. As noted above, in some embodiments, device 100 or 300 determines the positional state of the stylus relative to the device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., device 100). For example, the stylus measures the tilt (e.g., tilt 512, FIG. 5B) and/or the orientation (e.g., orientation 506, FIG. 5A) of the stylus and sends the measurement to device 100. In some embodiments, the positional state is detected in accordance with raw output, from one or more electrodes in the stylus, that is sensed by a touch-sensitive surface (e.g., touch screen 112 of device 100) instead of, or in combination with positional state detected in accordance with one or more measurements from stylus 203. For example, the touch-sensitive surface receives raw output from one or more electrodes in the stylus and calculates the tilt and/or the orientation of the stylus based on the raw output (optionally, in conjunction with positional state information provided by the stylus based on sensor measurements generated by the stylus).

FIG. 5A illustrates stylus 203 relative to a touch-sensitive surface (e.g., touch screen 112 of device 100) from a viewpoint directly above the touch-sensitive surface, in accordance with some embodiments. In FIG. 5A, z axis 594 points out of the page (i.e., in a direction normal to a plane of touch screen 112), x axis 590 is parallel to a first edge (e.g., a length) of touch screen 112, y axis 592 is parallel to a second edge (e.g., a width) of touch screen 112, and y axis 592 is perpendicular to x axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x axis 590 and y axis 592, as shown in FIG. 5A, or a pair of axes associated with an application displayed on touch screen 112).

In some embodiments, an indication (e.g., indication 516) is displayed on a touch-sensitive display (e.g., touch screen 112 of device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels.

FIG. 5B illustrates stylus 203 relative to a touch-sensitive surface (e.g., touch screen 112 of device 100) from a side viewpoint of the touch-sensitive surface, in accordance with some embodiments. In FIG. 5B, z axis 594 points in a direction normal to the plane of touch screen 112, x axis 590 is parallel to a first edge (e.g., a length) of touch screen 112, y axis 592 is parallel to a second edge (e.g., a width) of touch screen 112, and y axis 592 is perpendicular to x axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. Similarly, a "z axis" is distinct from the "x axis" and the "y axis," and is typically perpendicular to both the "x axis" and the "y axis."

Further, FIG. 5B illustrates roll 518, a rotation about the length (long axis) of stylus 203.

Attention is now directed towards embodiments of user interfaces ("UI") that are, optionally, implemented on portable multifunction device 100.

Figure 6A:
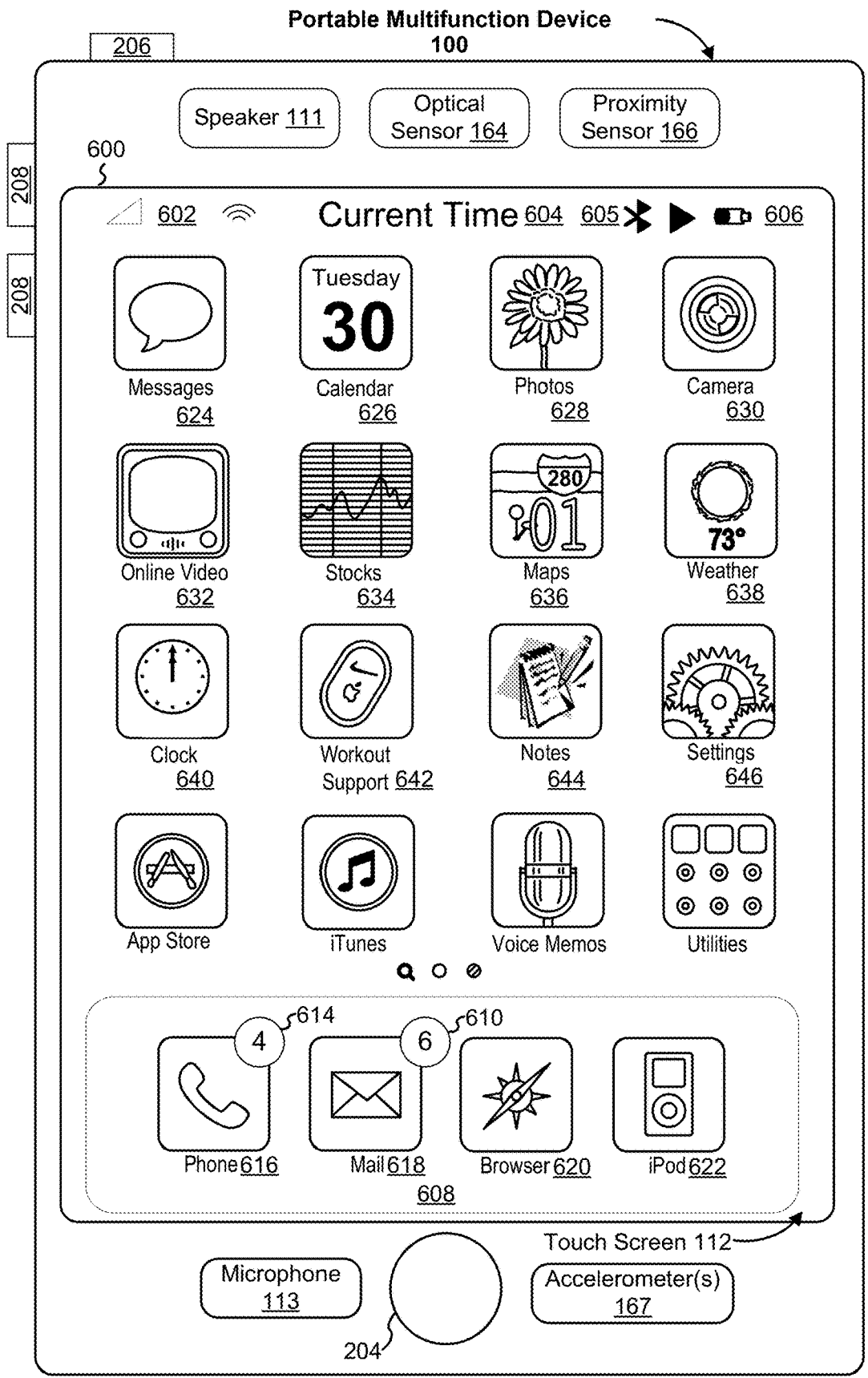
FIG. 6A illustrates an example user interface for a menu of applications on a portable multifunction device in accordance with some embodiments.

FIG. 6A illustrates an exemplary user interface for a menu of applications on portable multifunction device 100 in accordance with some embodiments. Similar user interfaces are, optionally, implemented on device 300. In some embodiments, user interface 600 includes the following elements, or a subset or superset thereof:

Signal strength indicator(s) 602 for wireless communication(s), such as cellular and Wi-Fi signals;
Time 604;
Bluetooth indicator 605;
Battery status indicator 606;
Tray 608 with icons for frequently used applications, such as:
  Icon 616 for telephone module 138, labeled "Phone," which optionally includes an indicator 614 of the number of missed calls or voicemail messages;
  Icon 618 for e-mail client module 140, labeled "Mail," which optionally includes an indicator 610 of the number of unread e-mails;
  Icon 620 for browser module 147, labeled "Browser;" and
  Icon 622 for video and music player module 152, also referred to as iPod® (trademark of Apple Inc.) module 152, labeled "iPod;" and
Icons for other applications, such as:
  Icon 624 for IM module 141, labeled "Messages;"
  Icon 626 for calendar module 148, labeled "Calendar;"
  Icon 628 for image management module 144, labeled "Photos;"
  Icon 630 for camera module 143, labeled "Camera;"
  Icon 632 for video editing module 155, labeled "Video Editing;"
  Icon 634 for stocks widget 149-2, labeled "Stocks;"
  Icon 636 for map module 154, labeled "Maps;"
  Icon 638 for weather widget 149-1, labeled "Weather;"
  Icon 640 for alarm clock widget 149-4, labeled "Clock;"
  Icon 642 for workout support module 142, labeled "Workout Support;"
  Icon 644 for notes module 153, labeled "Notes;" and
  Icon 646 for a settings application or module, which provides access to settings for device 100 and its various applications 136.

It should be noted that the icon labels illustrated in FIG. 6A are merely examples. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 6B:
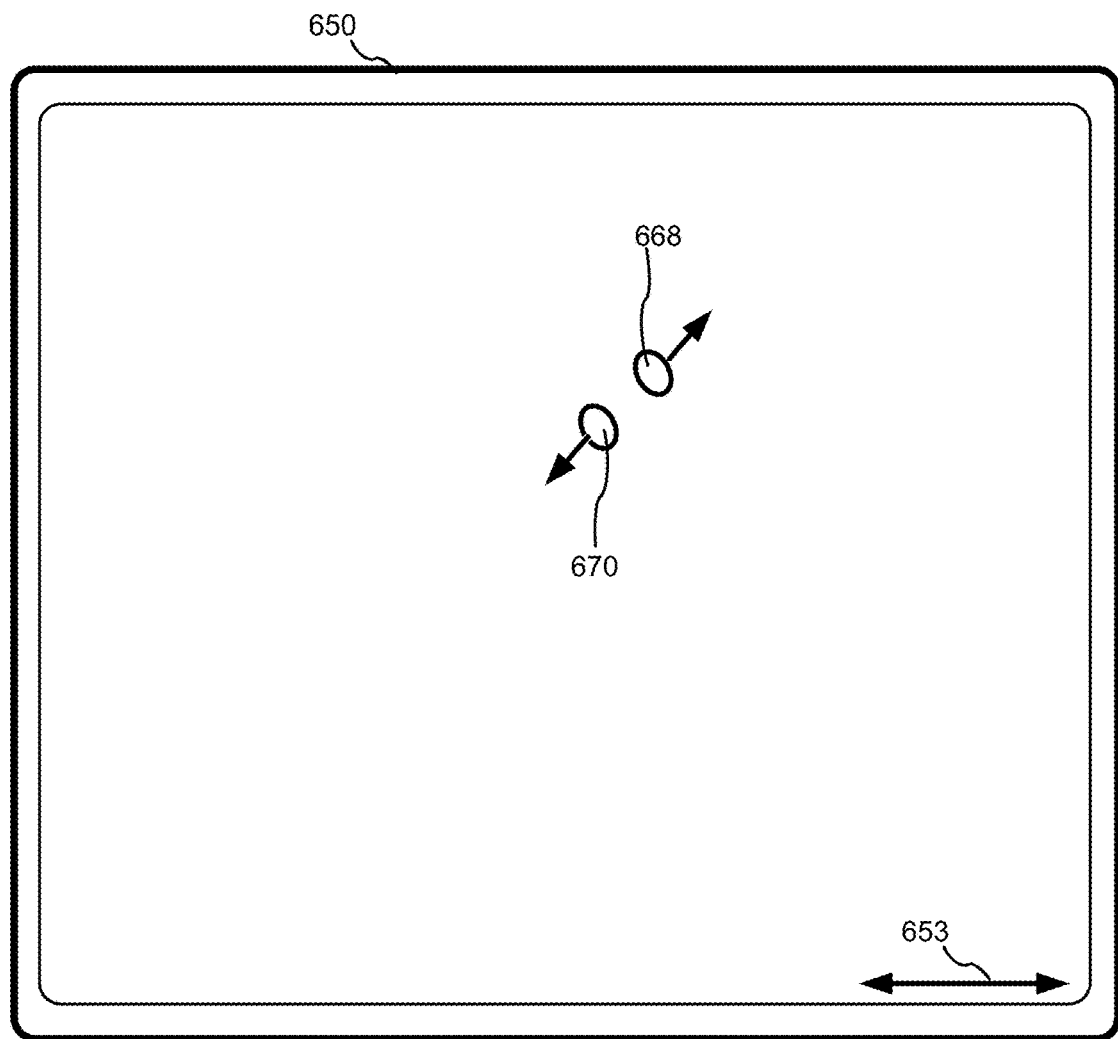
FIG. 6B illustrates an example user interface for a multifunction device with a touch-sensitive surface that is separate from the display in accordance with some embodiments.
Figure 6B:
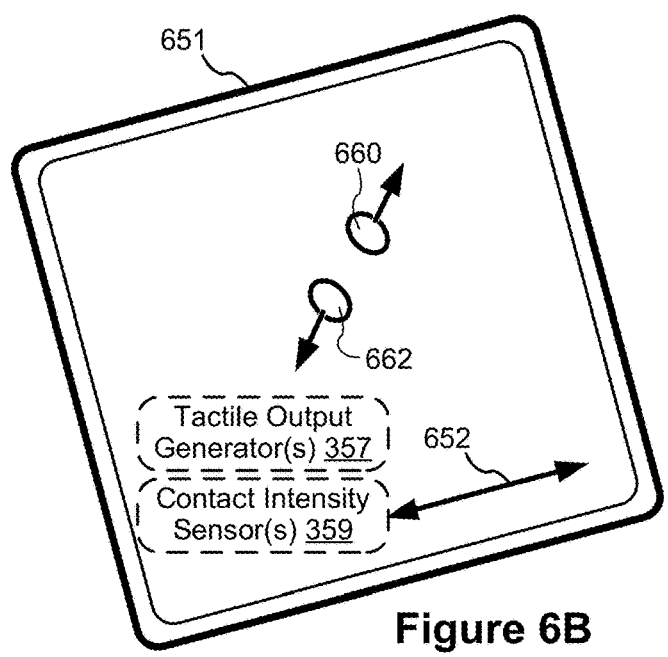

FIG. 6B illustrates an exemplary user interface on a device (e.g., device 300, FIG. 3) with a touch-sensitive surface 651 (e.g., a tablet or touchpad 355, FIG. 3) that is separate from the display 650. Device 300 also, optionally, includes one or more contact intensity sensors (e.g., one or more of sensors 359) for detecting intensity of contacts on touch-sensitive surface 651 and/or one or more tactile output generators 357 for generating tactile outputs for a user of device 300.

FIG. 6B illustrates an exemplary user interface on a device (e.g., device 300, FIG. 3) with a touch-sensitive surface 651 (e.g., a tablet or touchpad 355, FIG. 3) that is separate from the display 650. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 6B. In some embodiments, the touch-sensitive surface (e.g., 651 in FIG. 6B) has a primary axis (e.g., 652 in FIG. 6B) that corresponds to a primary axis (e.g., 653 in FIG. 6B) on the display (e.g., 650). In accordance with these embodiments, the device detects contacts (e.g., 660 and 662 in FIG. 6B) with the touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the device on the touch-sensitive surface (e.g., 651 in FIG. 6B) are used by the device to manipulate the user interface on the display (e.g., 650 in FIG. 6B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.) and/or stylus inputs, it should be understood that, in some embodiments, one or more of the finger inputs are replaced with input from another input device (e.g., a mouse based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts (or stylus contacts) are, optionally, used simultaneously.

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact.

Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold.

Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a touch-sensitive display and optionally one or more sensors to detect signals from a stylus associated with the device.

FIGS. 7A-7RRR illustrate example user interfaces for adding annotations to an annotation layer, in accordance with some embodiments. The user interfaces in these figures are used to illustrate the processes described below, including the processes in FIGS. 9A-9E. Although some of the examples which follow will be given with reference to inputs on a touch-screen display (where the touch-sensitive surface and the display are combined, for example on touch screen 112), in some embodiments, the device detects inputs on touch-sensitive surface 651 that is separate from display 650, as shown in FIG. 6B.

FIG. 7A illustrates user interface 702 on display 750, in accordance with some embodiments. In some embodiments, display 750 may be a touch-sensitive display (e.g., touch-sensitive display 112, FIG. 1A). In the example shown in FIGS. 7A-7SS, user interface 702 includes a user interface of a web browser application (e.g., browser module 147, FIG. 1A). The user interface of the web browser application includes display of a portion of a web page that includes image 704 and map 706.

Figure 7B:
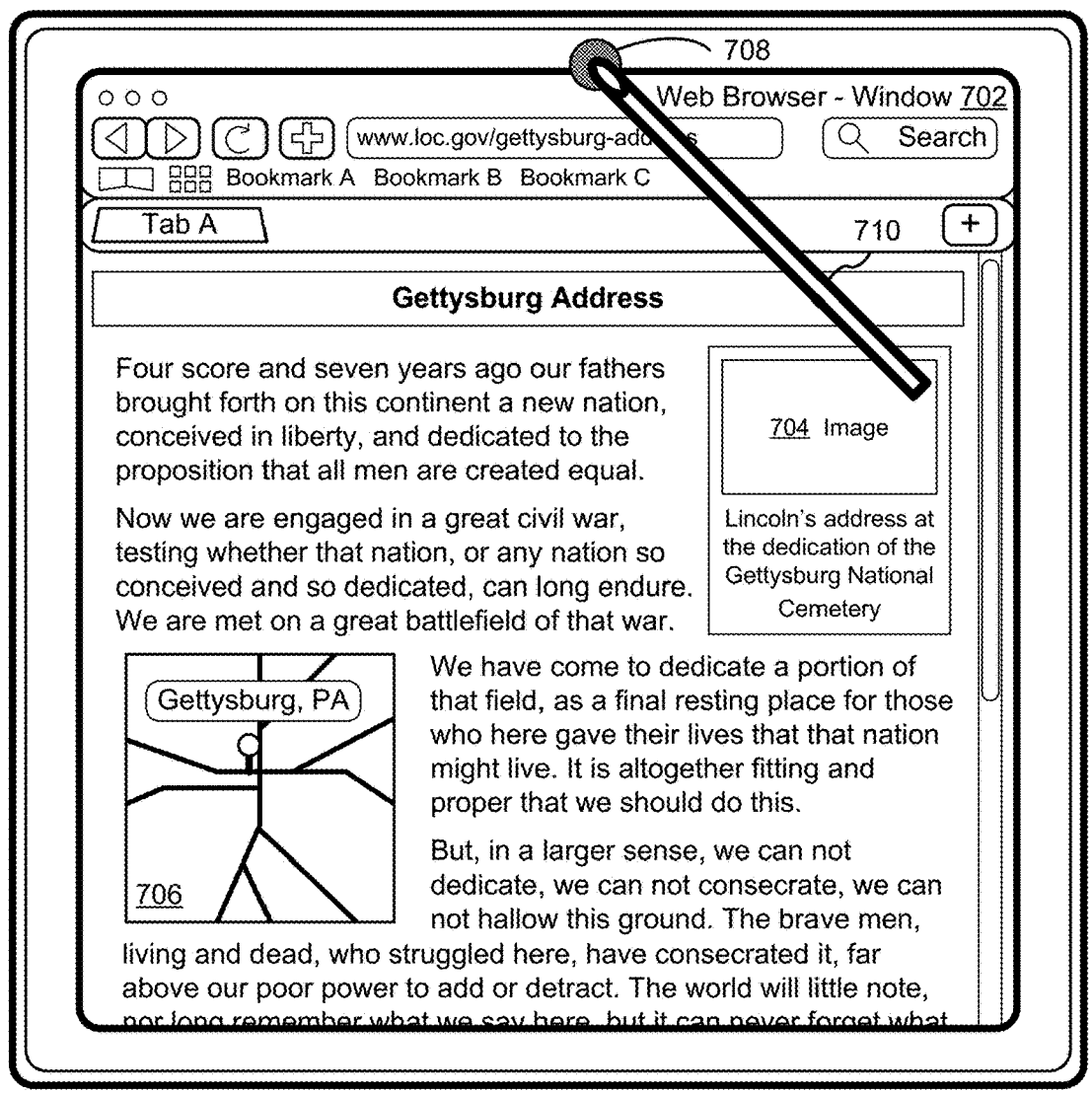
Figure 7C:
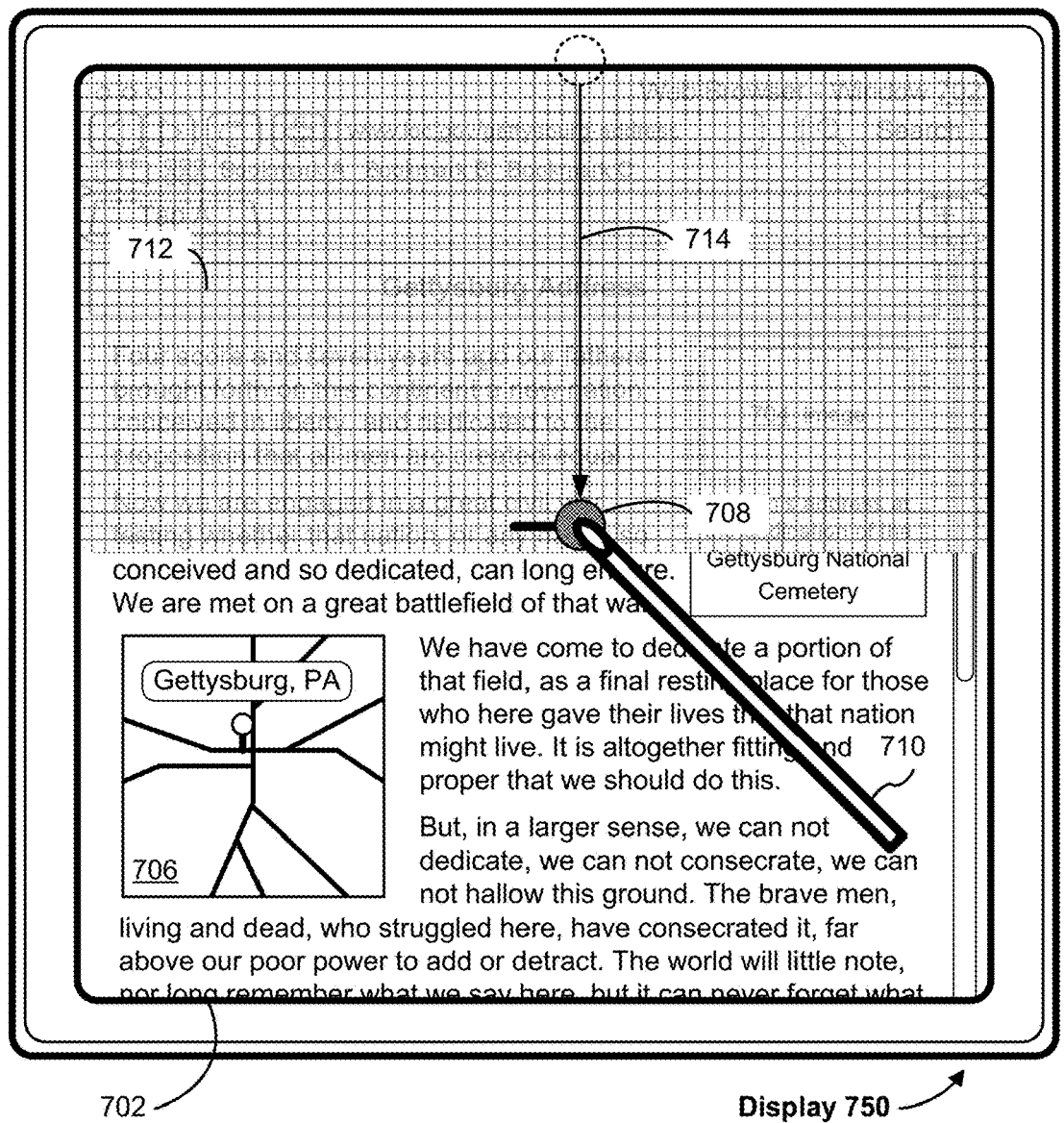

FIGS. 7B-7C illustrate a transition of user interface 702 from user interface 702 in FIG. 7A. In particular, FIGS. 7B-7C illustrate user input 708 detected while displaying user interface 702 of the web browser application, and FIG. 7C also illustrates annotation layer 712 displayed in response to detecting user input 708. In some embodiments, annotation layer 712 is displayed in response to an input gesture, such as a drag gesture (e.g., a drag gesture that begins at or near an edge of display 750, such as a downward drag gesture that begins at or near the upper edge of display 750). For example, FIG. 7B shows an initial position (e.g., an initial contact position) of user input 708 by stylus 710 detected at or near the upper edge of display 750. FIG. 7C illustrates movement of user input 708 by stylus 710 from its initial position as shown in FIG. 7B along a path indicated by arrow 714. While user interface 702 of the web browser application continues to be displayed, annotation layer 712 is gradually displayed over at least a portion of user interface 702 as user input 708 by stylus 710 moves along the path indicated by arrow 714.

Figure 7D:
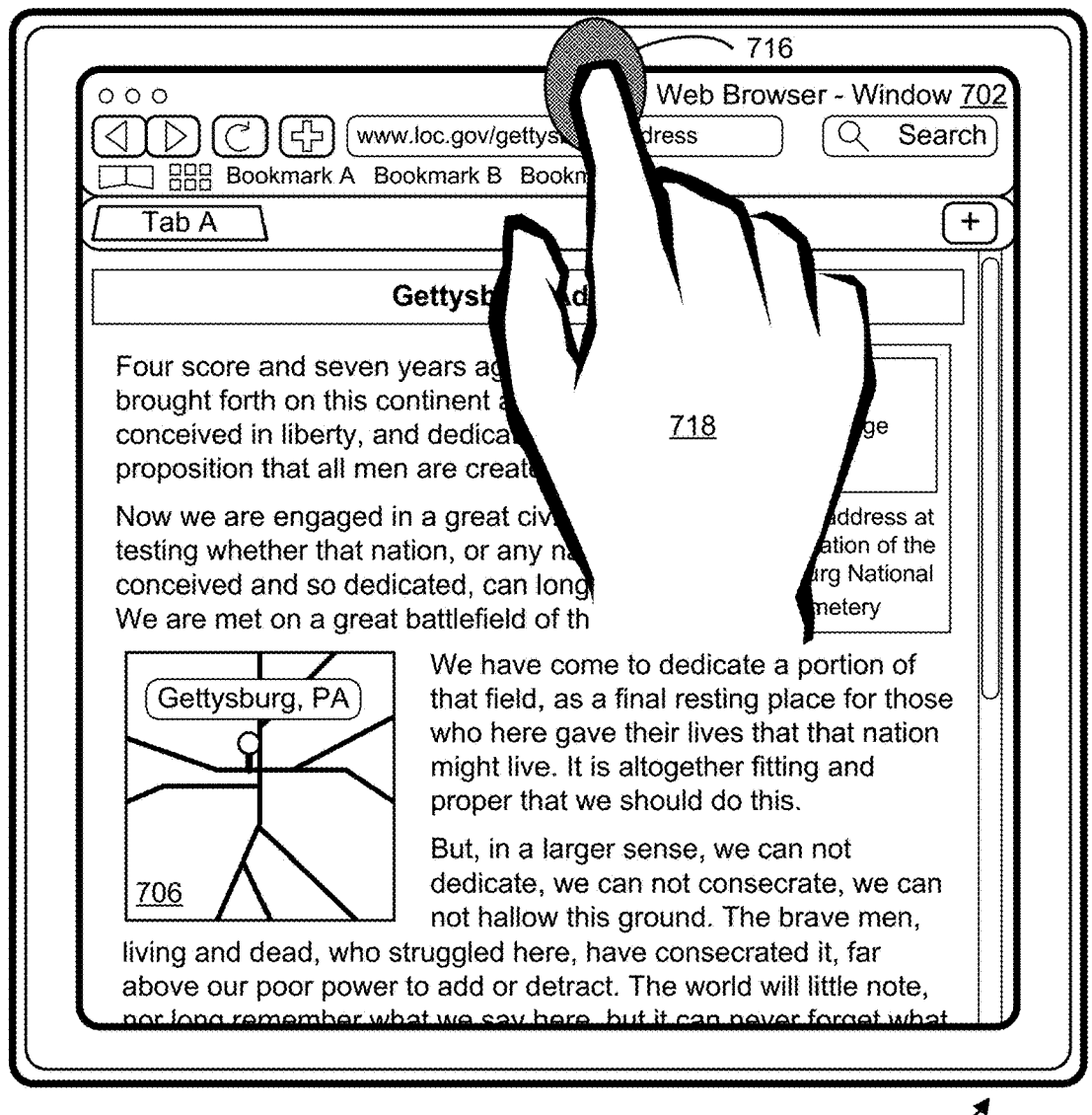
Figure 7E:
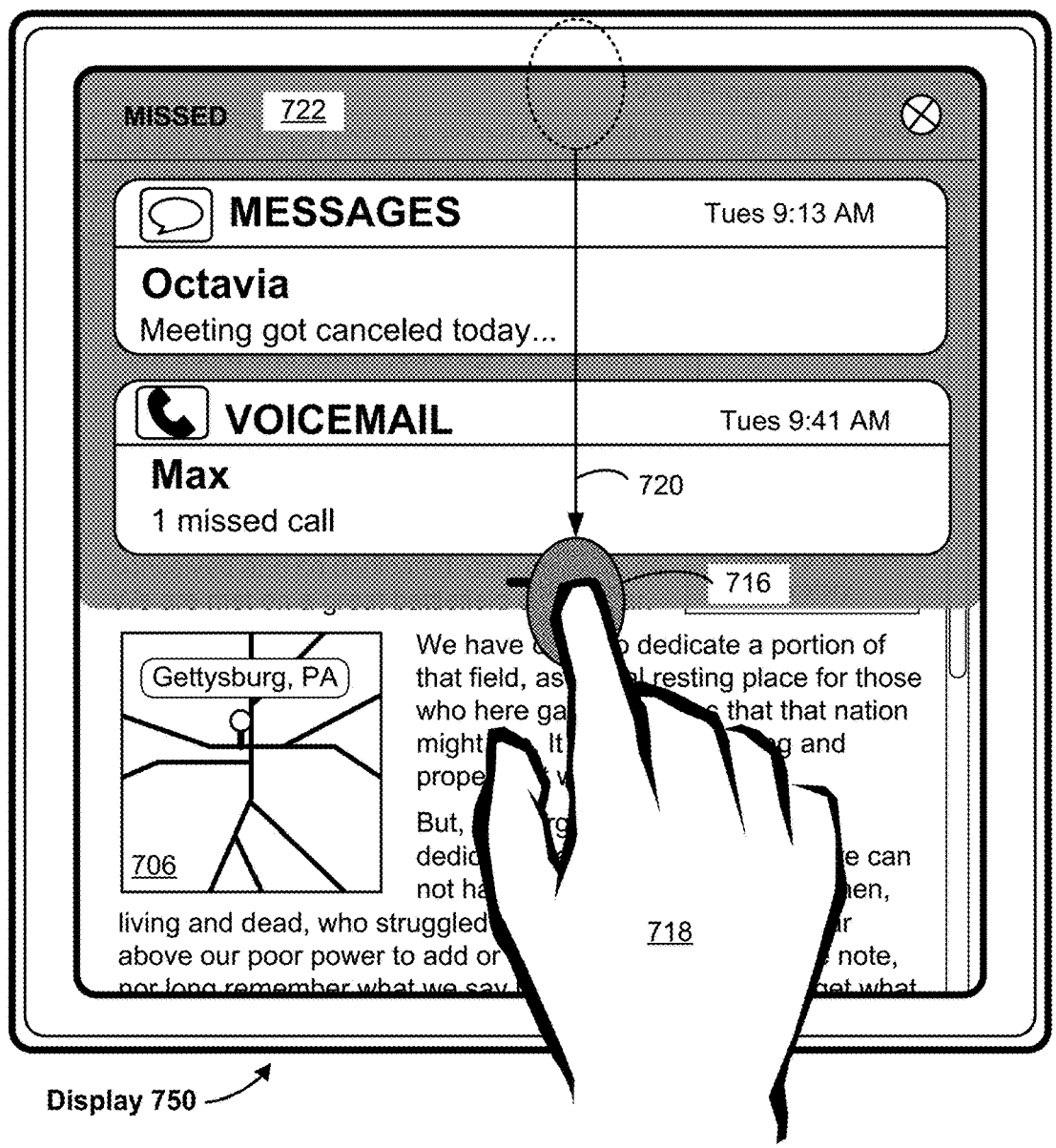

FIGS. 7D-7E illustrate an alternate transition of user interface 702 from user interface 702 in FIG. 7A. In particular, FIGS. 7D-7E illustrate alternate user input 716 detected while displaying user interface 702 of the web browser application as presented in FIG. 7A. FIG. 7D shows an initial position of user input 716 (e.g., a contact) by finger 718 detected at or near the upper edge of display 750. In response to movement of user input 716 by finger 718 from its initial position as shown in FIG. 7D along a path indicated by arrow 720, an annotation layer (e.g., annotation layer 712 shown in FIG. 7C) is not displayed. Instead, in some embodiments, a different user interface, such as notifications user interface 722, is gradually displayed over user interface 702 as user input 716 by finger 718 moves along the path indicated by arrow 720. In some embodiments, detecting a user input (e.g., an input gesture, such as a drag gesture from an edge of the display, or an input at a location corresponding to a control affordance for displaying the annotation layer) includes determining whether the user input is provided using a stylus (e.g., as shown in FIGS. 7B-7C), as opposed to, for example, a finger (e.g., as shown in FIGS. 7D-7E).

Figure 7F:
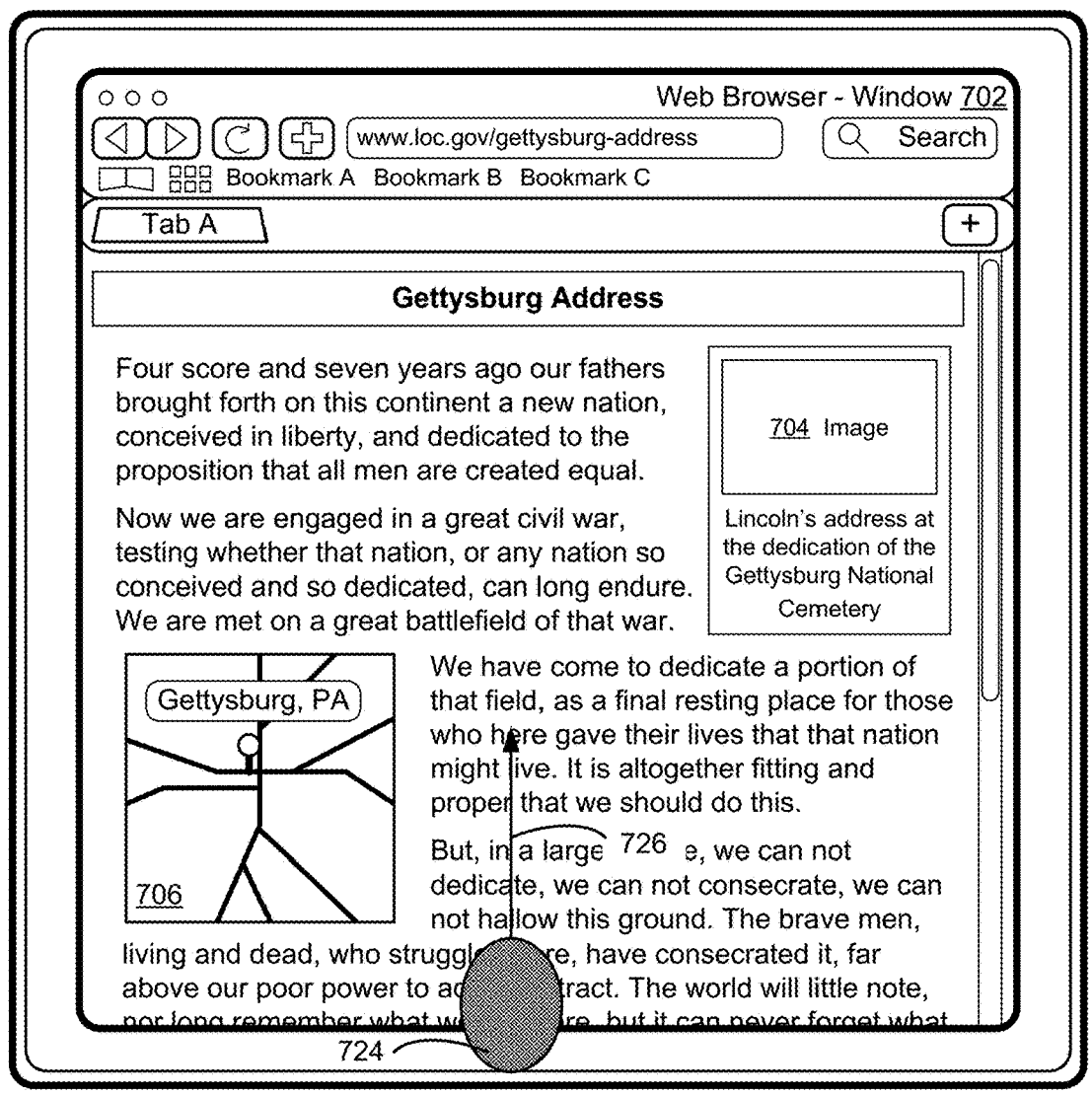
Figure 7G:
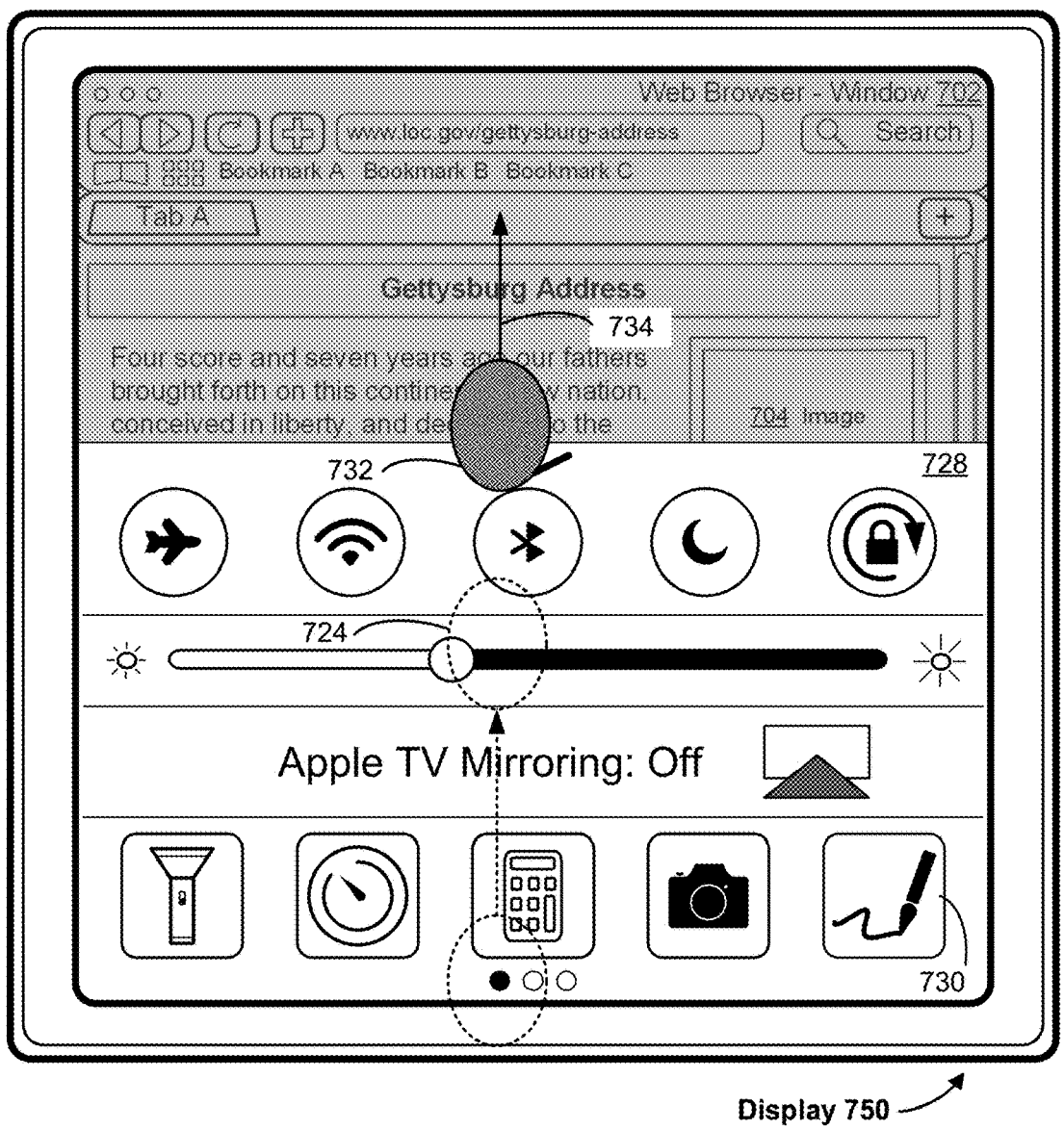

FIGS. 7F-7G illustrate yet another transition of user interface 702 from user interface 702 in FIG. 7A. FIG. 7F shows an initial position of input 724 (e.g., a contact) detected at or near the lower edge of display 750. In response to movement of input 724 from its initial position as shown in FIG. 7F along a path indicated by arrow 726, control user interface 728 that includes a plurality of control affordances is displayed, as shown in FIG. 7G. In some embodiments, the plurality of control affordances includes a control affordance for displaying the annotation layer, such as annotation icon 730. In some embodiments, in accordance with detecting an input (e.g., a tap gesture) at a location corresponding to annotation icon 730, an annotation layer is displayed. In some embodiments, after control user interface 728 is displayed in response to movement of the input, subsequent input 732 (e.g., a subsequent contact detected after liftoff of the contact by input 724) is detected, and, in response to movement of the subsequent input 732 along a path indicated by arrow 734, an annotation layer is displayed.

Figure 7H:
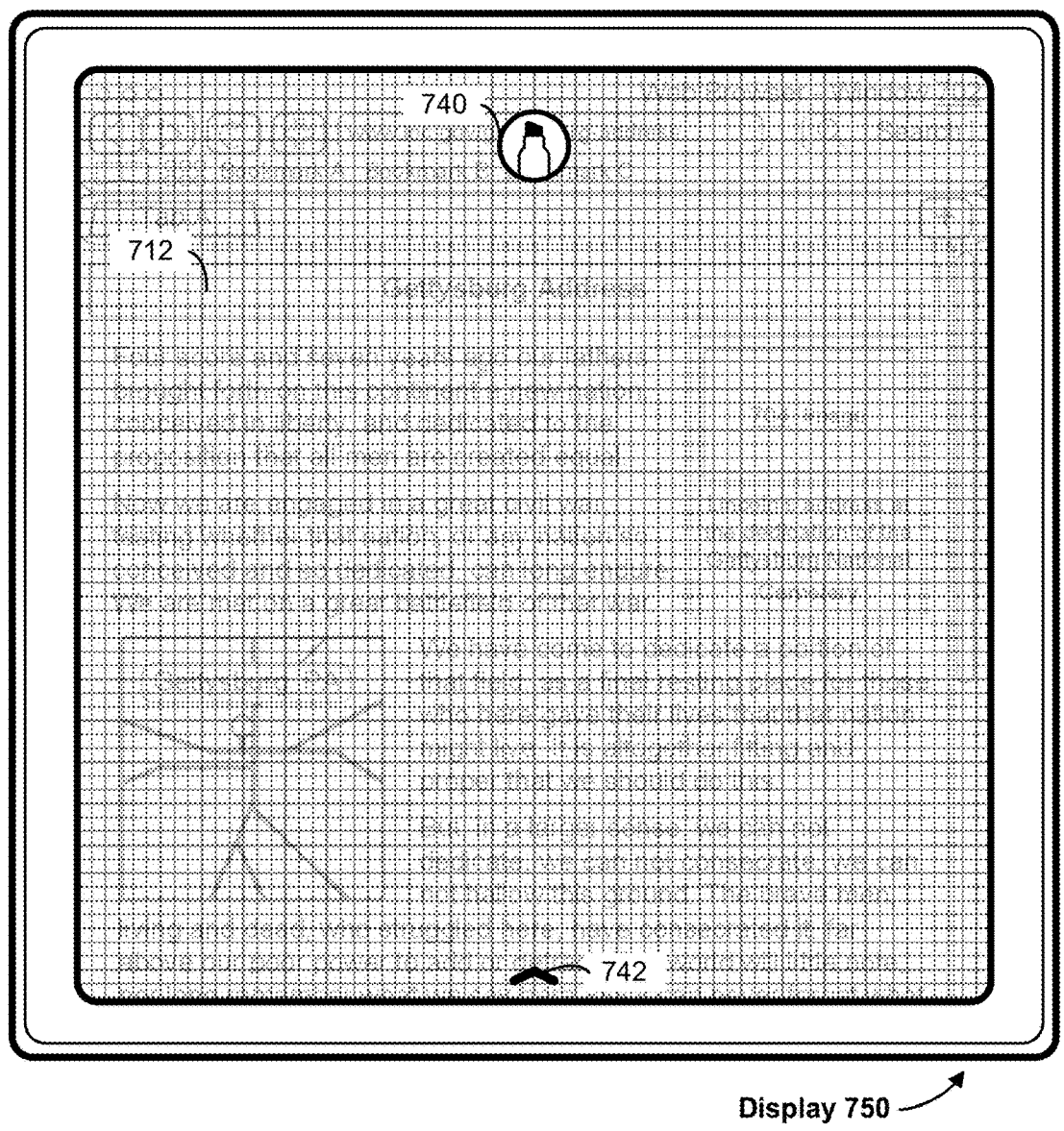

FIG. 7H illustrates annotation layer 712 displayed over user interface 702 (e.g., shown in FIG. 7A) on display 750, in accordance with some embodiments. In some embodiments, user interface 702 continues to be displayed and is at least partially visible through annotation layer 712 (e.g., annotation layer 712 is semi-transparent). In some embodiments, annotation layer 712 includes one or more control affordances. For example, in some embodiments, annotation layer 712 includes annotation tool icon 740 that indicates a currently selected annotation tool (e.g., a virtual knife tool, a marker or highlighter tool, a felt tip pen tool, a pencil tool, an eraser tool, etc.) and, optionally, a currently selected color (e.g., if the currently selected annotation tool has associated color options). In some embodiments, annotation layer 712 includes annotation layer dismissal affordance 742 displayed at or near the edge of annotation layer 712 and display 750. In some embodiments, when input is detected at a location that corresponds to annotation layer dismissal affordance 742 (e.g., a tap gesture is detected at a location that corresponds to annotation layer dismissal affordance 742), annotation layer 712 ceases to be displayed.

Figure 7I:
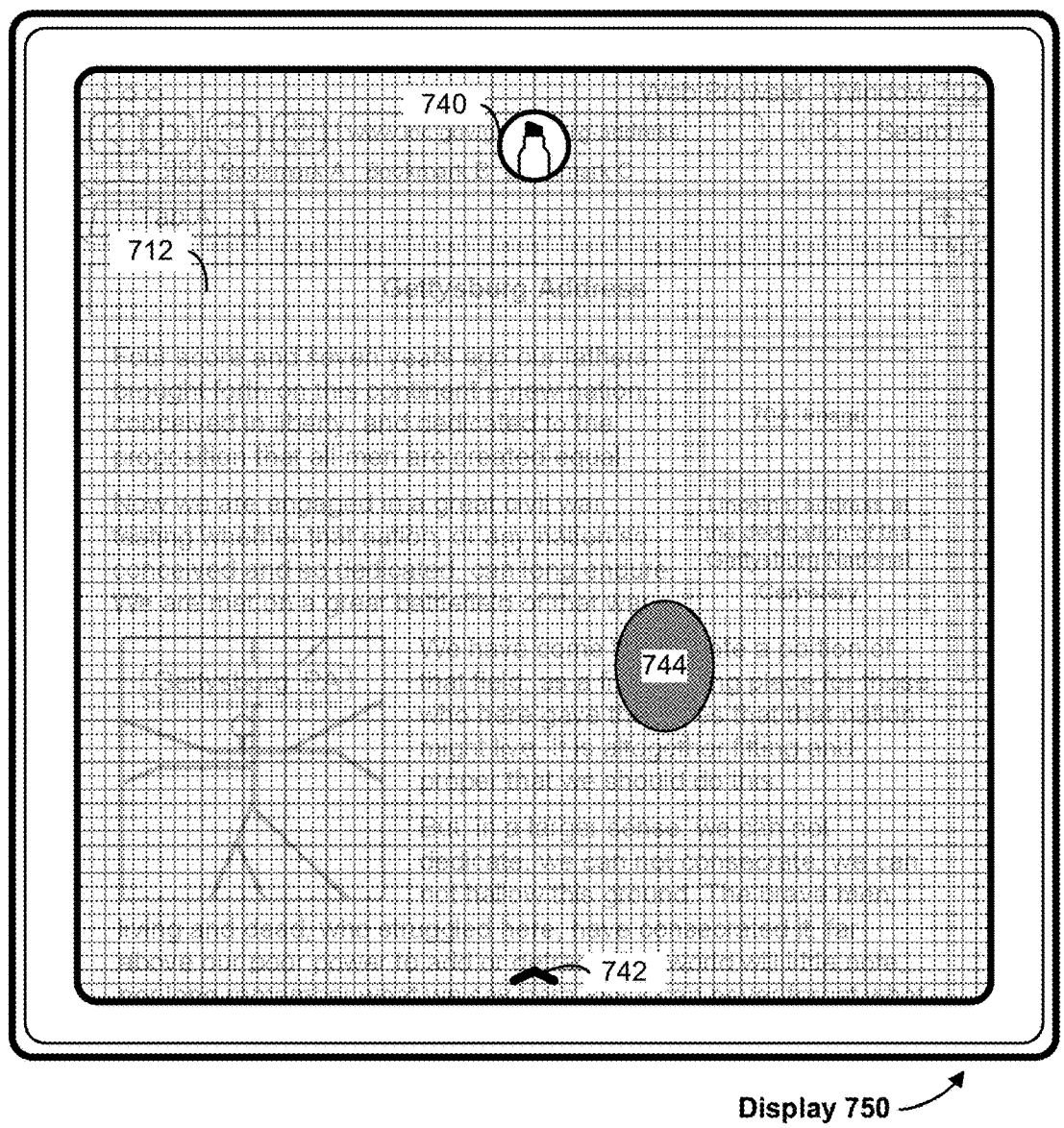
Figure 7J:
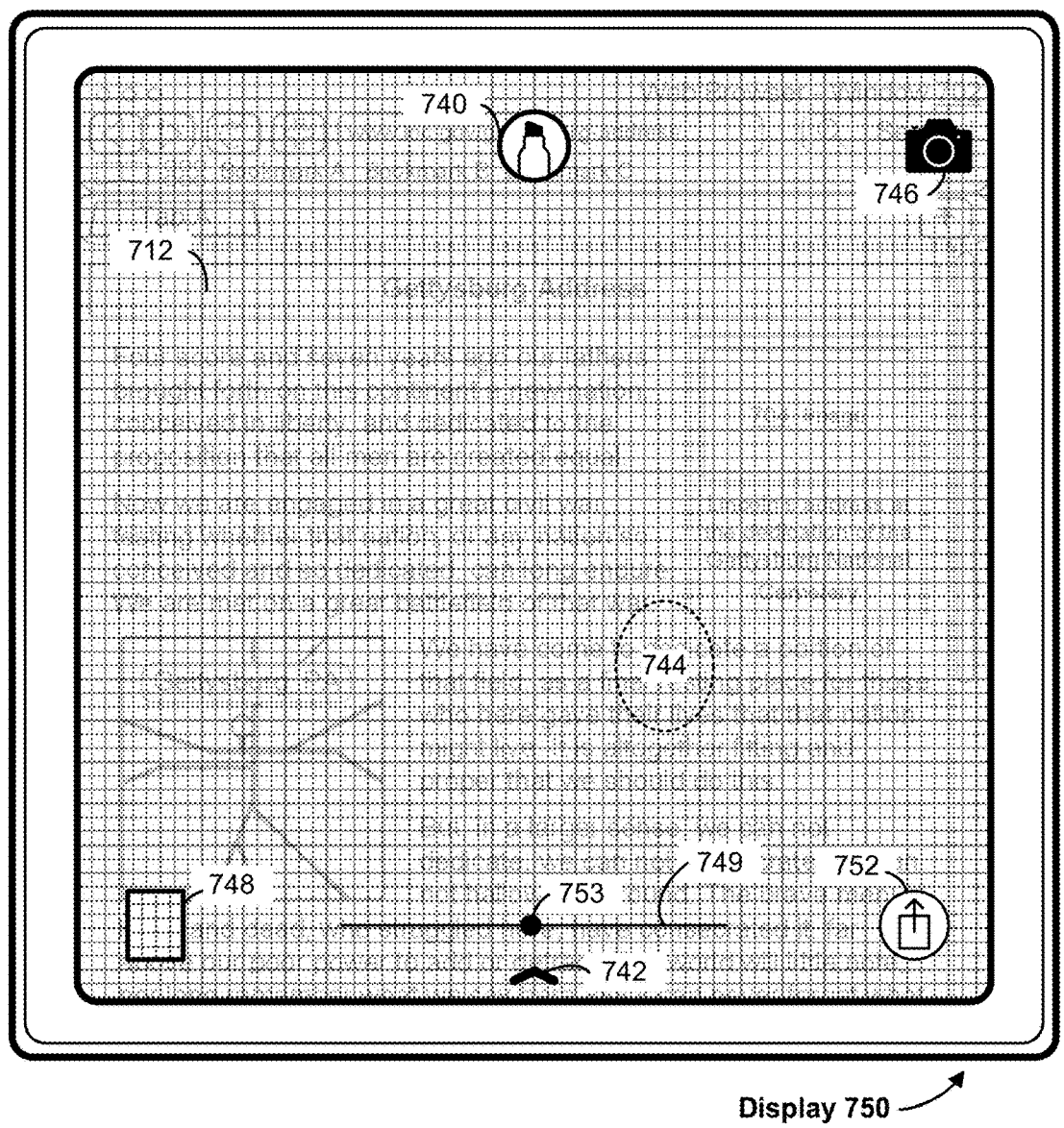

FIG. 7I-7J illustrate a transition of annotation layer 712 from annotation layer 712 in FIG. 7H in response to detecting user input 744. In particular, FIG. 7I shows the position of user input 744 (e.g., a contact by a finger) at a location in annotation layer 712 that does not correspond to either annotation tool icon 740 or annotation layer dismissal affordance 742. FIG. 7J illustrates that, subsequent liftoff of the contact by user input 744 or, more generally, user input 744 ceases to be detected. FIG. 7J also illustrates a set of annotation controls (e.g., in addition to and including the control affordances shown in FIG. 7H) for annotation layer 712, displayed in response to detecting user input 744 (or a subsequent liftoff of the contact by user input 744). For example, in some embodiments, the set of annotation controls further includes camera icon 746 (e.g., for capturing application content, such as a full screen snapshot of the application content, to be added to the annotation layer), texture selection icon 748 (e.g., for selecting a texture of the annotation layer), opacity slider 749 (e.g., for changing an opacity level of the annotation layer), and sharing icon 752

(e.g., for sharing and/or storing the annotation layer). In FIG. 7J, opacity slider 749 is set to an opacity level corresponding to slider position 753.

In some embodiments, an input to display the set of annotation controls is distinguished from an input to produce annotations on the annotation layer. For example, in some embodiments, the set of annotation controls is displayed in accordance with a determination that user input 744 (e.g., a tap gesture) is provided using a finger, whereas an otherwise similar user input provided using a stylus instead produces annotations (e.g., a dot drawn) on the annotation layer. In some embodiments, the set of annotation controls is displayed in response to an input that satisfies intensity criteria (e.g., in response to a deep press input), whereas, for example, an otherwise similar user input that does not satisfy intensity criteria (e.g., a light press input) may instead produce annotations on the annotation layer.

Figure 7K:
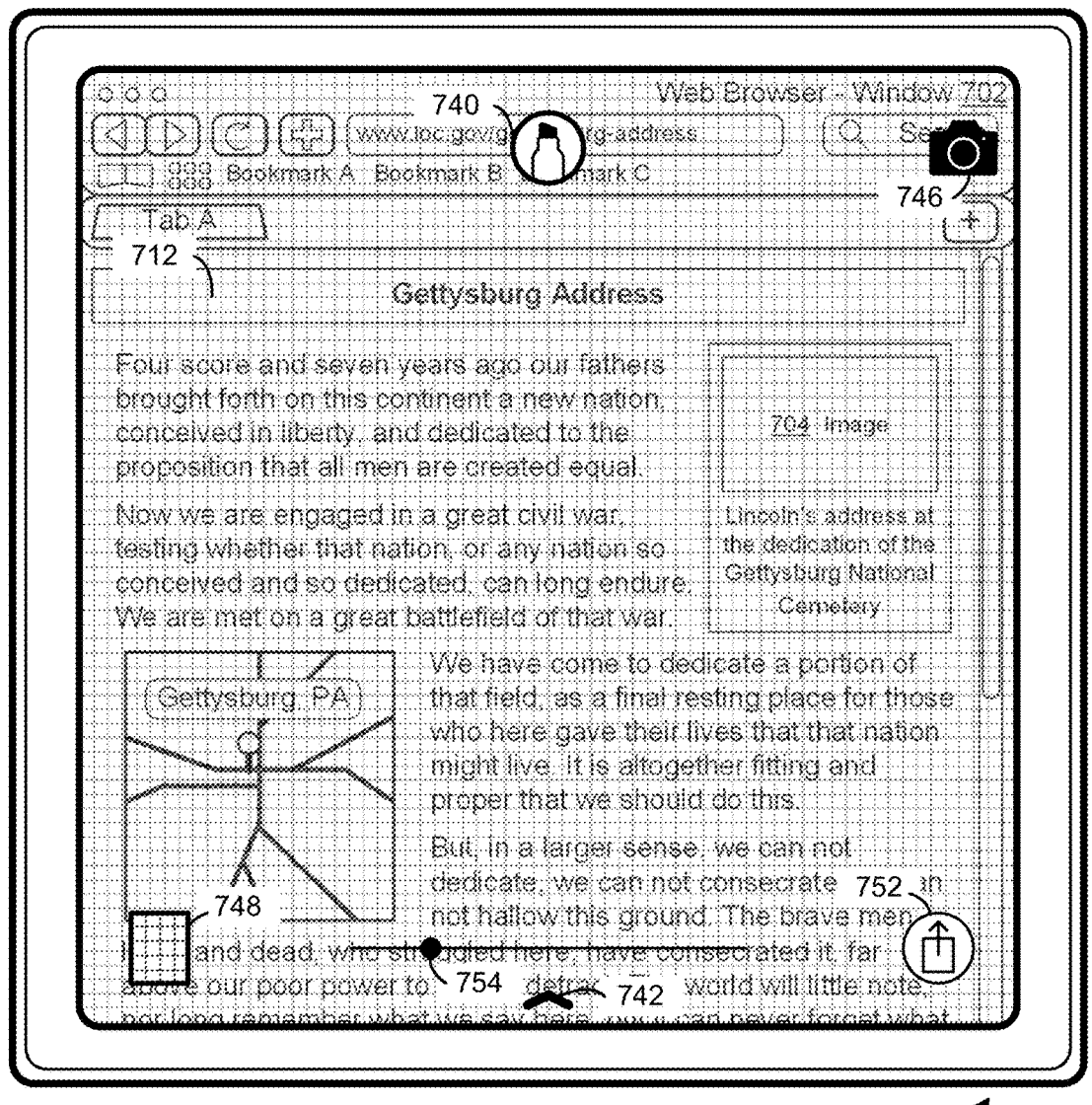

FIG. 7K is similar to FIG. 7J, except that FIG. 7K shows annotation layer 712 with the opacity slider set to an opacity level corresponding to slider position 754, which corresponds to a lower opacity (e.g., a higher transparency) for annotation layer 712 than the opacity level indicated by slider position 753 in FIG. 7J. Accordingly, in the example shown in FIG. 7K, the visibility of application content that is displayed underneath the annotation layer is increased, such that user interface 702 is visible through annotation layer 712 to a greater extent than user interface 702 illustrated in FIG. 7J.

Figure 7L:
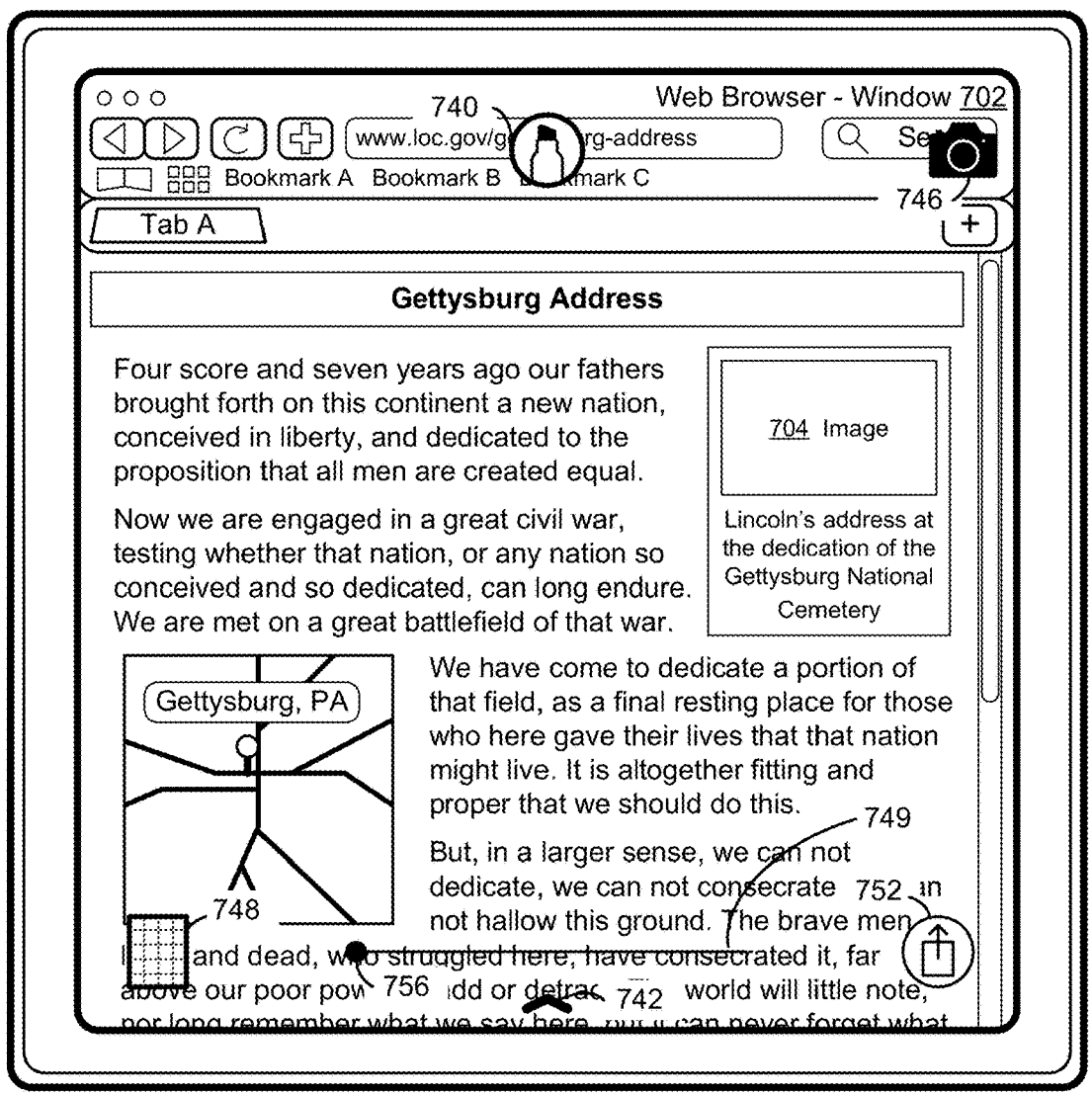

FIG. 7L is similar to FIGS. 7J-7K, except that FIG. 7L shows annotation layer 712 with the opacity slider set to an opacity level corresponding to slider position 756, which corresponds to an even lower opacity (e.g., an even higher transparency) for annotation layer 712 than the opacity level indicated by slider position 754 in FIG. 7K. In the example shown in FIG. 7L, slider position 756 corresponds to a lowest opacity (e.g., a highest transparency). In some embodiments, slider position 756 corresponds to a zero opacity (e.g., a full transparency), and accordingly, the application content displayed underneath the annotation layer is fully visible, such that user interface 702 is visible to the same extent as in FIG. 7A (e.g., without any annotation layer displayed). It is noted that annotation layer 712 remains over user interface 702, as indicated by the presence of the annotation controls (e.g., control affordances 740, 742, 746, 748, 749, 752, and 756), even though none of the texture of annotation layer 712 is visible, in accordance with the zero opacity setting.

Figure 7M:
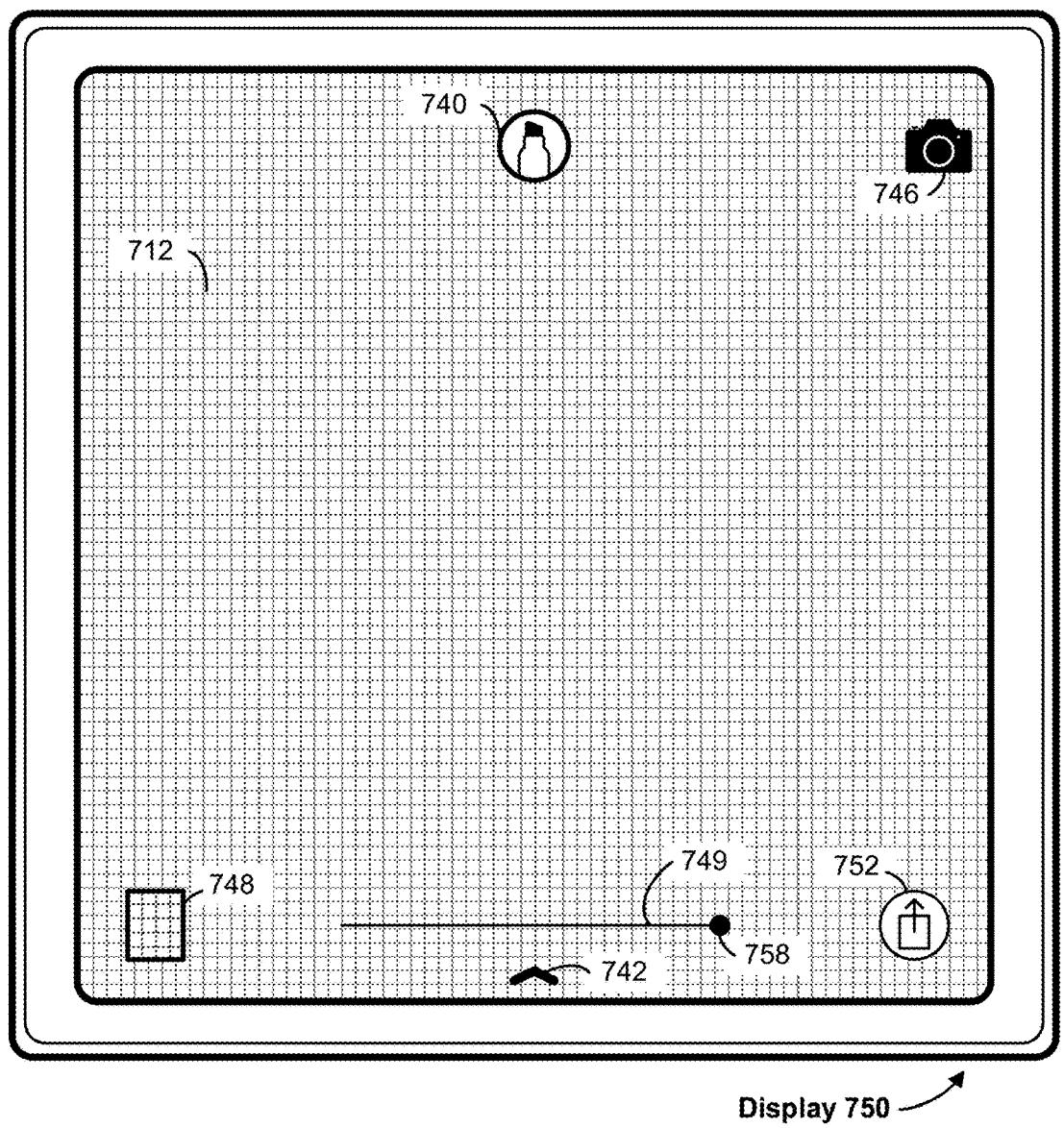

FIG. 7M is similar to FIGS. 7J-7L, except that FIG. 7M shows annotation layer 712 with the opacity slider set to a higher opacity (e.g., a lower transparency) than the opacity level indicated by any of the slider positions 753, 754, 756 in FIGS. 7J-7L, respectively. In particular, in the example shown in FIG. 7M, slider position 758 corresponds to a highest opacity (e.g., a lowest transparency). In some embodiments, slider position 758 corresponds to a full opacity (e.g., a zero transparency), and accordingly, the application content displayed underneath the annotation layer is not visible, such that only annotation layer 712 and its annotation controls (e.g., control affordances 740, 742, 746, 748, 749, 752, and 758) are visible.

Figure 7N:
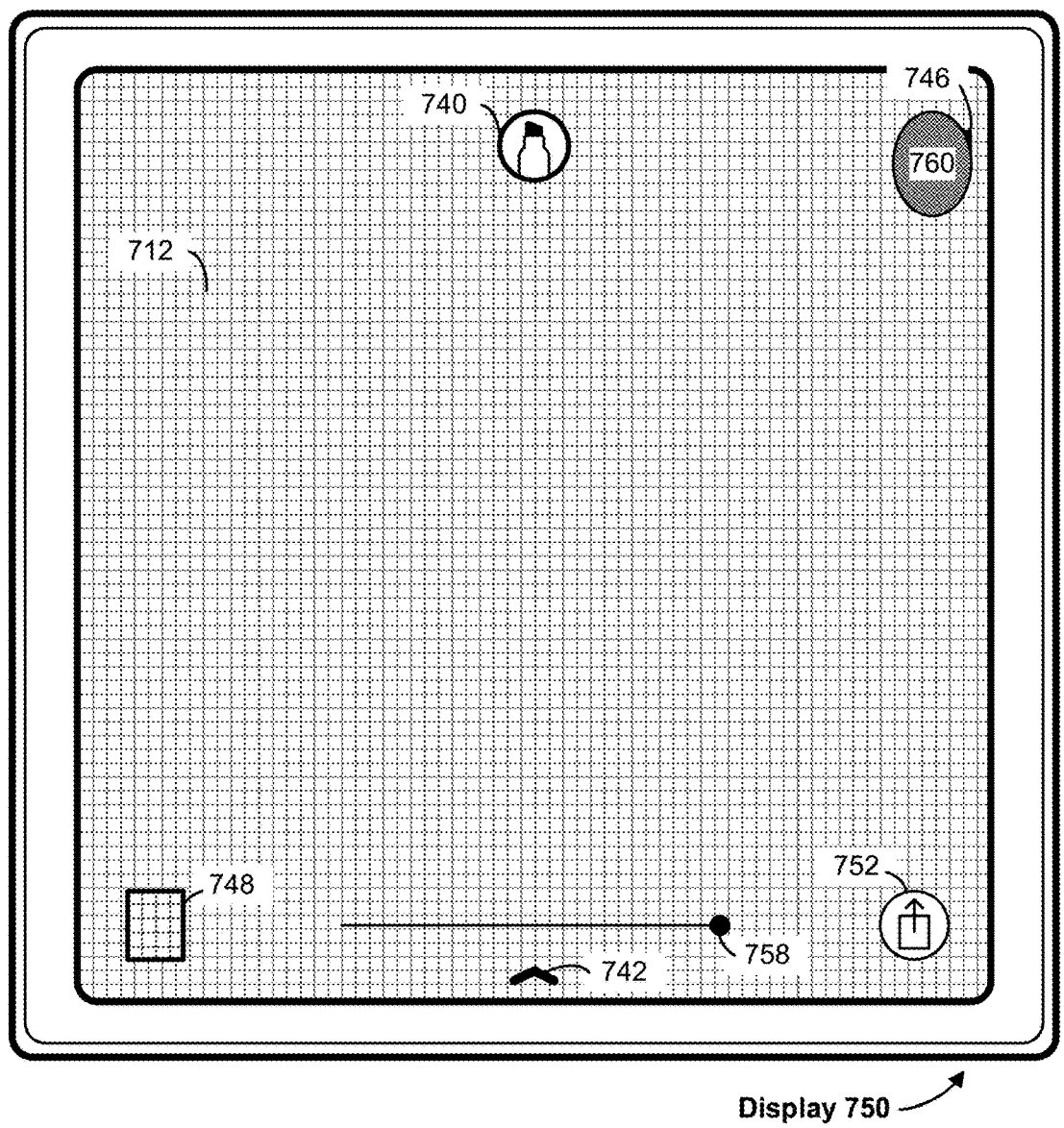
Figure 7O:
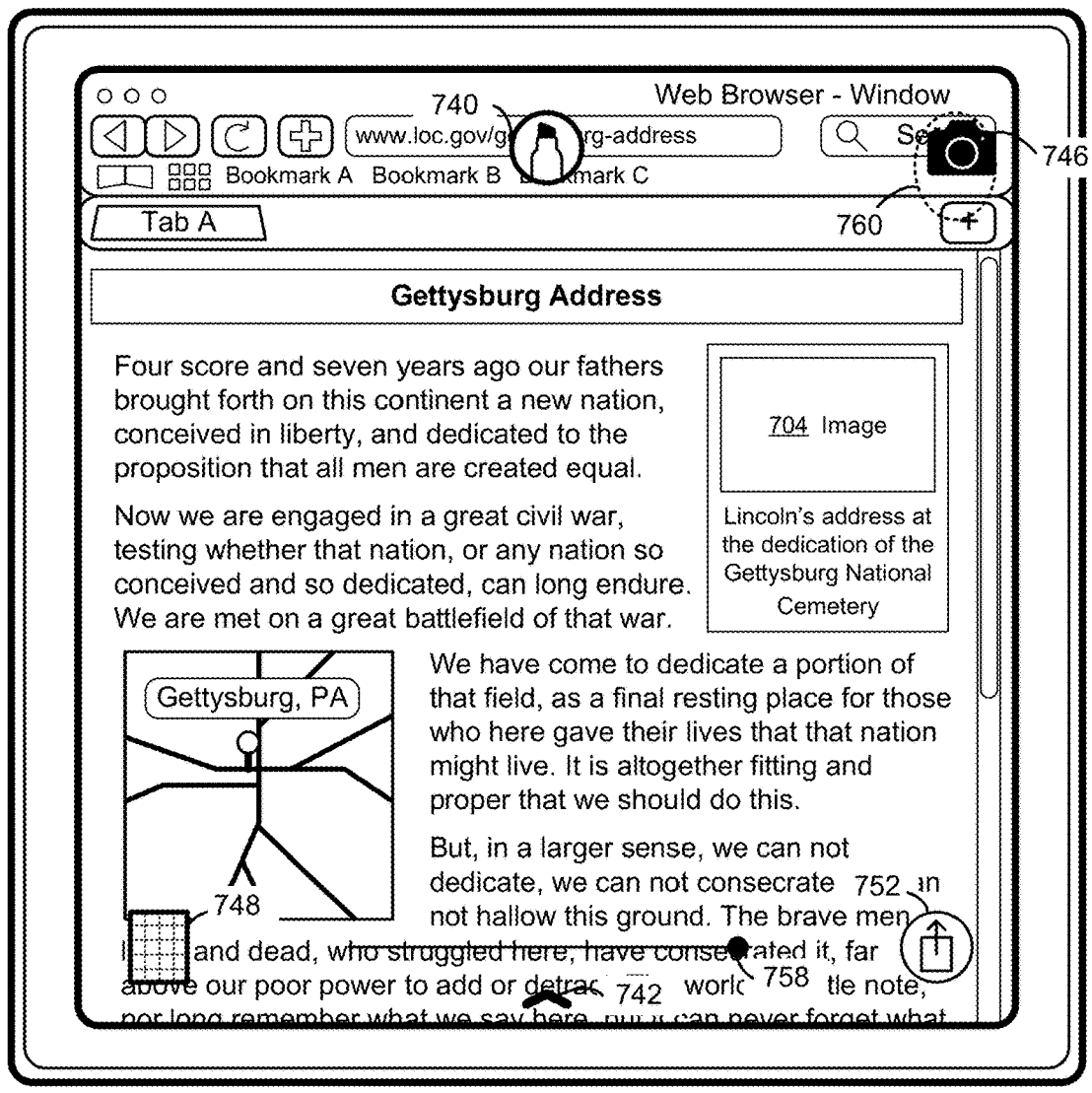

FIG. 7N-7O illustrate a transition of annotation layer 712 from annotation layer 712 in FIG. 7M in response to detecting user input 760. In particular, FIG. 7N shows the position of user input 760 (e.g., a contact by a finger) at a location in annotation layer 712 corresponding to camera icon 746. FIG. 7O illustrates that user input 760 ceases to be detected (e.g., in accordance with subsequent liftoff of the contact). FIG. 7O further illustrates that, in response to detecting user input 760, a representation of user interface 702 (e.g., a screenshot of the underlying web browser application content) is added to annotation layer 712. It is noted that the opacity slider is still set to the full opacity, as indicated by slider position 758, and accordingly, the application content displayed in annotation layer 712 in FIG. 7O is not user interface 702 itself, as user interface 702 would not be visible through annotation layer 712 when the annotation layer is set to the full opacity. Instead, the application content displayed in annotation layer 712 is a representation of user interface 702, which in some embodiments is created in response to user input 760 (e.g., activating camera icon 746).

Figure 7P:
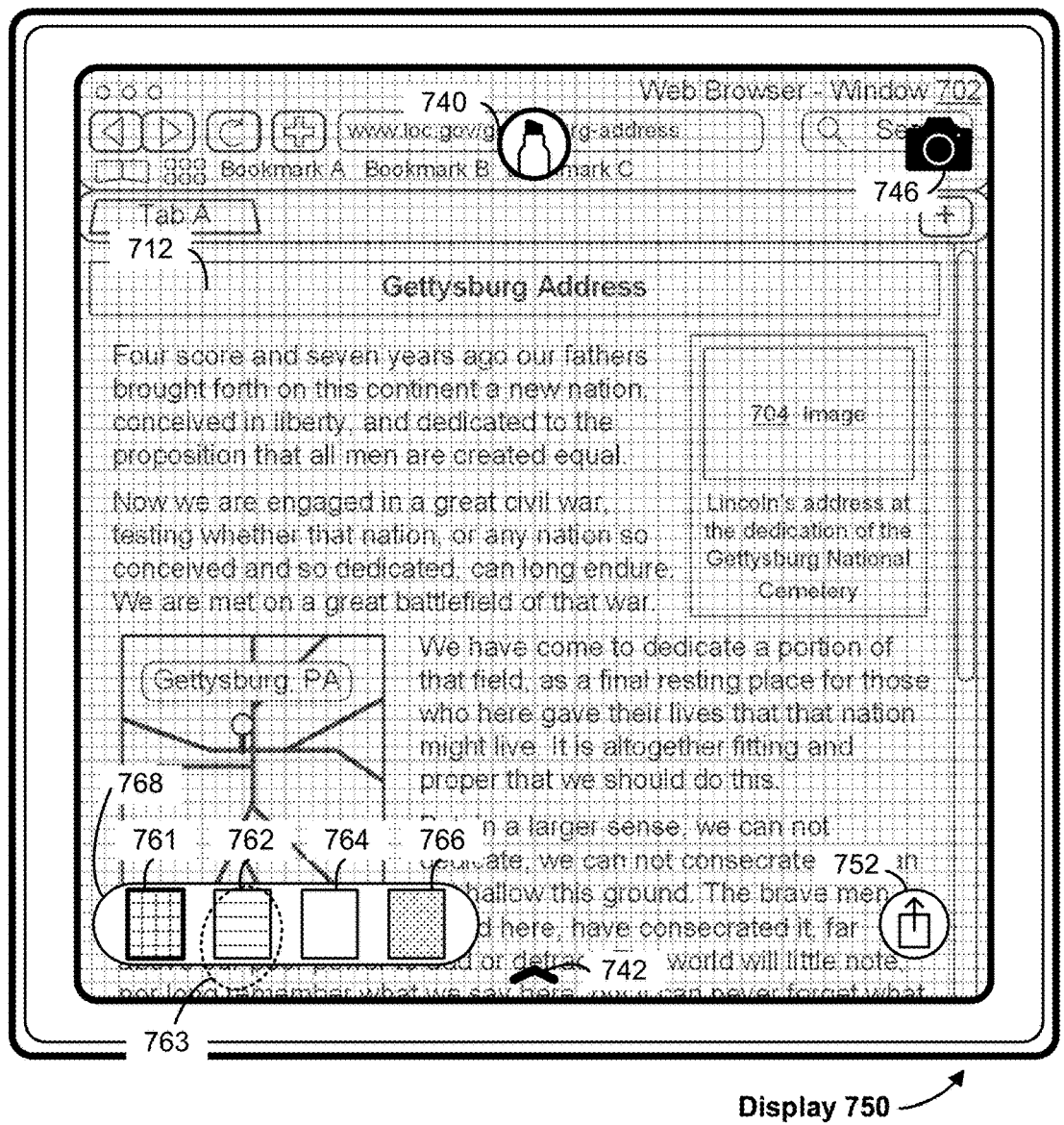
Figure 7Q:
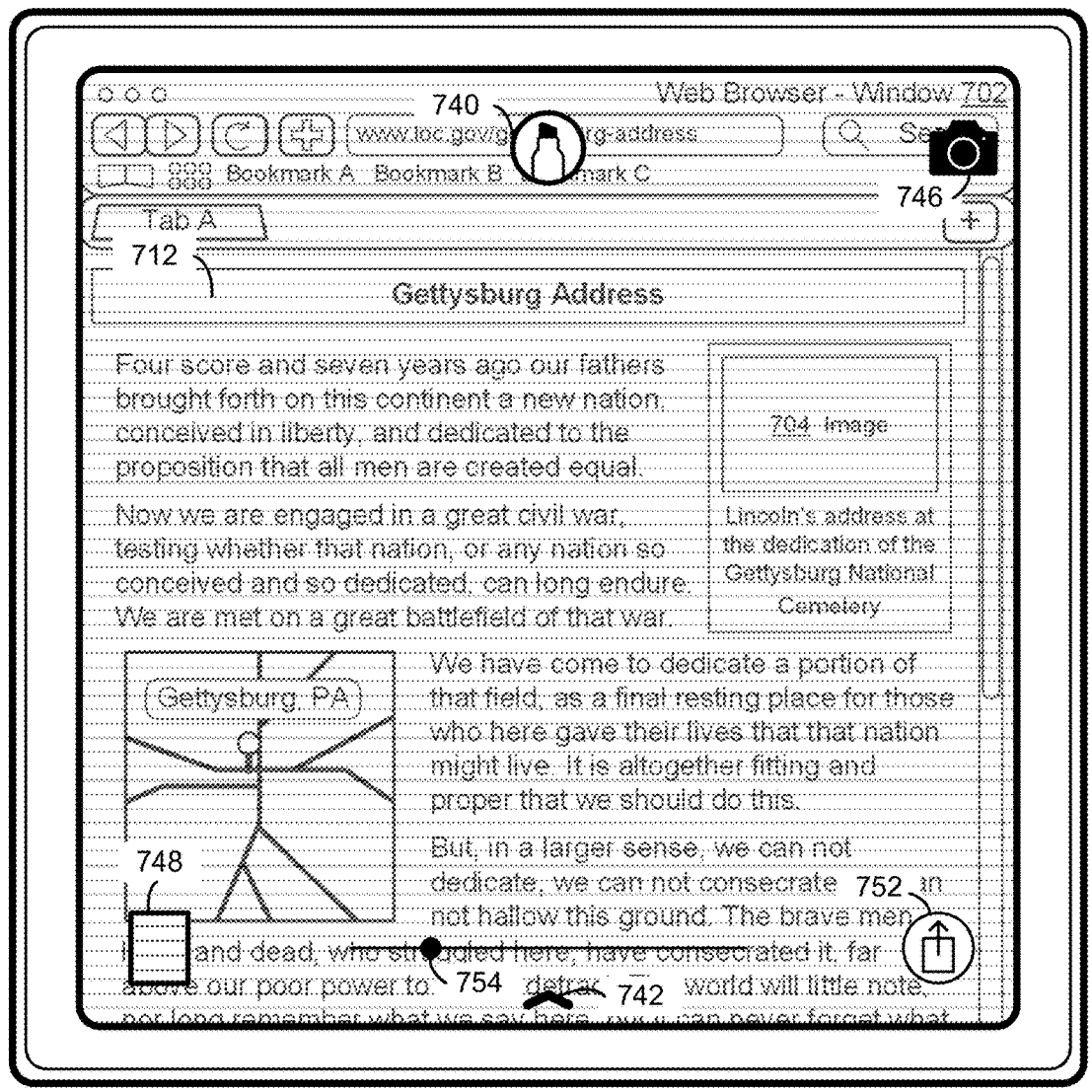

FIGS. 7P-7Q illustrate an alternate transition of annotation layer 712 from annotation layer 712 in FIG. 7K. In particular, FIG. 7P illustrates that annotation layer 712 has an adjustable texture that can be selected from a plurality of texture options (e.g., currently-selected grid texture 761, horizontal rule texture 762, solid or semitransparent texture 764, dotted texture 766, etc.). In some embodiments, texture selection control region 768 is displayed in response to detecting a user input at a location in annotation layer 712 that corresponds to texture selection icon 748 of FIG. 7K. In some embodiments, the texture options 761, 762, 764, 768 are displayed within texture selection control region 768.

FIG. 7P also illustrates that user input 763 (e.g., a tap gesture) is detected at a location that corresponds to horizontal rule texture icon 762.

FIG. 7Q illustrates a transition of annotation layer 712 from annotation layer 712 in FIG. 7P. In particular, FIG. 7Q illustrates that the texture of annotation layer 712 has been changed from the grid texture as shown in FIG. 7P to a horizontal rule texture (e.g., in response to user input 763 at a location corresponding to horizontal rule texture icon 762 in FIG. 7P). In some embodiments, texture selection icon 748 of FIG. 7Q is updated (e.g., to match horizontal rule texture 762) to indicate that the currently selected texture is the horizontal rule texture.

FIG. 7R illustrates an alternate transition of annotation layer 712 from annotation layer 712 in FIG. 7K. In particular, FIG. 7R illustrates a plurality of available tools or tool modes for annotation layer 712 (e.g., virtual knife tool icon 770, felt tip pen tool icon 771, pencil tool icon 772, eraser tool icon 773, (currently-selected) marker or highlighter tool icon 740) and a plurality of color options for the currently selected tool (e.g., color option icons 774, 775, 776, 777). In some embodiments, tool selection control region 778 is displayed in response to detecting a user input at a location in annotation layer 712 that corresponds to annotation tool icon 740 of FIG. 7K. In some embodiments, the tool option icons and/or color option icons are displayed within tool selection control region 778. In some embodiments, the currently selected tool is displayed in a center position of tool selection control region 778 and/or includes an indication (e.g., the dark, thick ring displayed with marker tool icon 740) that it is the currently selected tool. In some embodiments, the currently selected color option for the currently selected tool includes a visual indication (e.g., the white ring displayed with color option icon 777) indicating that it is the currently selected color. In some embodiments, at least a portion of the currently selected tool icon (e.g., marker tip icon 740) reflects the currently selected color option (e.g., the color of the currently selected tool. Those of ordinary skill in the art will recognize that a number of other tool options may be represented in the tool selection control affordance, such as line thickness (e.g., for the felt tip pen or marker tools) or selection mode (e.g., shape-based and freeform selection modes for the virtual knife tool).

Figure 7S:
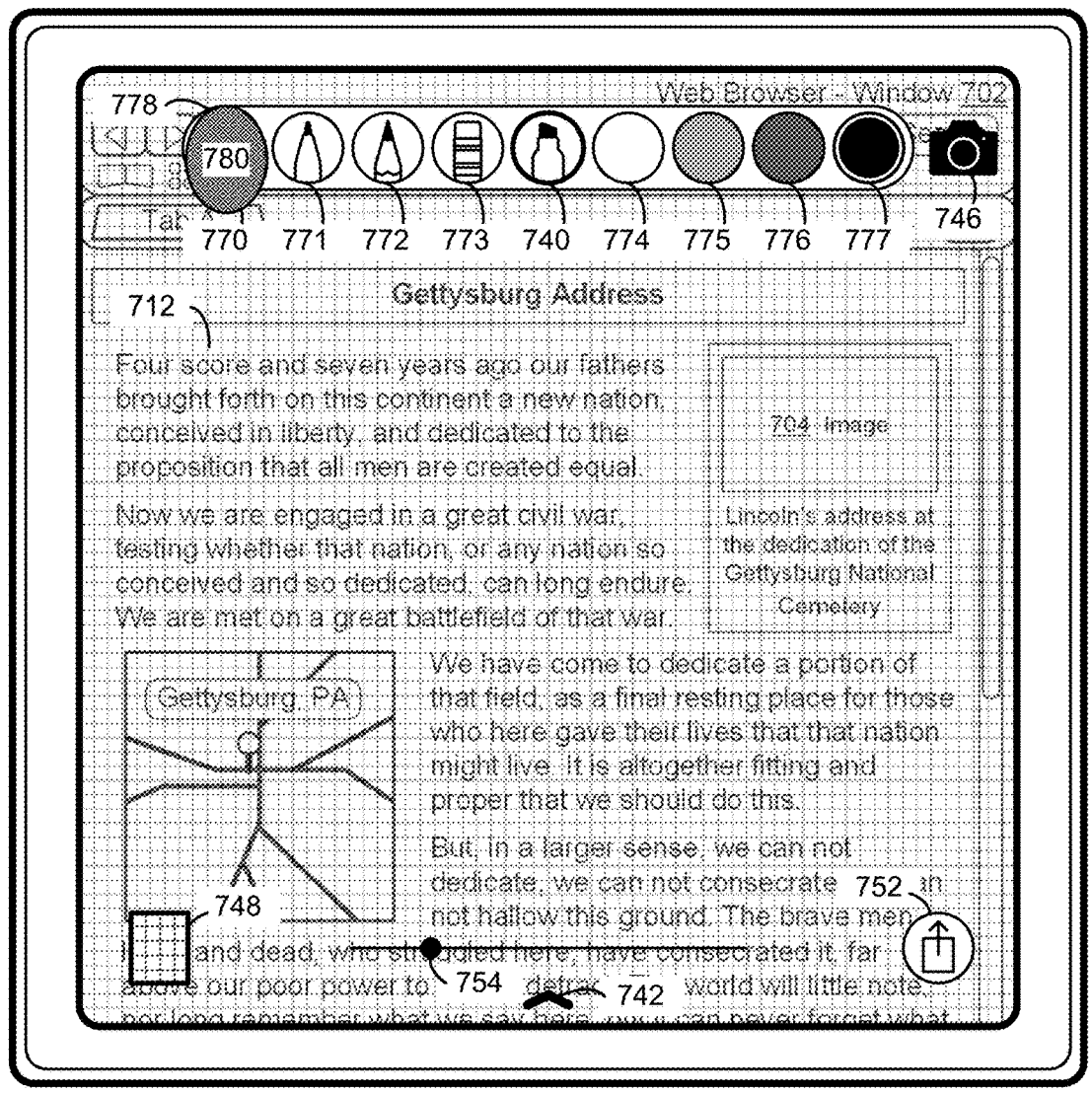
Figure 7T:
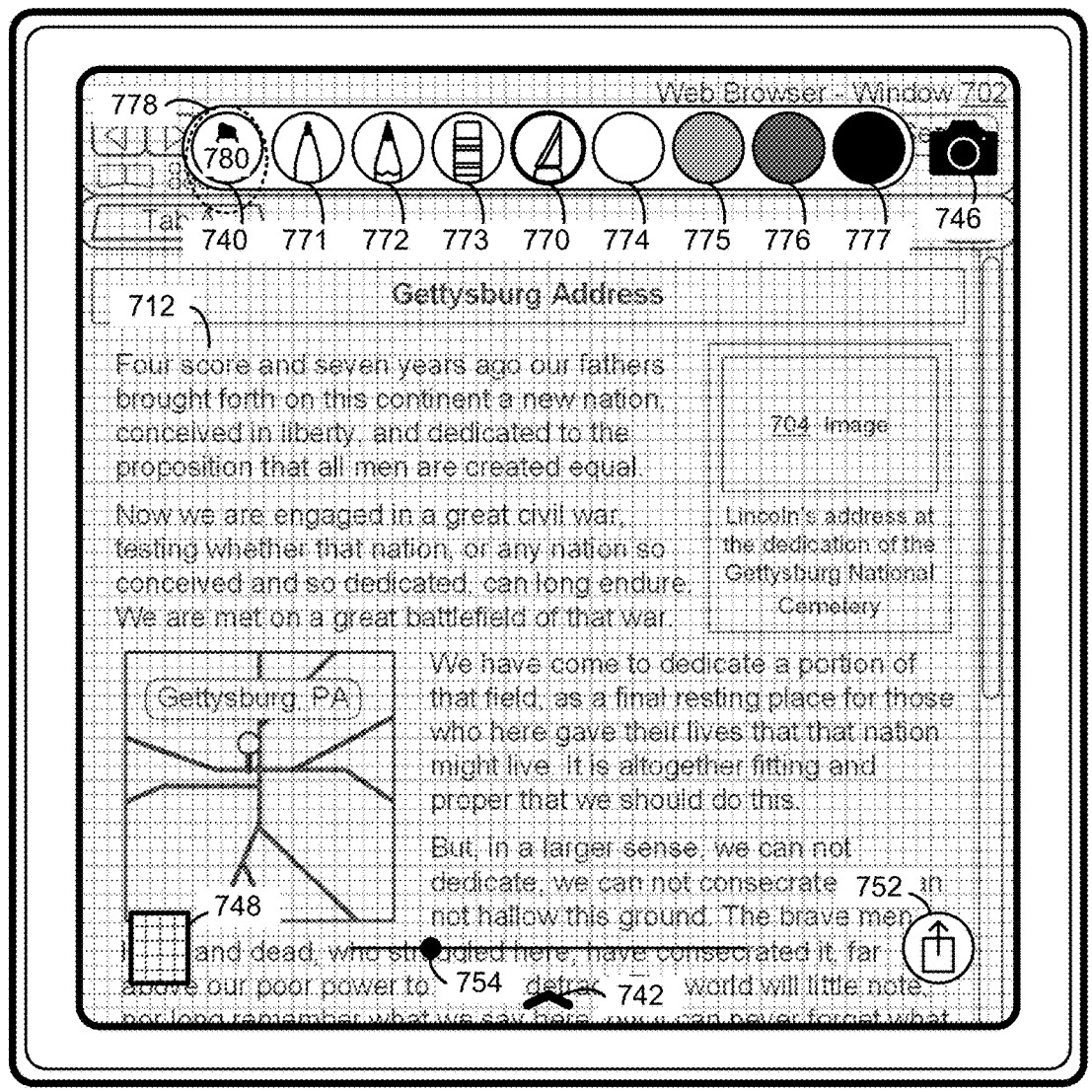

FIGS. 7S-7T illustrate a transition of annotation layer 712 from annotation layer 712 in FIG. 7R. In particular, FIG. 7S shows the position of user input 780 (e.g., a contact by a finger) at a location in annotation layer 712 that corresponds to virtual knife tool 770. FIG. 7T illustrates that detect user input 780 ceases to be detected (e.g., in accordance with liftoff of the contact), and further illustrates that, in response to detecting user input 780, the visual indication with marker tool icon 740 (shown in FIG. 7R) is removed and the visual indication is shown with virtual knife tool icon 770 to indicate that the currently selected tool has been changed from the marker tool to the virtual knife tool. For example, virtual knife tool 770 is displayed in the center position of tool selection control region 778 with the dark ring. In addition, in some embodiments, the virtual knife tool represented by virtual knife tool icon 770 does not have or require an associated color selection. Accordingly, in the example shown in FIG. 7T, color option icon 777 is no longer displayed with a current selection indication (e.g., the white ring displayed in FIG. 7R ceases to be displayed in FIG. 7T).

Figure 7U:
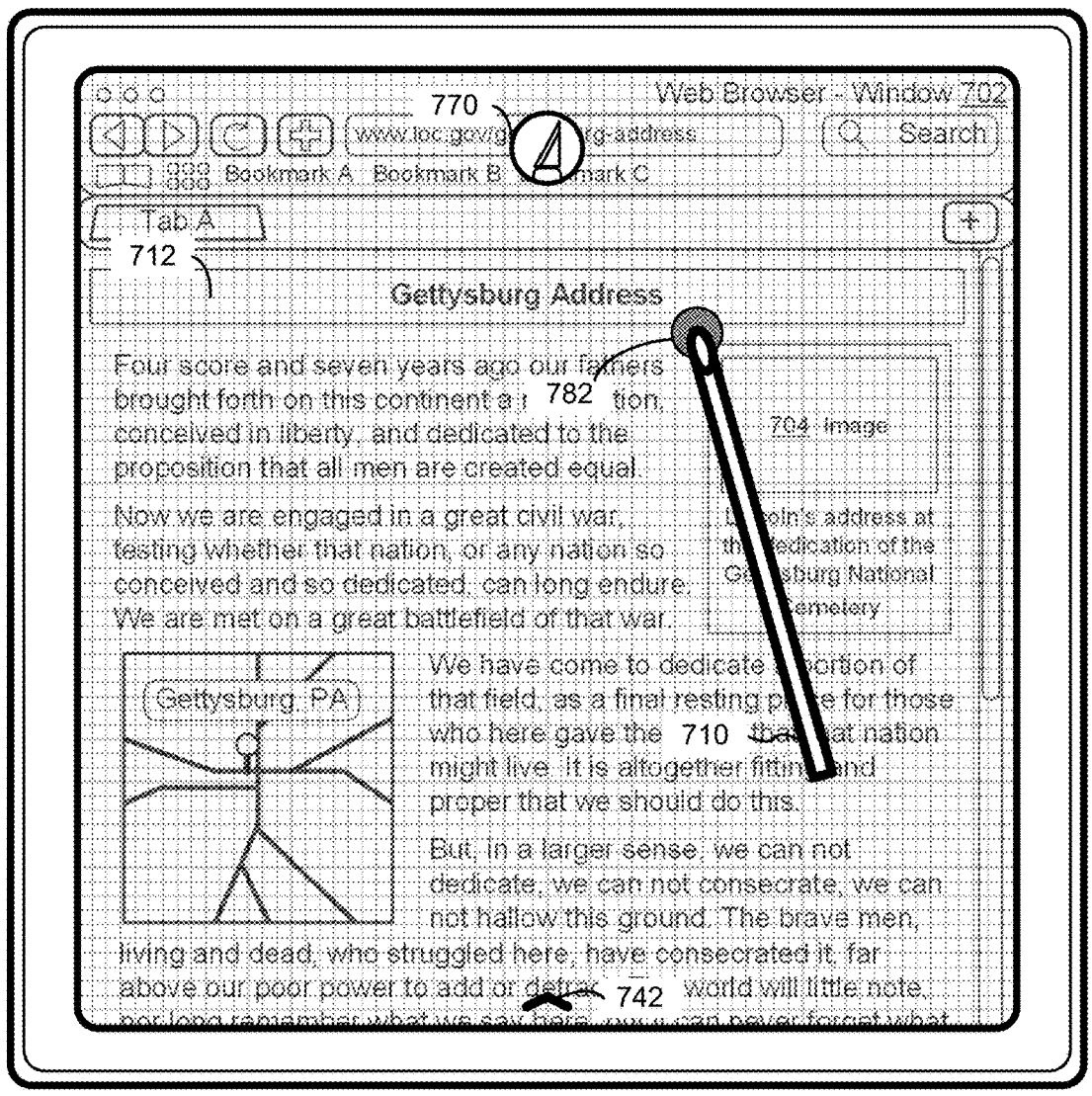
Figure 7V:
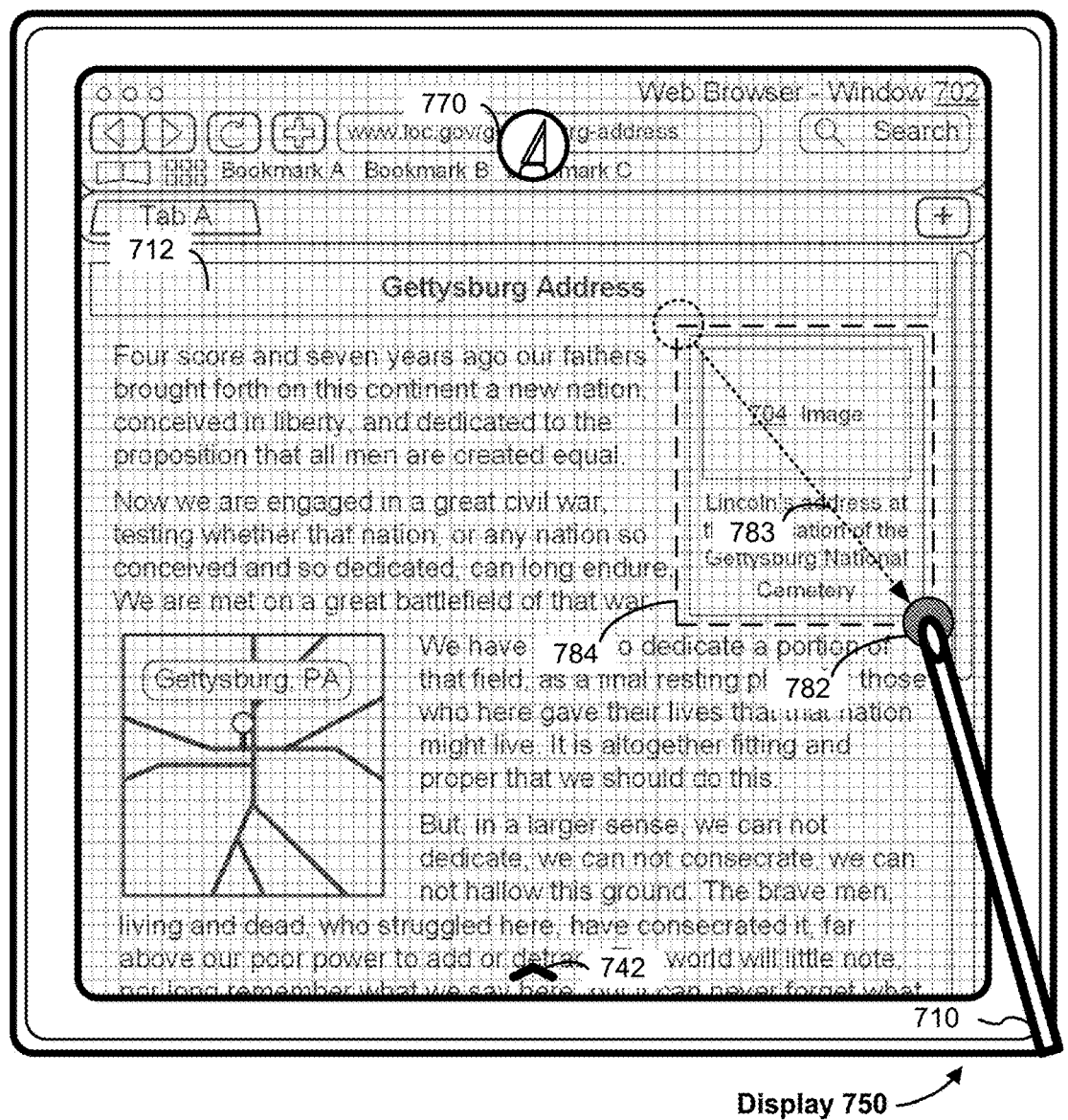
Figure 7W:
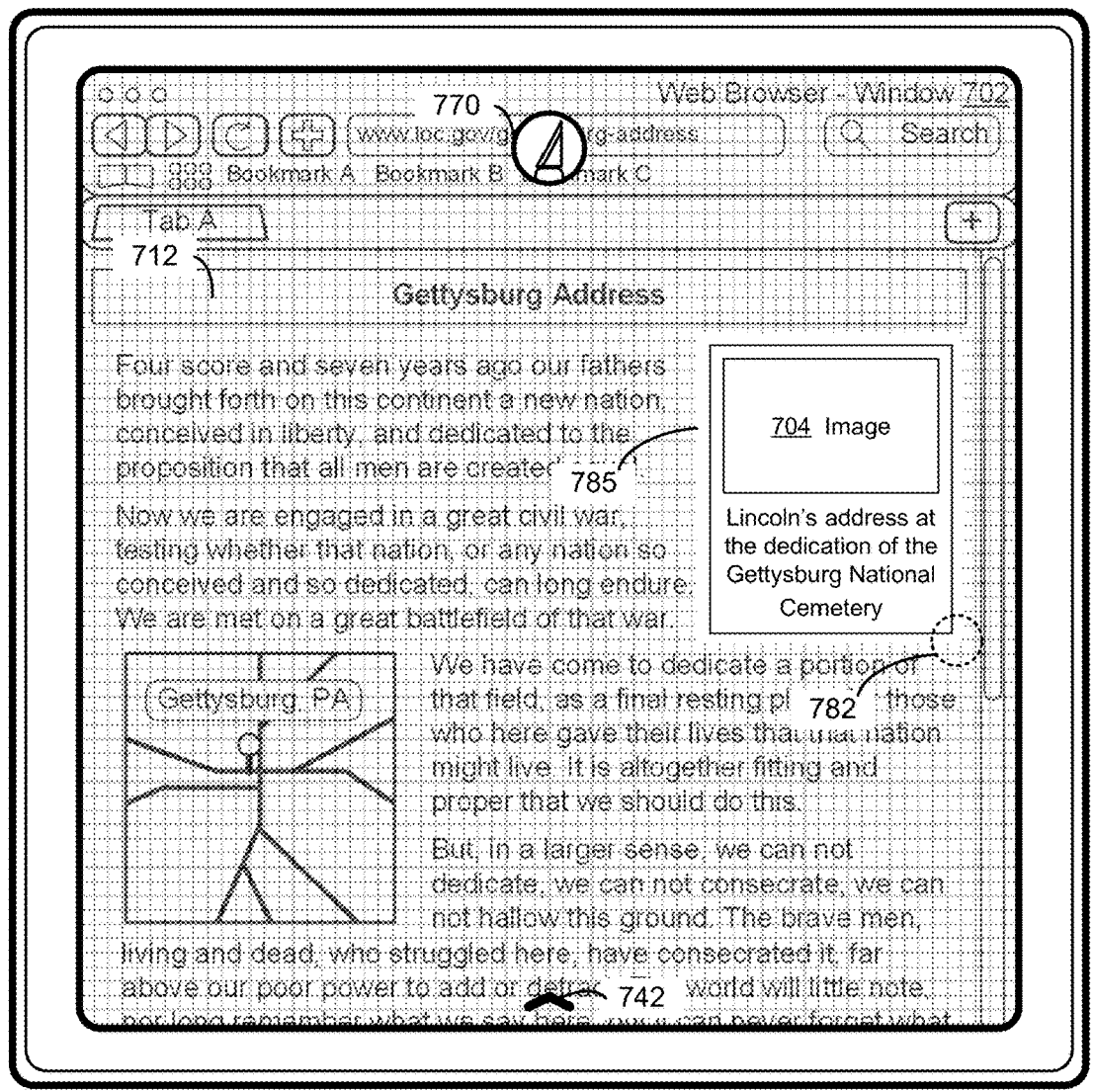

FIGS. 7U-7W illustrate a transition of annotation layer 712 from annotation layer 712 in FIG. 7T by the addition of underlying application content to annotation layer 712. In particular, FIG. 7U shows an initial position of user input 782 by stylus 710 detected near the upper left corner of image 704. In addition, in FIG. 7U, knife tool icon 770 and annotation layer dismissal affordance 742 are the only control affordances displayed (e.g., similar to the illustration in FIG. 7H) while the additional controls (such as the camera icon, texture selection icon, opacity slider, and sharing icon of FIG. 7K, or control sub-menus such as the texture selection control affordance of FIG. 7P or the tool selection control affordance of FIG. 7R) are not displayed. In some embodiments, the additional controls cease to be displayed in response to detecting user input for producing annotations on the annotation layer (e.g., user input provided using a stylus and/or at a location on the annotation layer that does not correspond to a control affordance).

FIG. 7V illustrates movement of user input 782 by stylus 710 from its initial position as shown in FIG. 7U along a path indicated by arrow 783 to a location near the lower right corner of the caption for image 704 to select a first portion of user interface 702 to be added to annotation layer 712. In the example shown in FIG. 7V, the input by stylus 710 corresponds to a selection mode having a predefined shape (e.g., a rectangular selection tool) for the virtual knife tool that corresponds to virtual knife tool icon 770. Accordingly, in response to the movement of user input 782 by stylus 710, selection indication 784 is displayed to indicate the first portion of user interface 702 selected by the user input.

FIG. 7W illustrates a transition of annotation layer 712 from annotation layer 712 in FIG. 7V, in response to ceasing to detect user input 782 (e.g., detecting liftoff of the contact) by stylus 710. In particular, FIG. 7W shows that representation 785 of the selected first portion of user interface 702 (as indicated by selection indication 784 in FIG. 7V) has been added to annotation layer 712. Accordingly, texture of annotation layer 712 is not visible over representation 785. In the example shown in FIG. 7W, representation 785 includes image 704 and its associated caption and has a boundary consistent with the selected portion of user interface 702 as indicated by selection indication 784 in FIG. 7V (e.g., giving the impression that the annotation layer was cut away using the virtual knife).

Figure 7X:
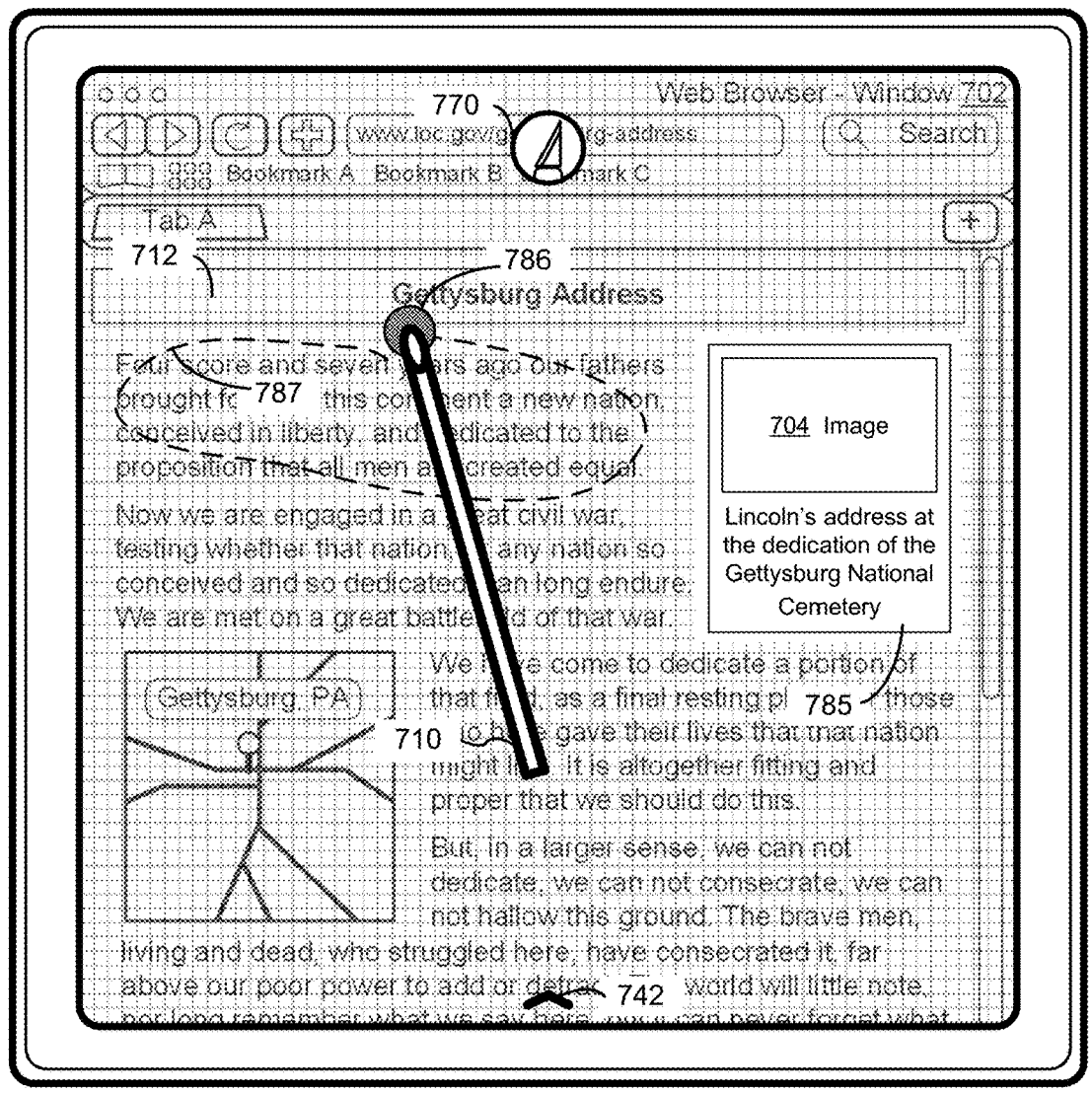
Figure 7Y:
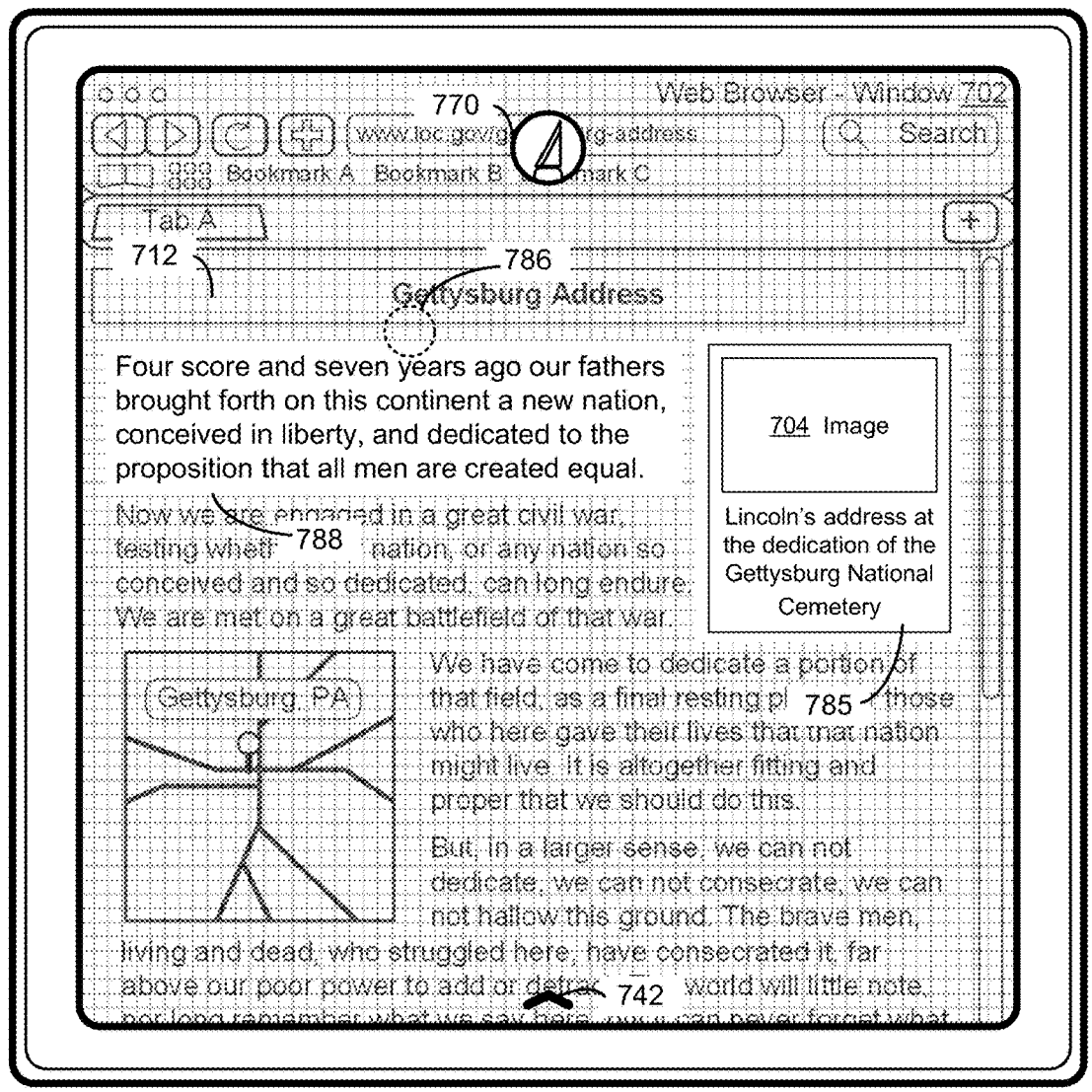

FIGS. 7X-7Y illustrate a transition of annotation layer 712 from annotation layer 712 in FIG. 7W by the addition of other underlying application content. In particular, FIG. 7X shows user input 786 by stylus 710, in a freeform or freehand selection mode for virtual knife tool 770. A selection indication 787 is displayed in response to the movement of user input 786 by stylus 710 along a freeform selection path.

FIG. 7Y illustrates a transition of annotation layer 712 from annotation layer 712 in FIG. 7X, in response to ceasing to detect user input 786 (e.g., detecting liftoff of the contact) by stylus 710. In particular, FIG. 7Y shows that a representation 788 of the selected portion of user interface 702 has been added to annotation layer 712. In some embodiments, as in the example illustrated in FIGS. 7X-7Y, the boundary of the user interface portion that is added to annotation layer 712 is automatically and/or intelligently determined based on structure of the underlying application content even though the selection path of the user input deviates from a predefined content boundary (e.g., based on an automatically determined alpha channel). Although user input 786 followed a freeform selection path (as indicated by selection indication 787 in FIG. 7X), representation 788 in FIG. 7Y has a rectangular boundary and includes a complete paragraph of text from the underlying web browser application content (as opposed to only the portion encircled by selection indication 787 in FIG. 7X).

Figure 7Z:
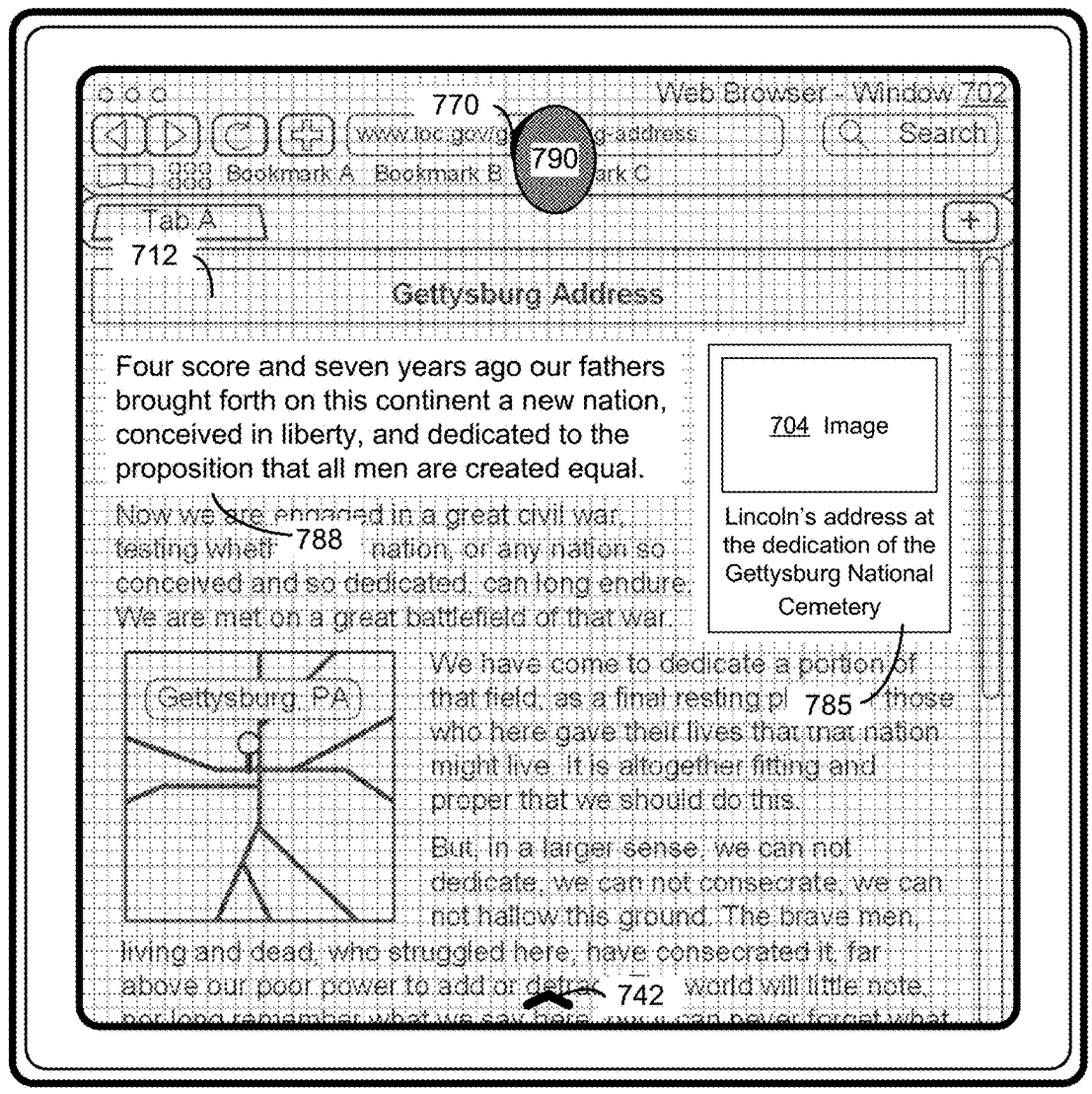
Figure 7A:
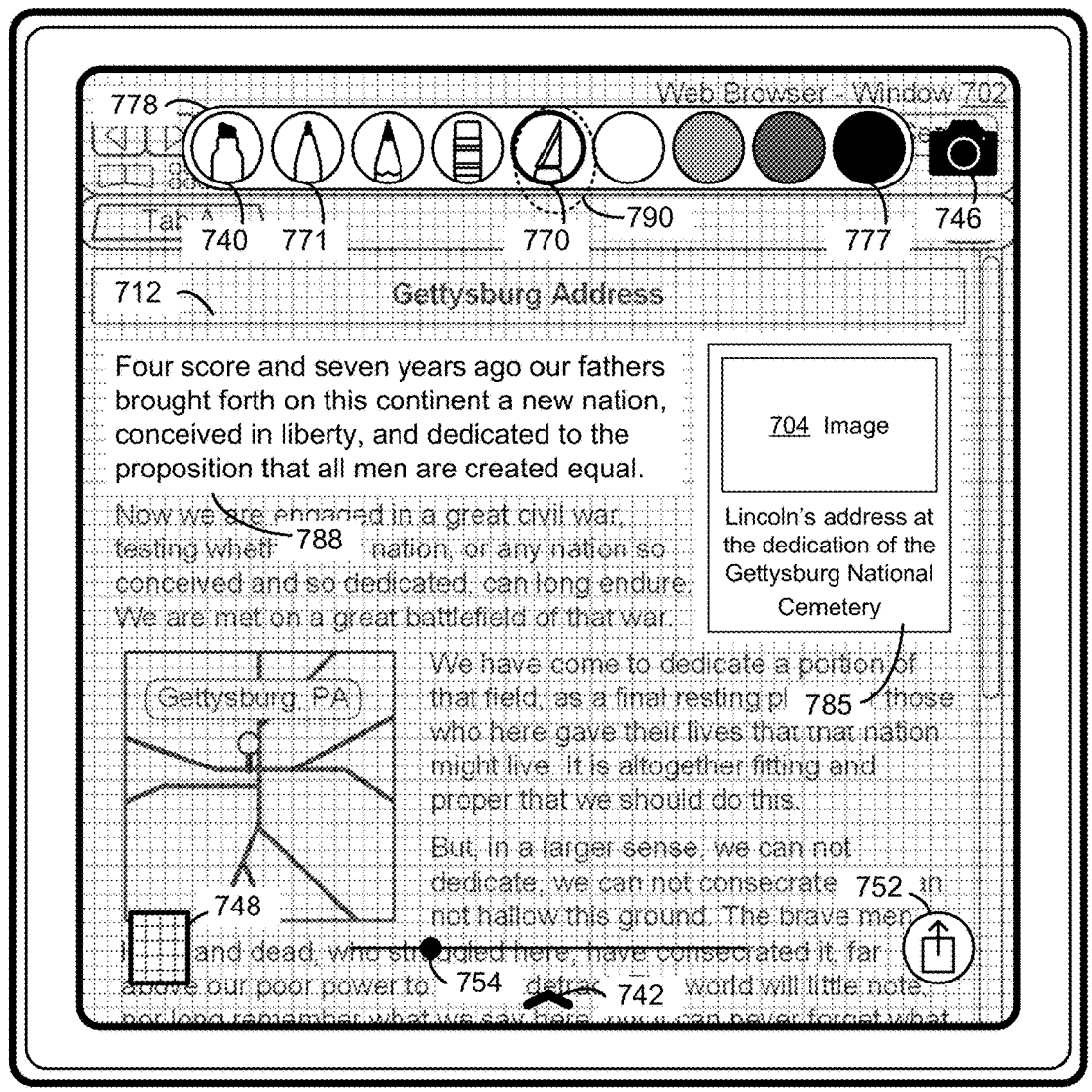
Figure 7B:
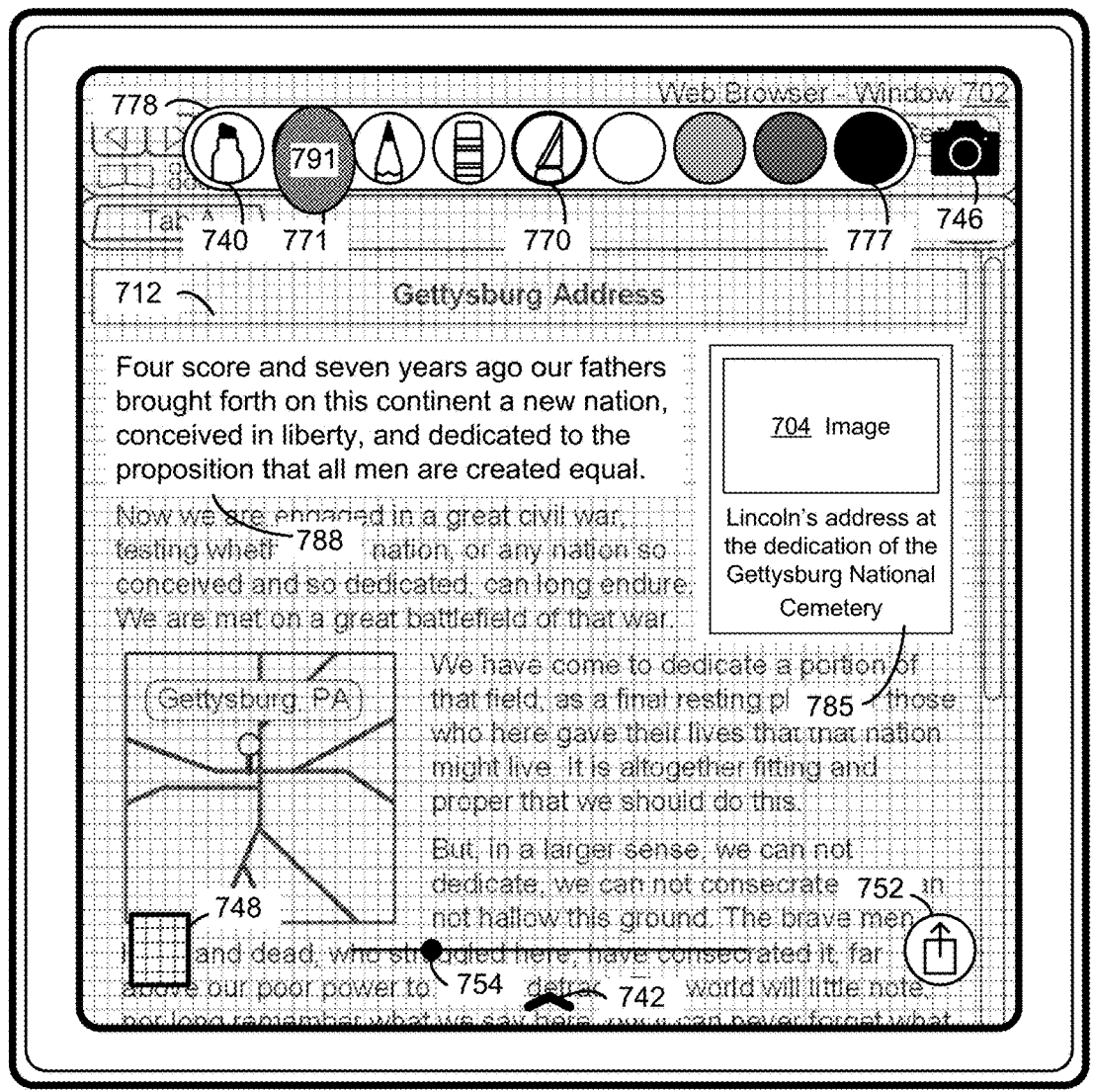
Figure 7C:
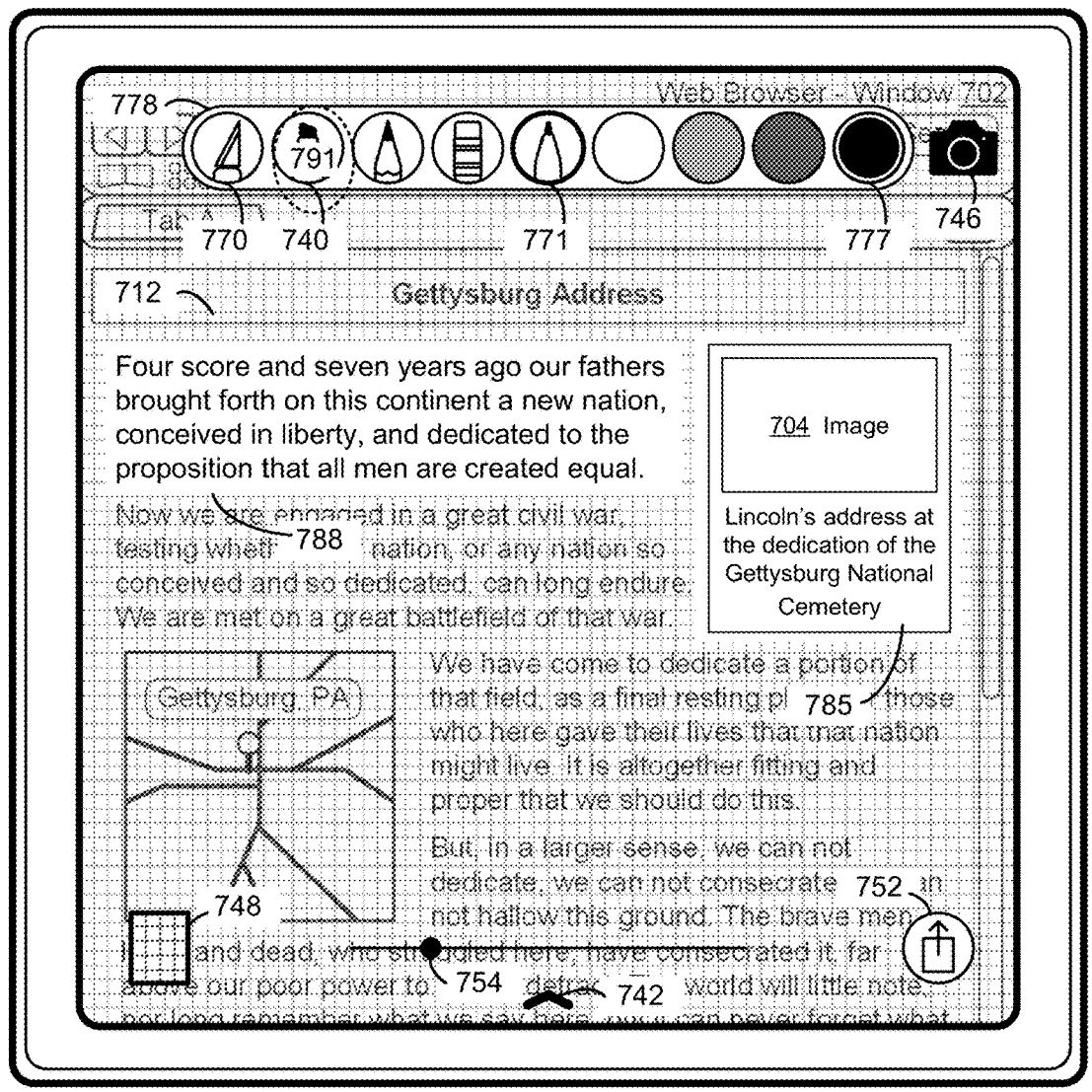
Figure 7D:
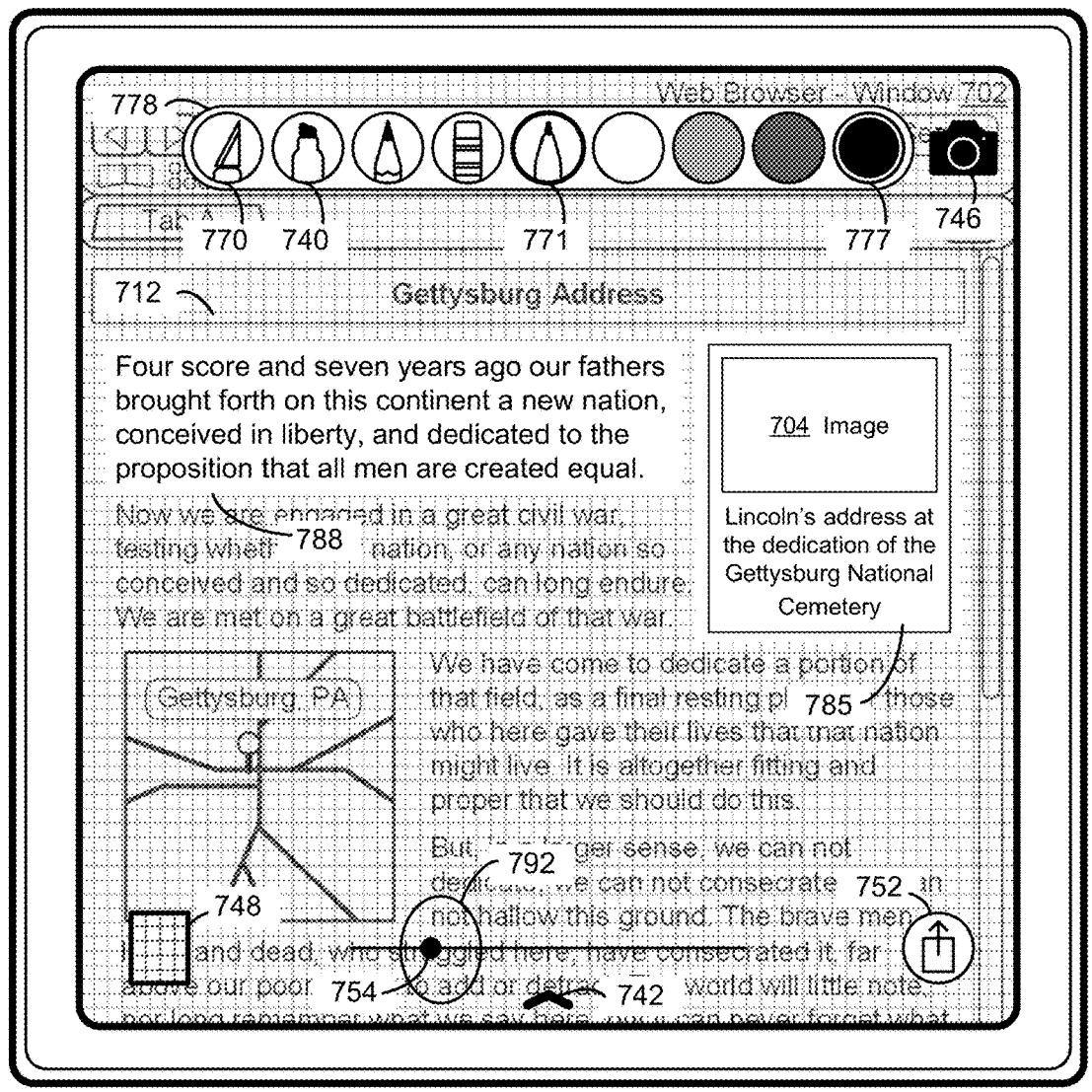
Figure 7E:
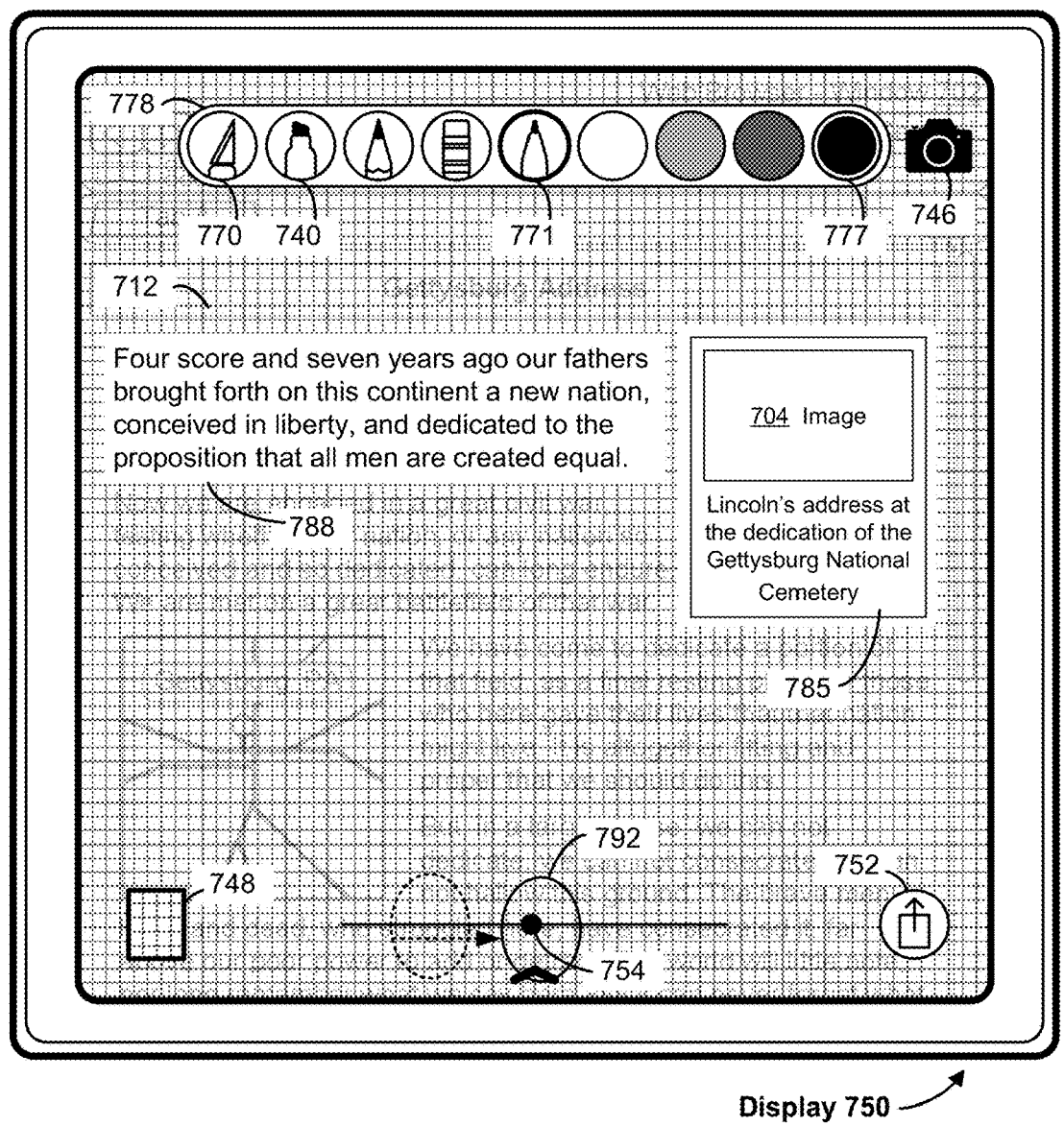
Figure 7F:
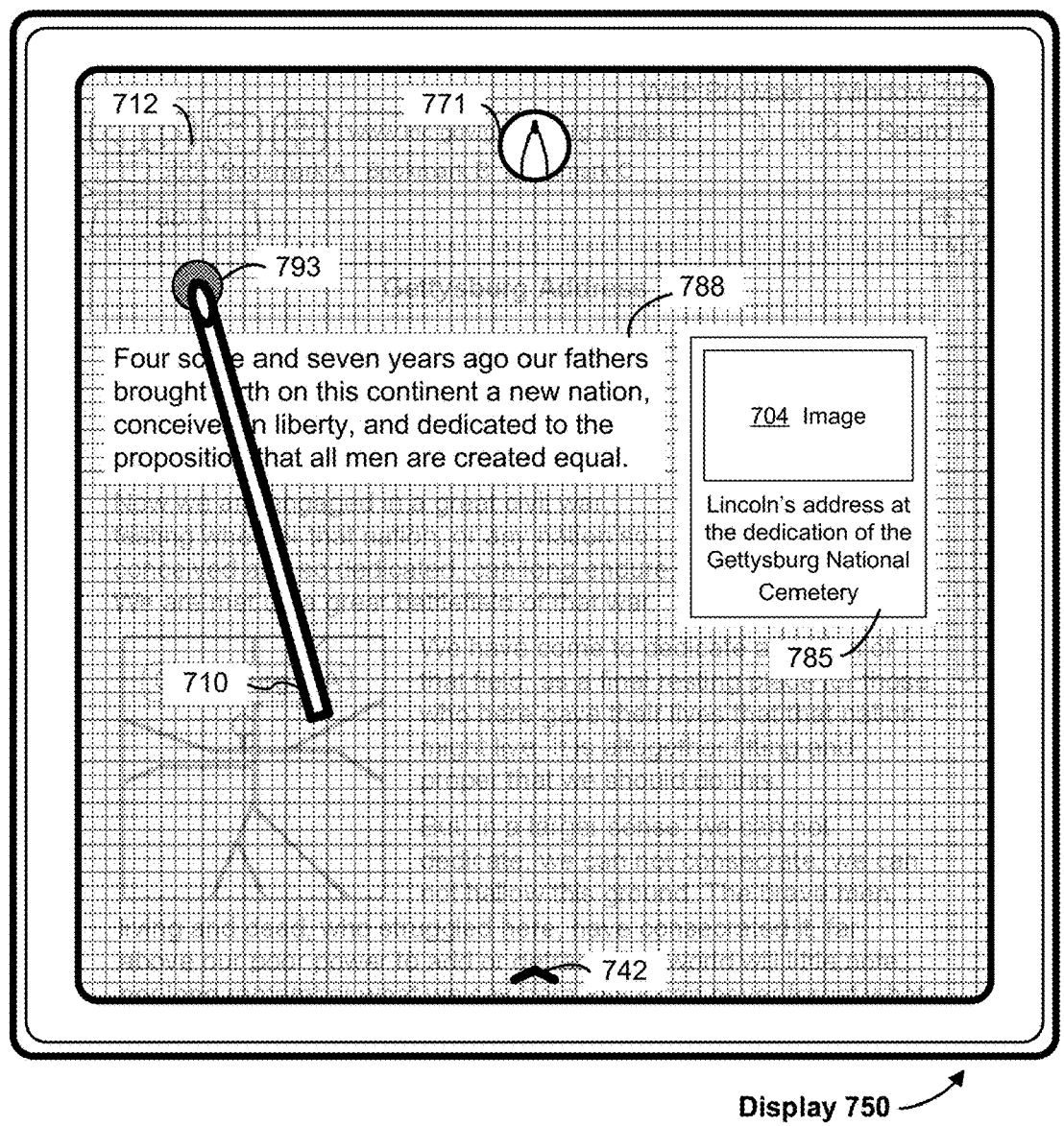
Figure 7G:
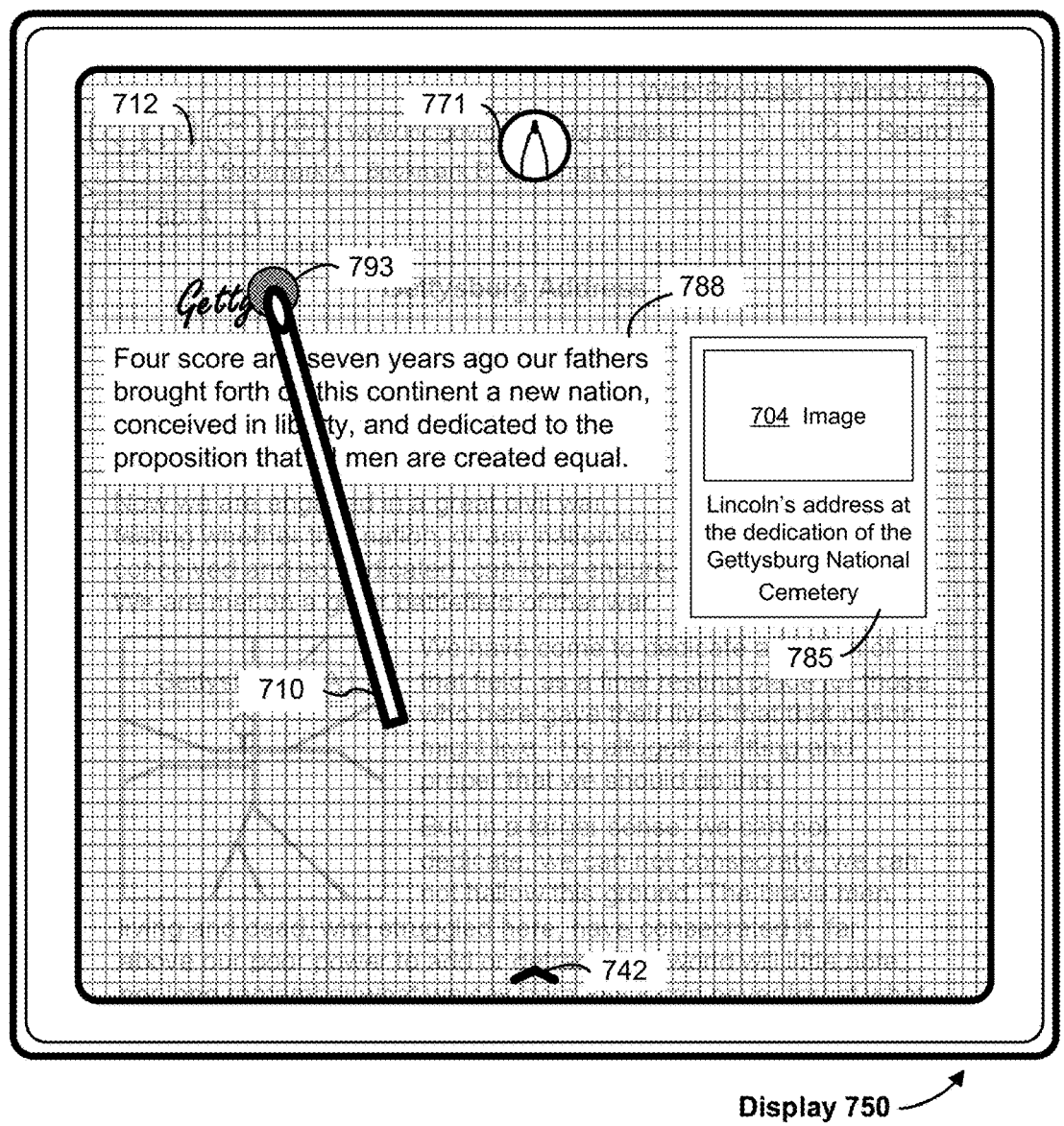
Figure 7H:
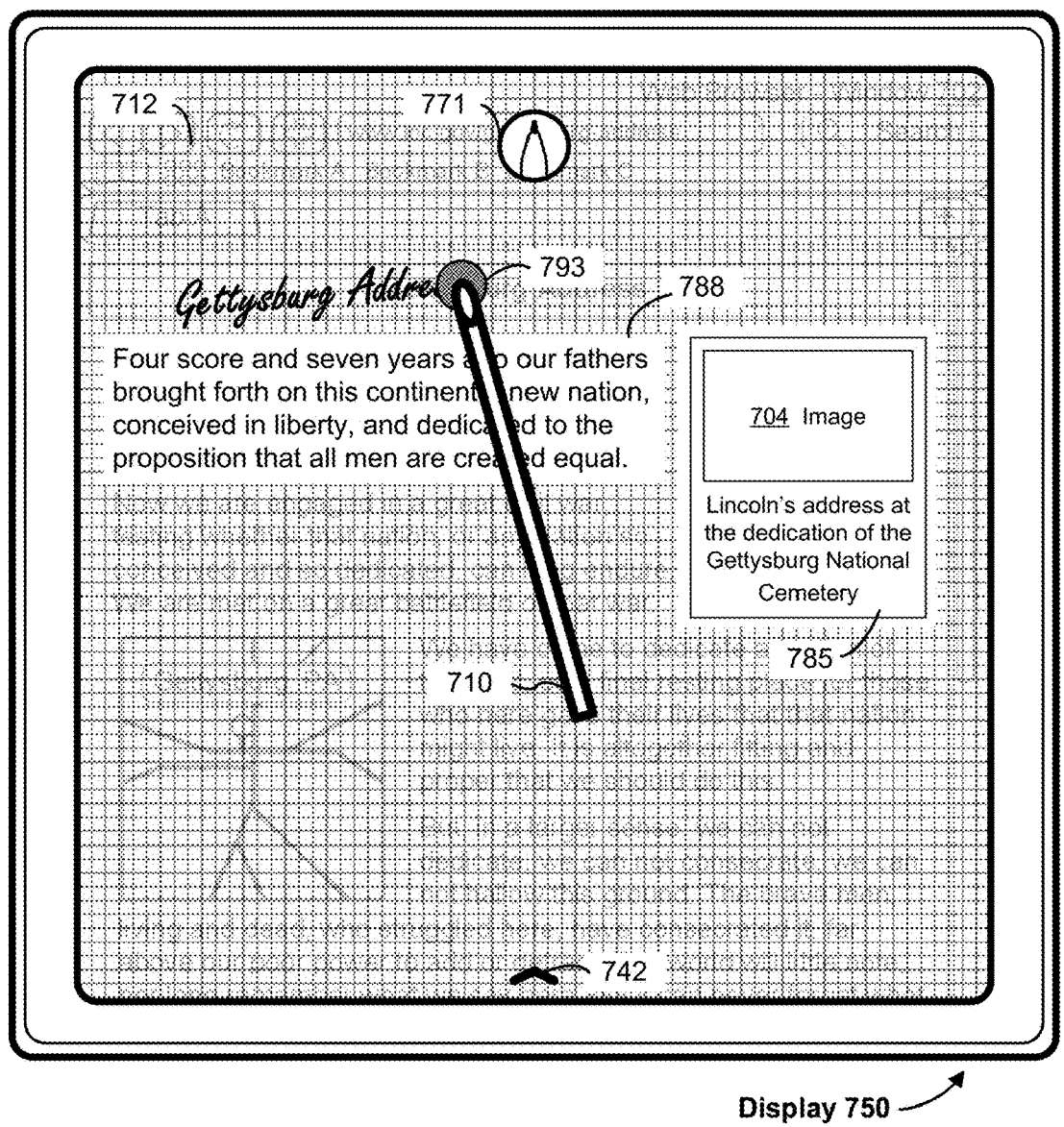
Figure 7I:
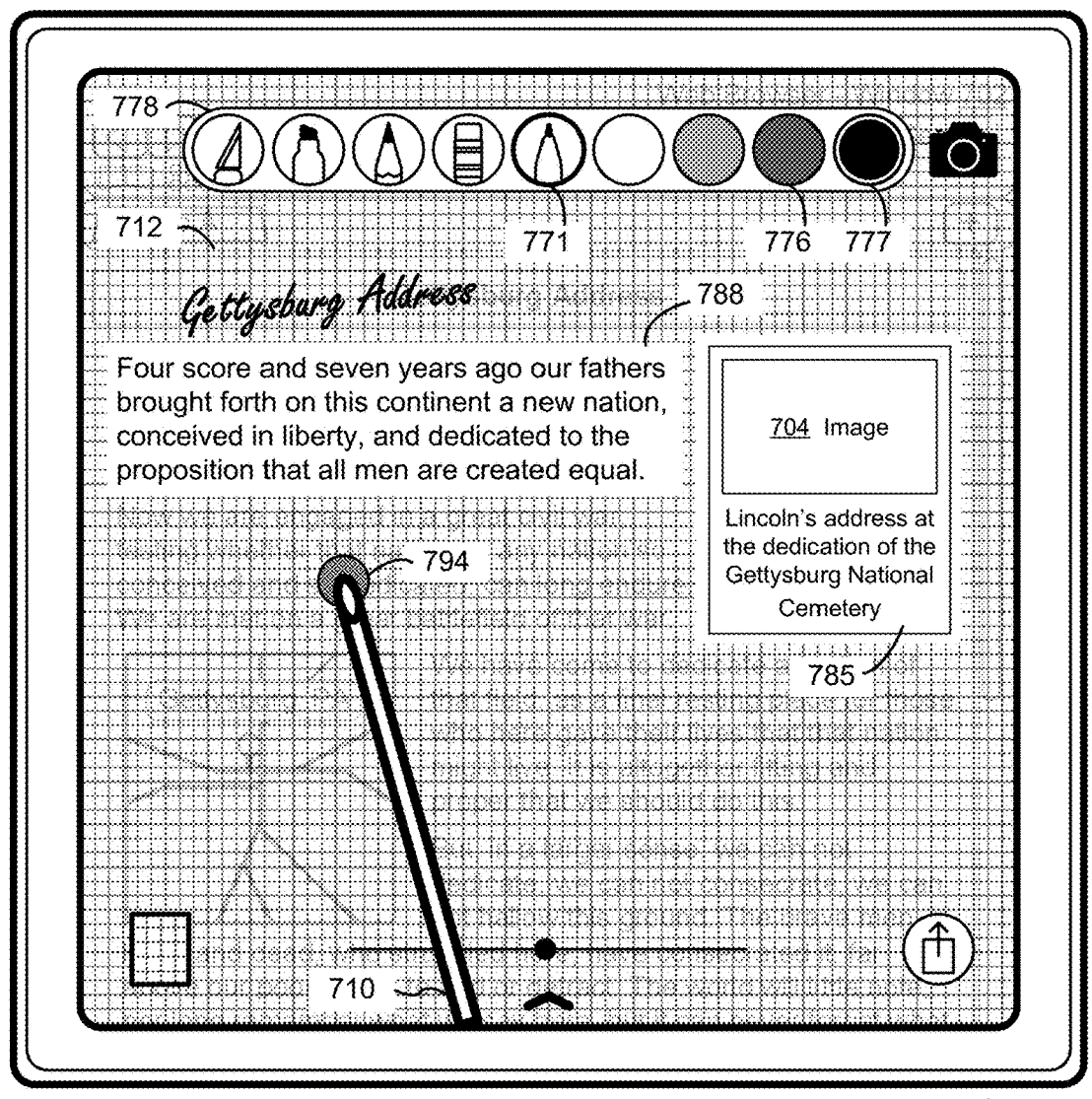
Figure 7J:
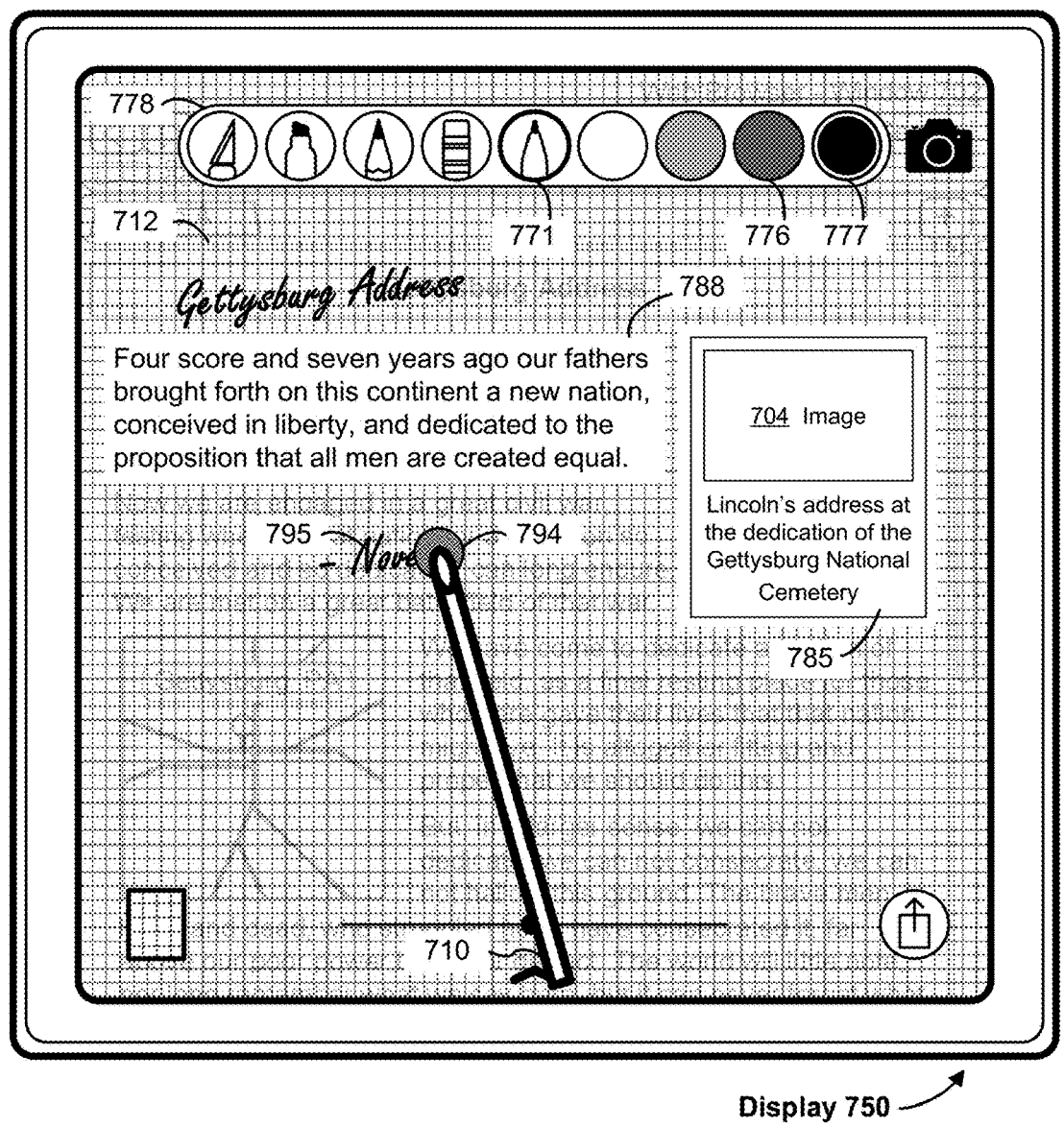
Figure 7K:
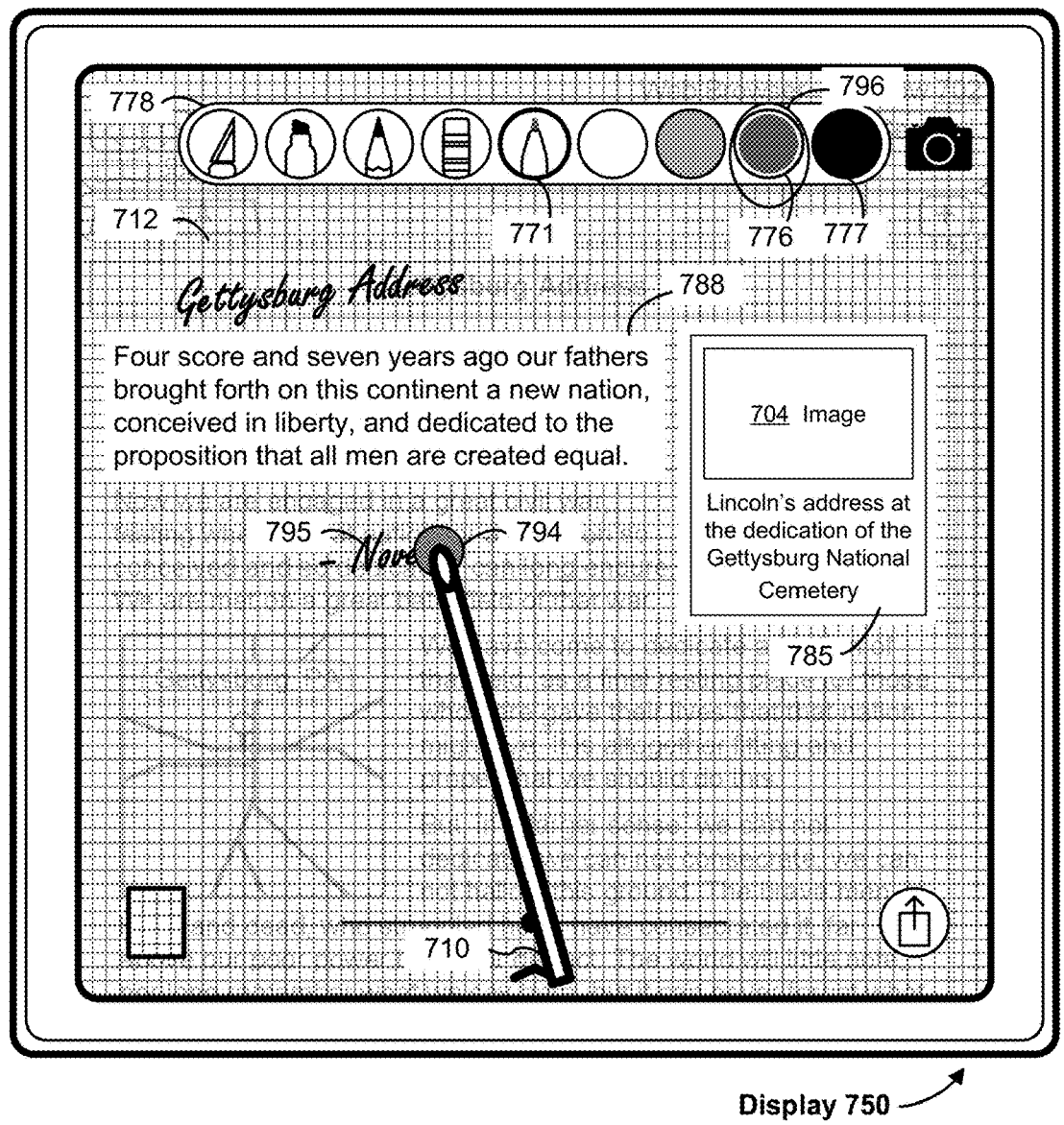
Figure 7L:
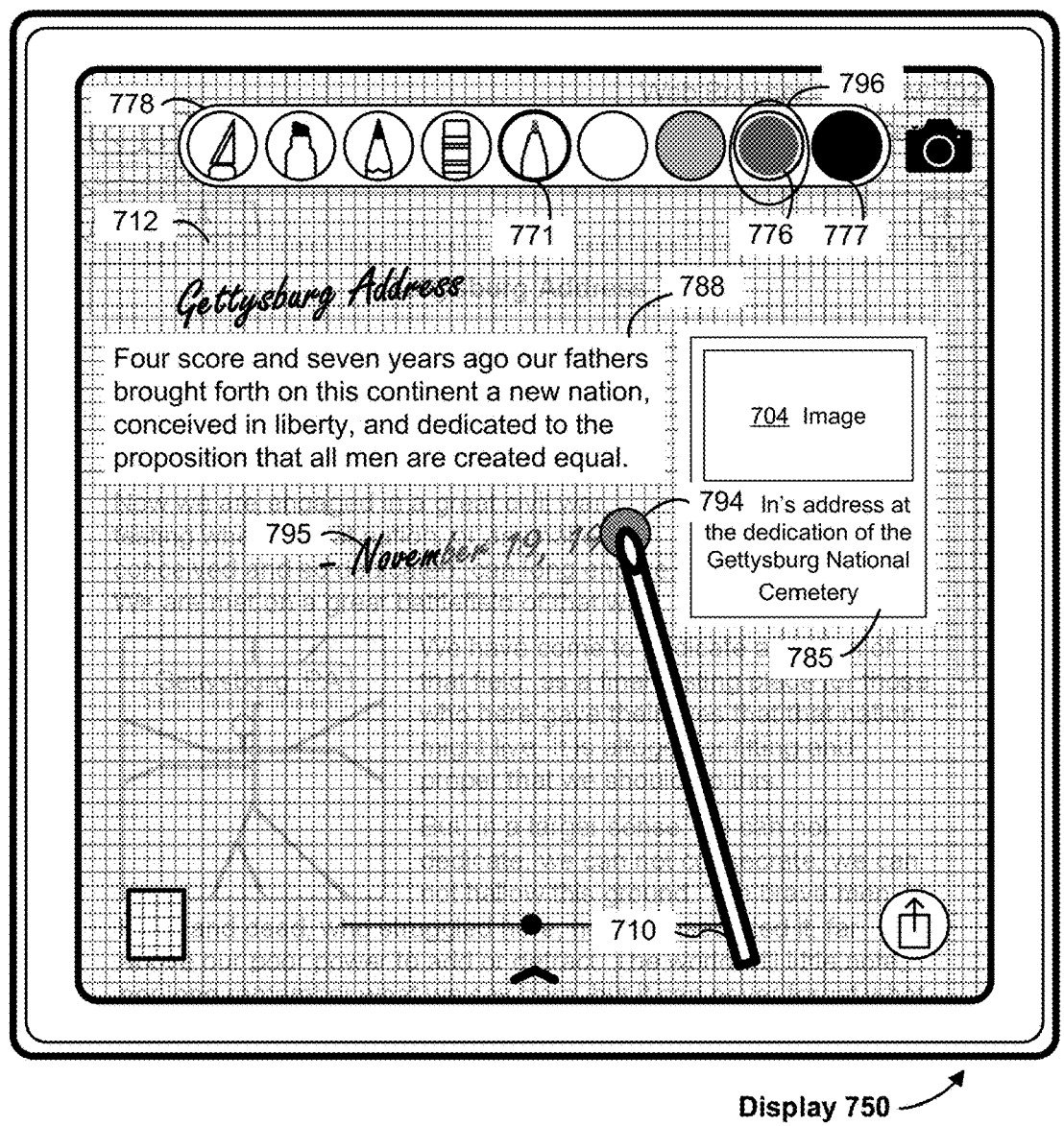
Figure 7M:
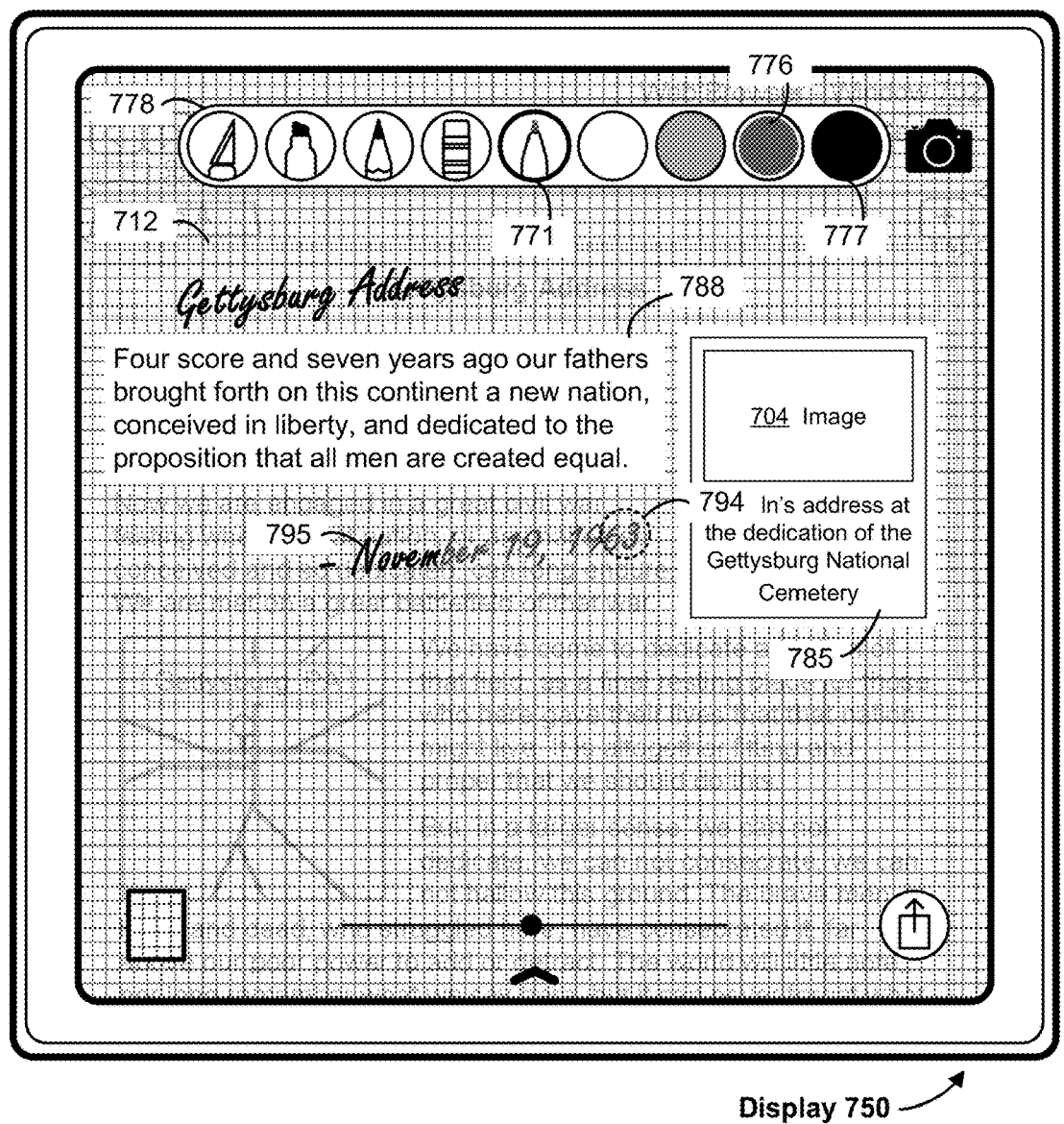
Figure 7N:
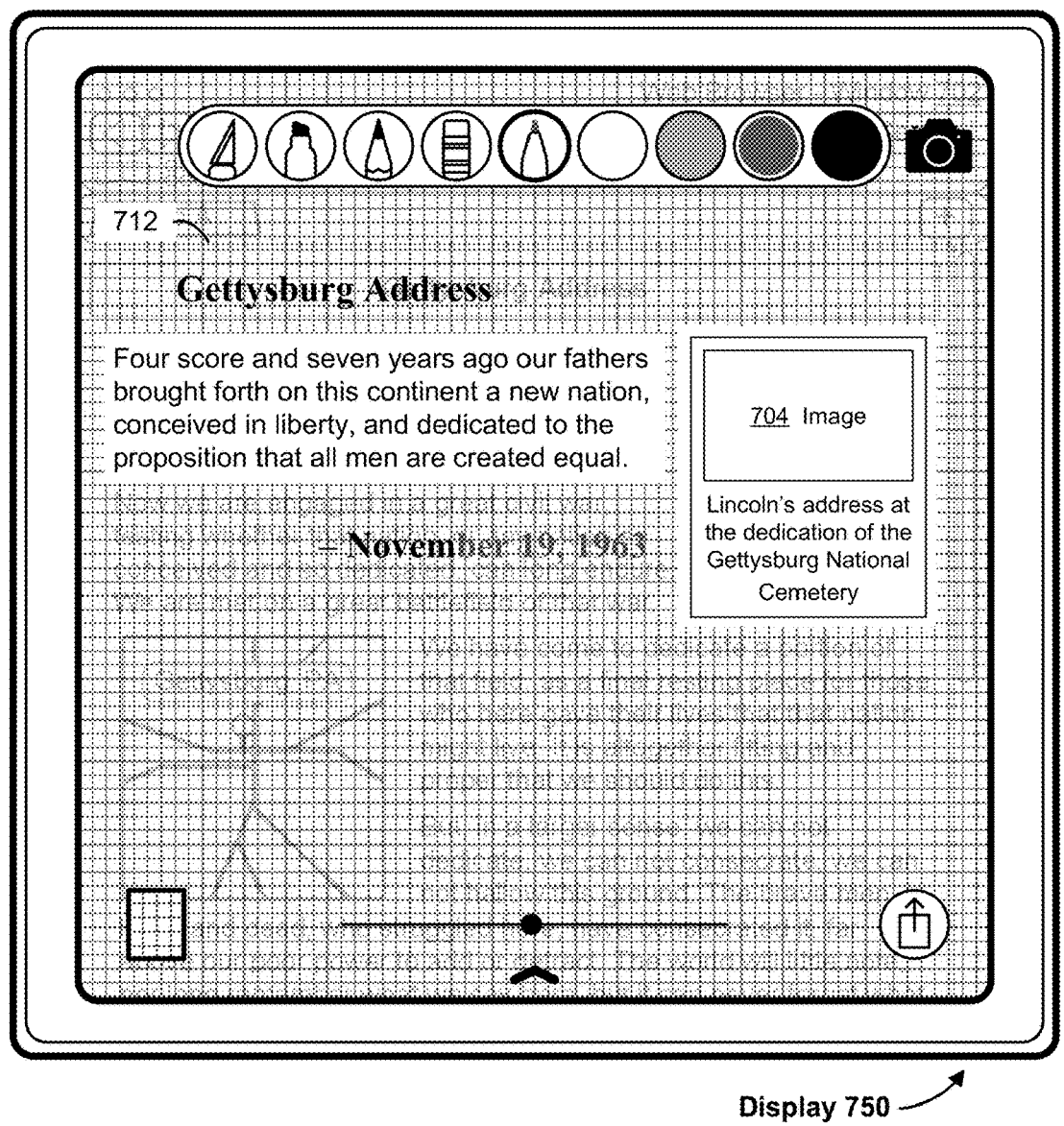
Figure 7P:
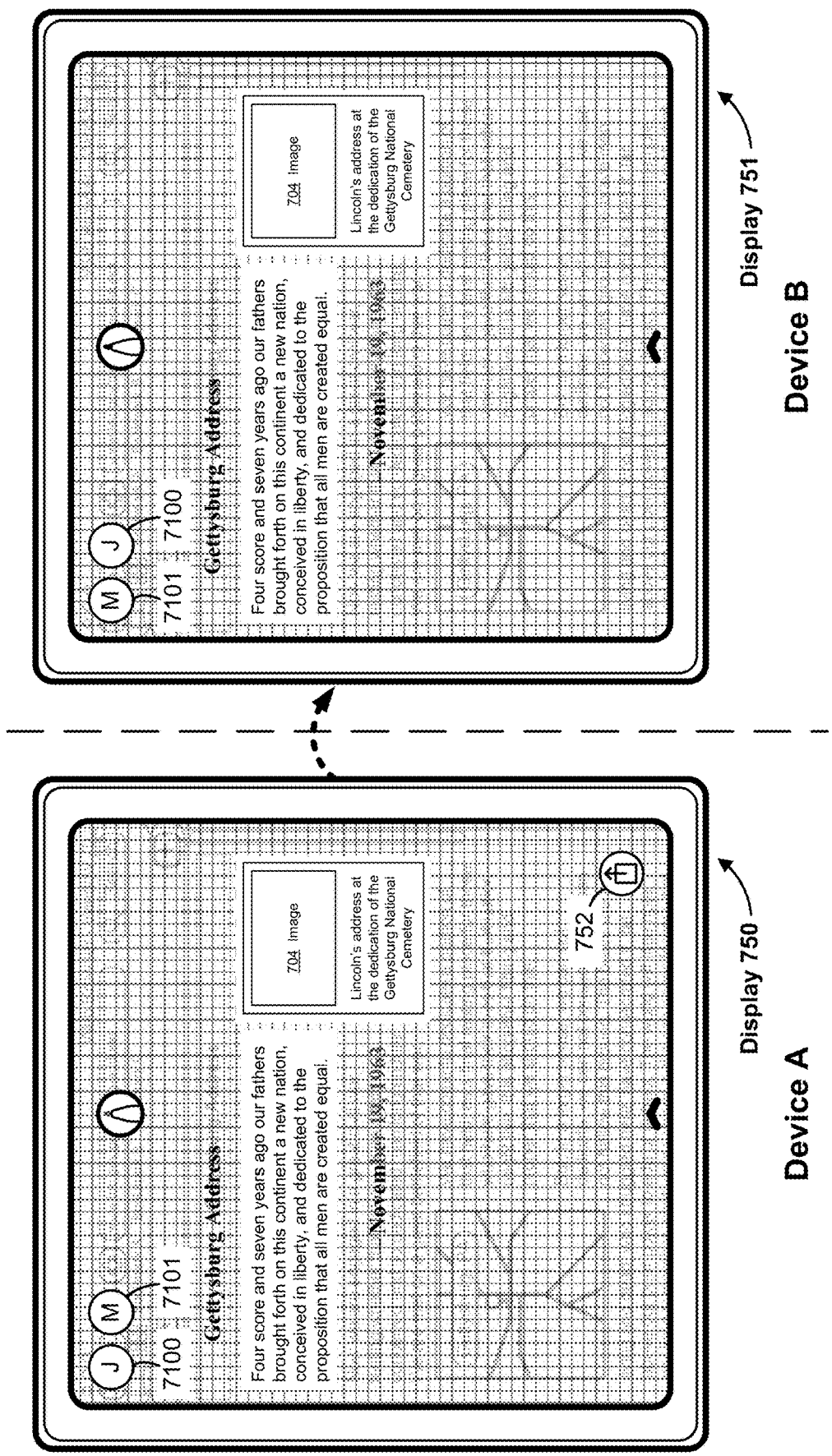
Figure 7Q:
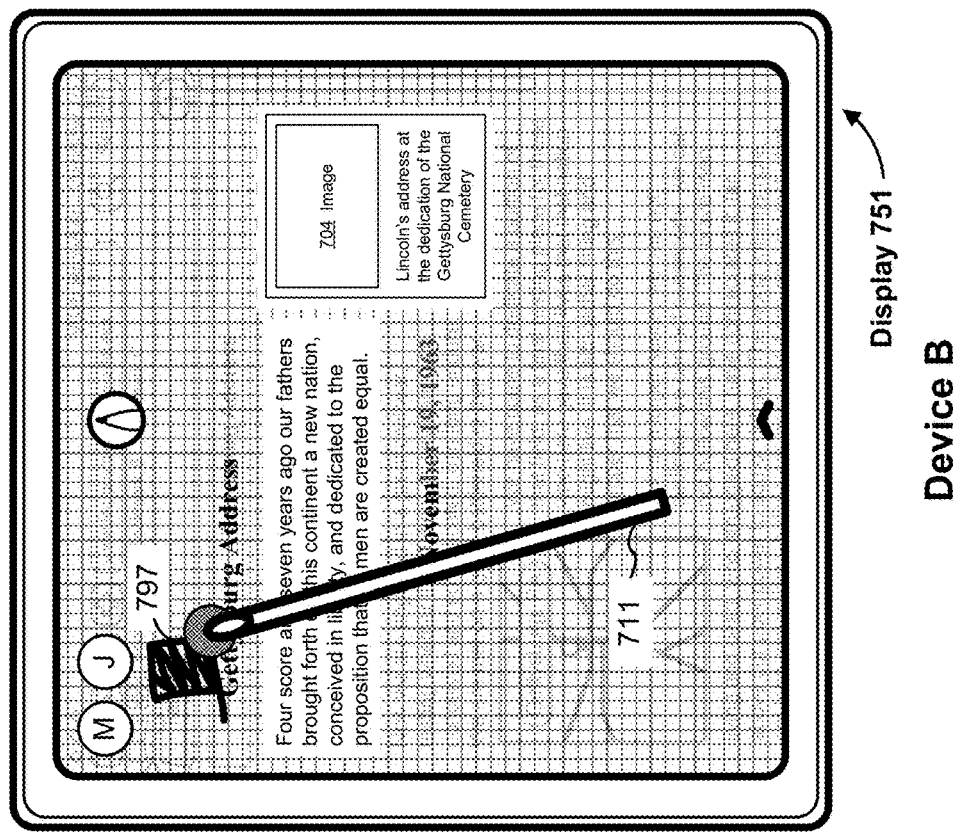
Figure 7Q:
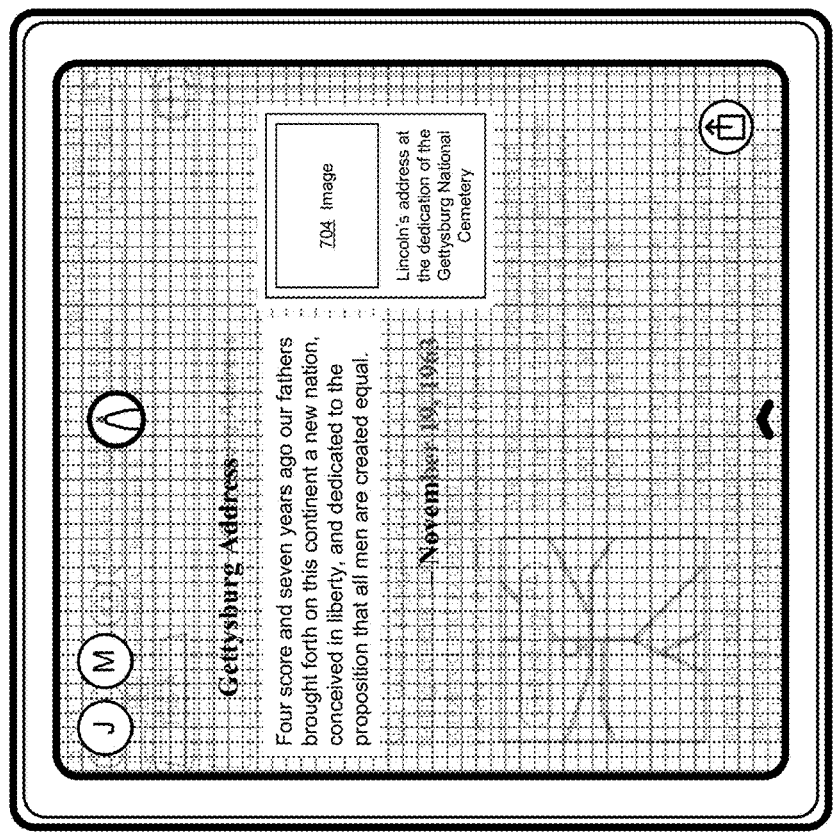
Figure 7R:
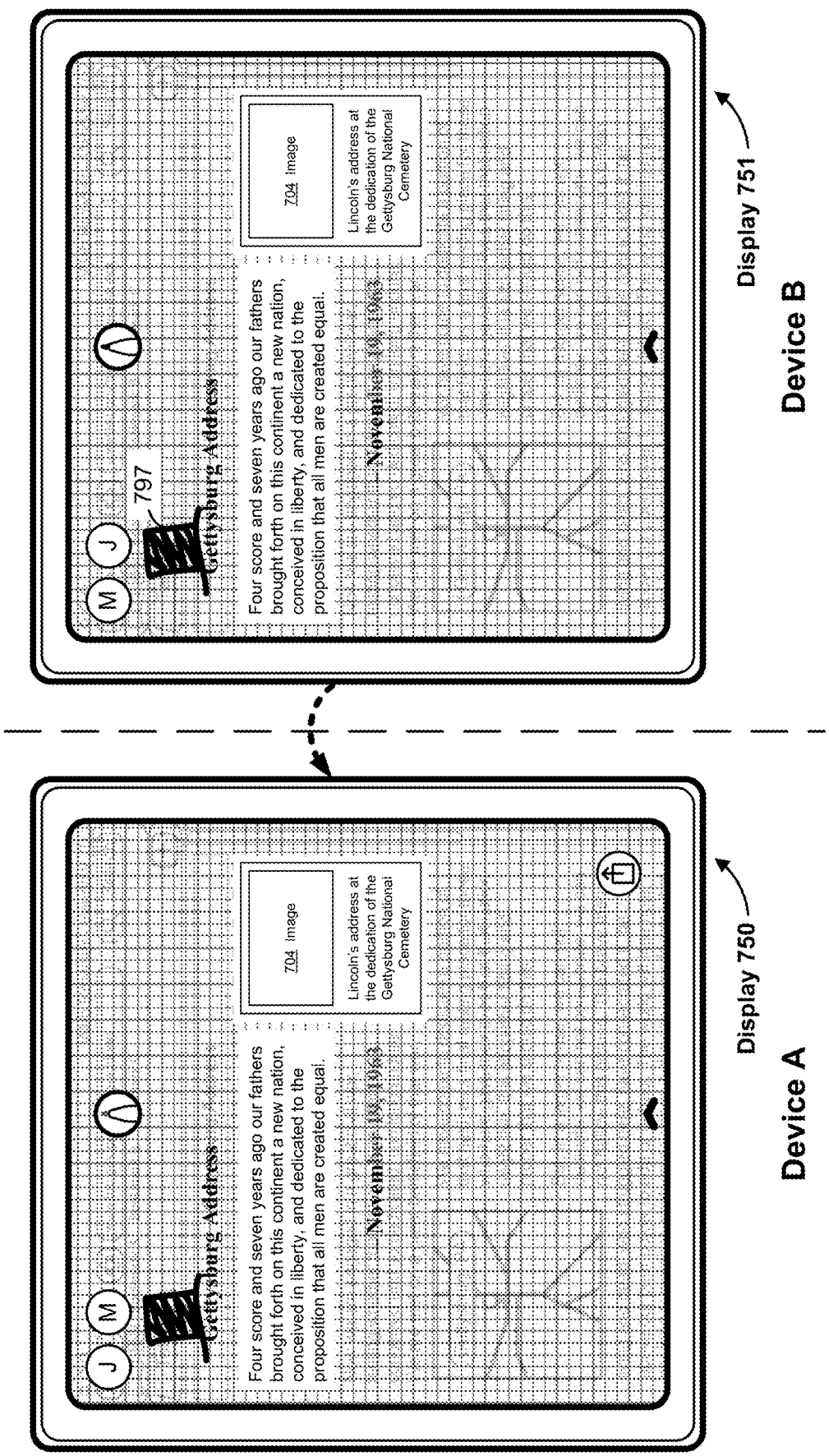
Figure 7S:
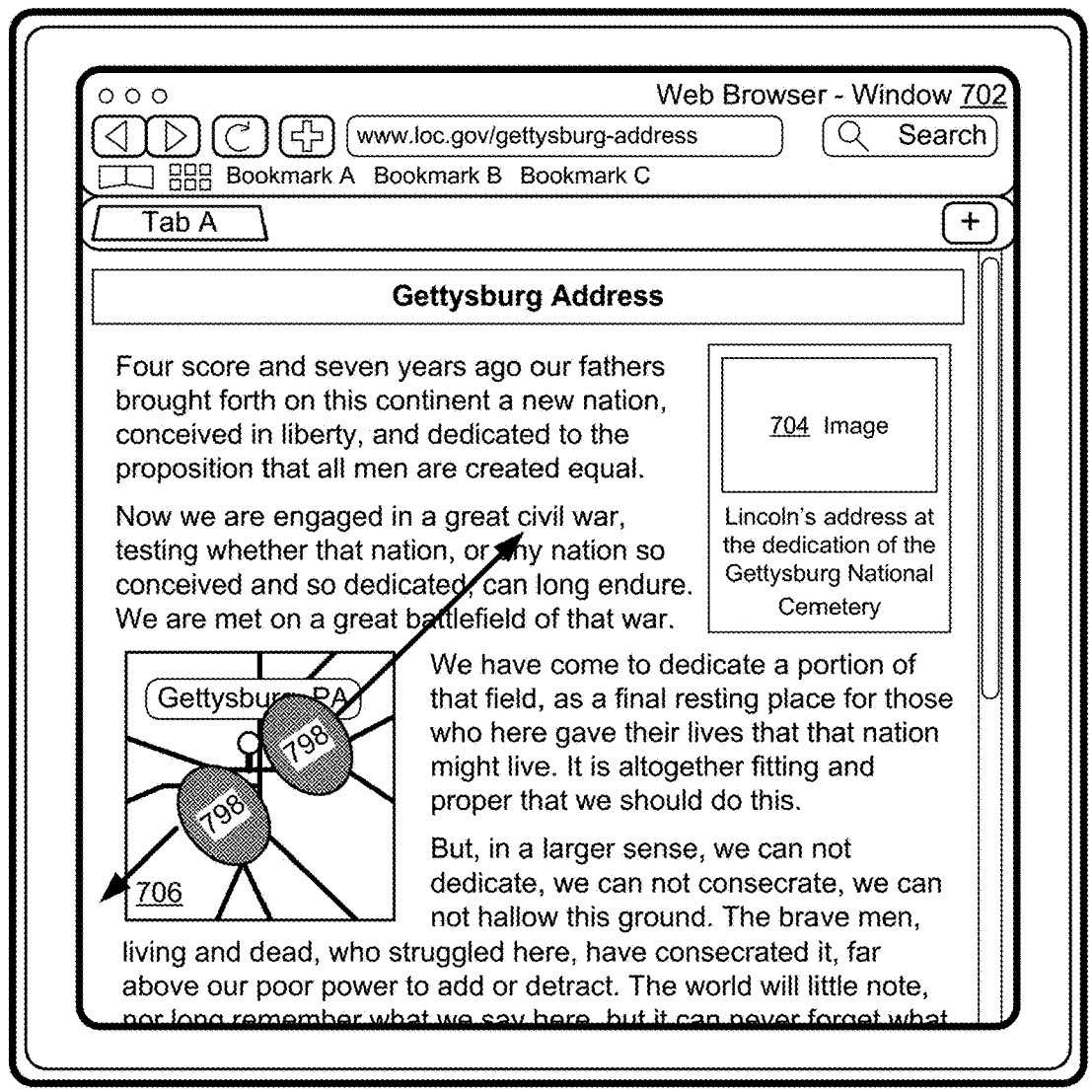
Figure 7T:
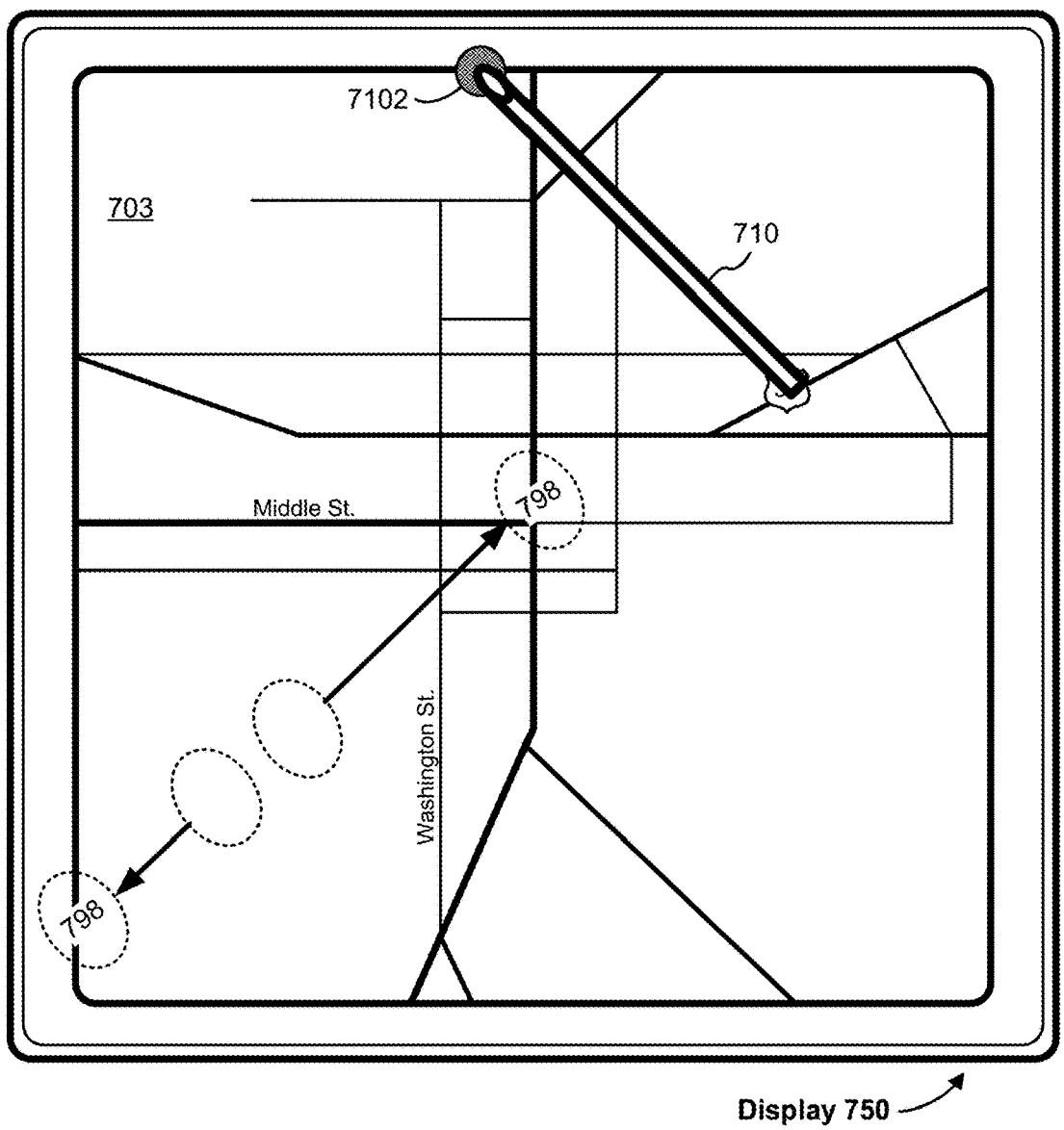
Figure 7U:
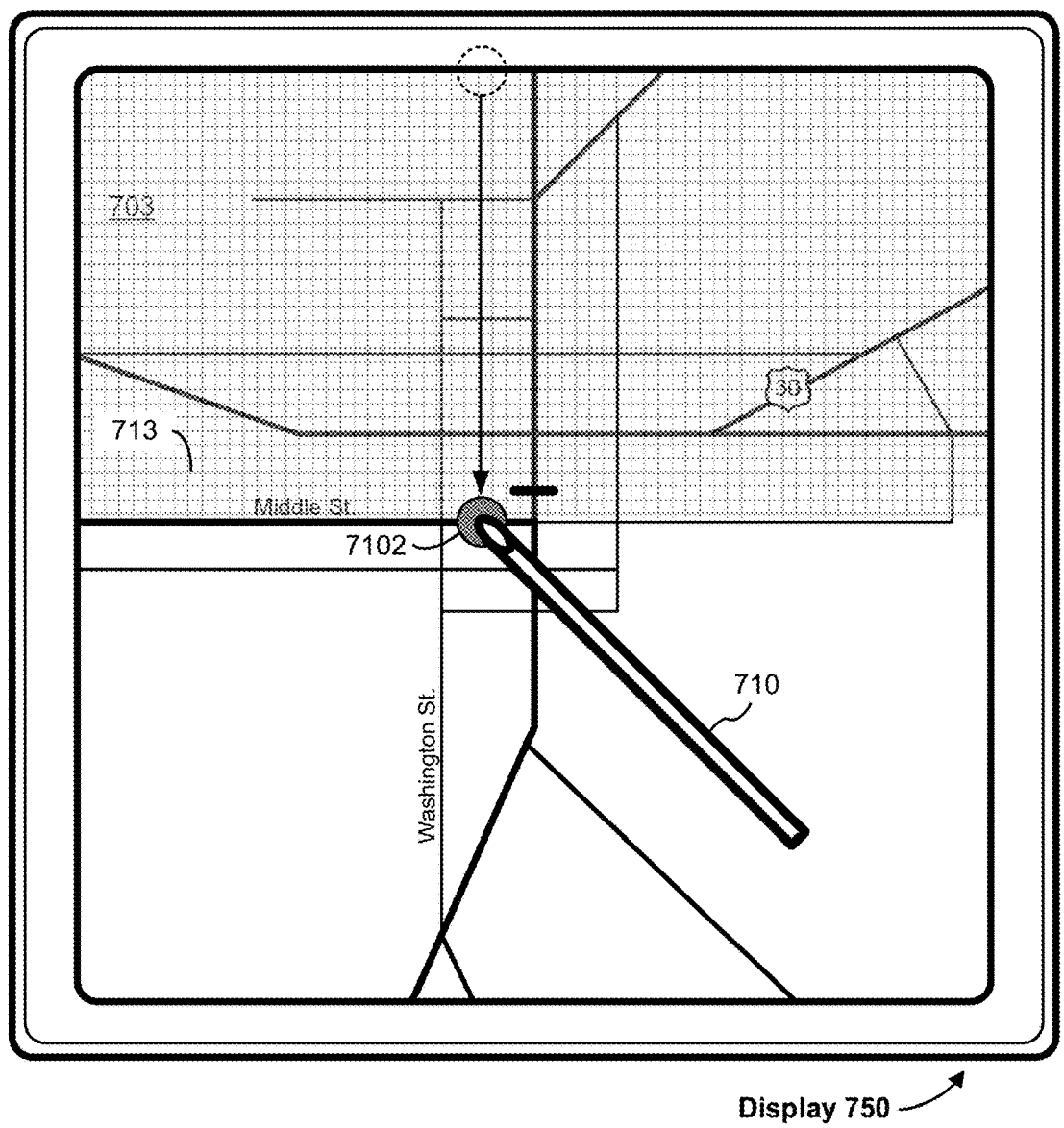
Figure 7V:
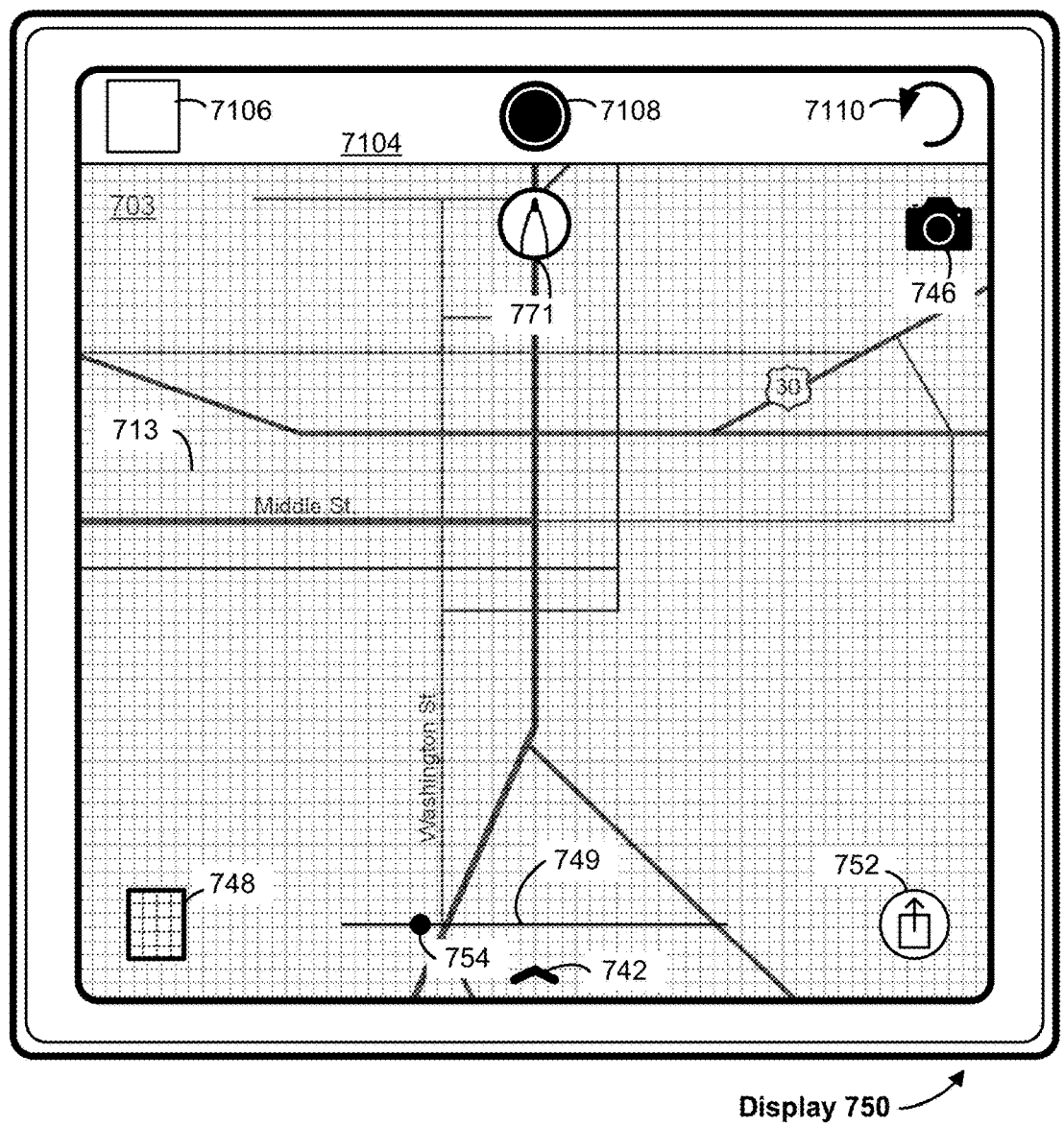
Figure 7W:
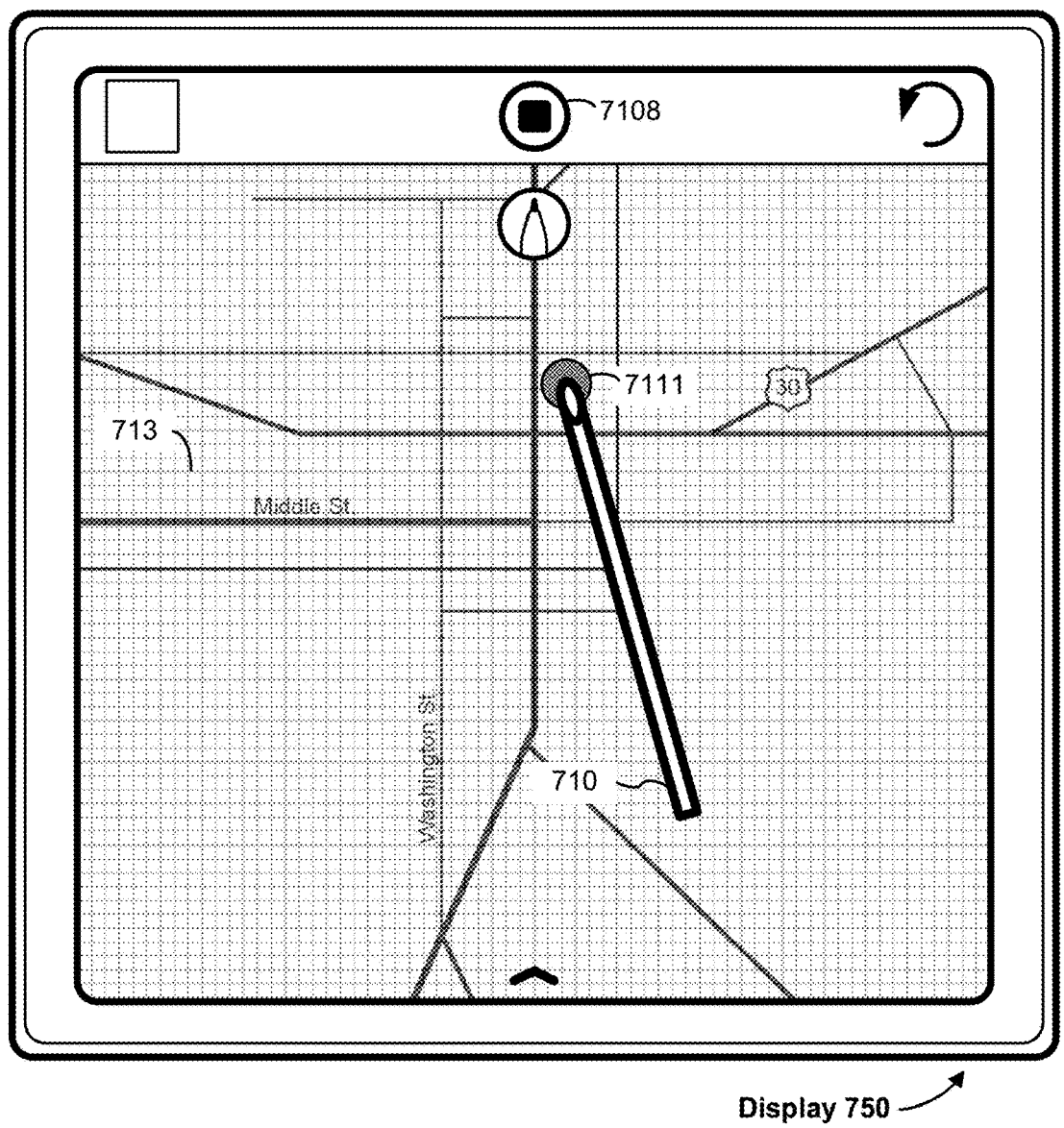
Figure 7X:
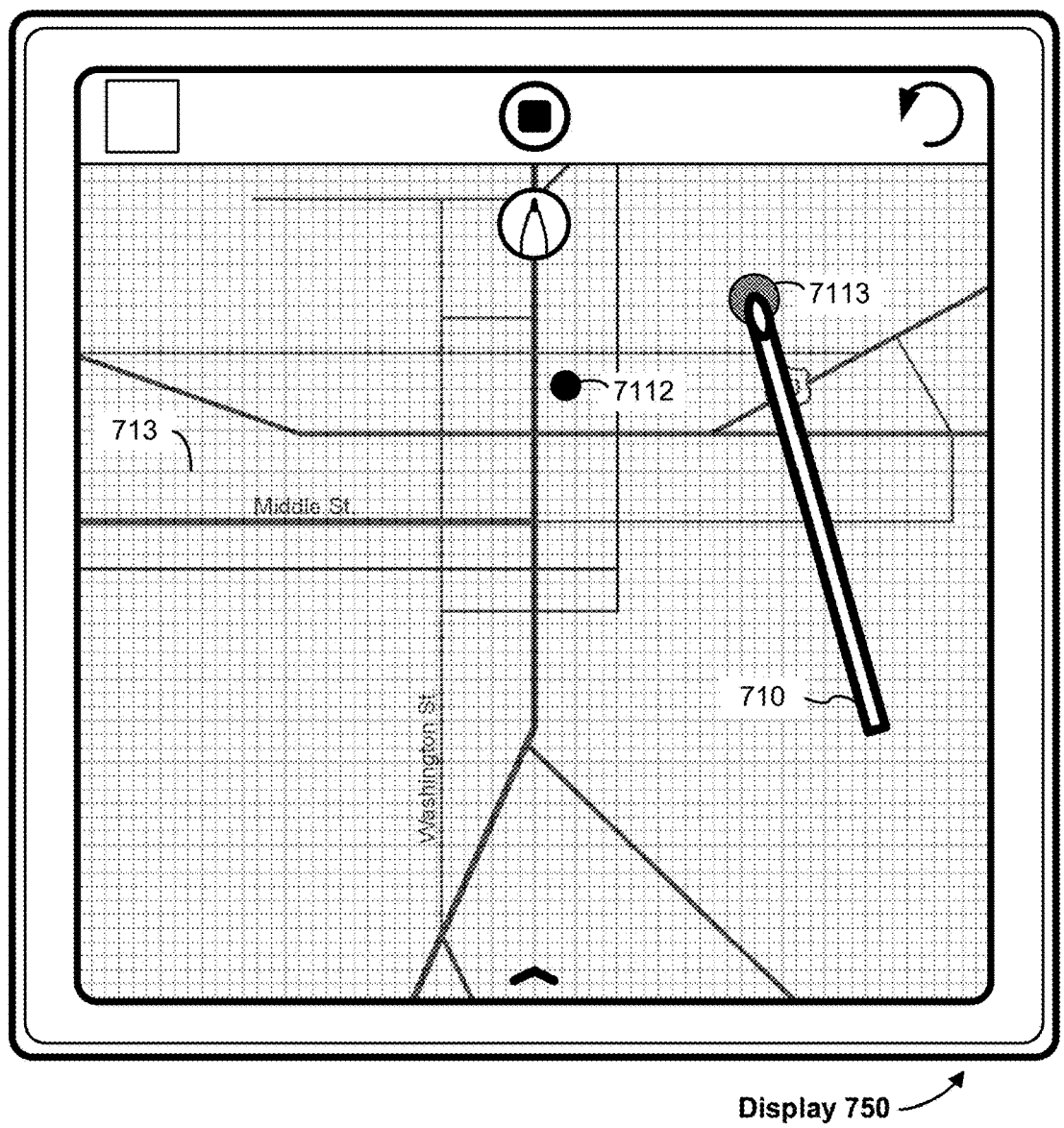
Figure 7Y:
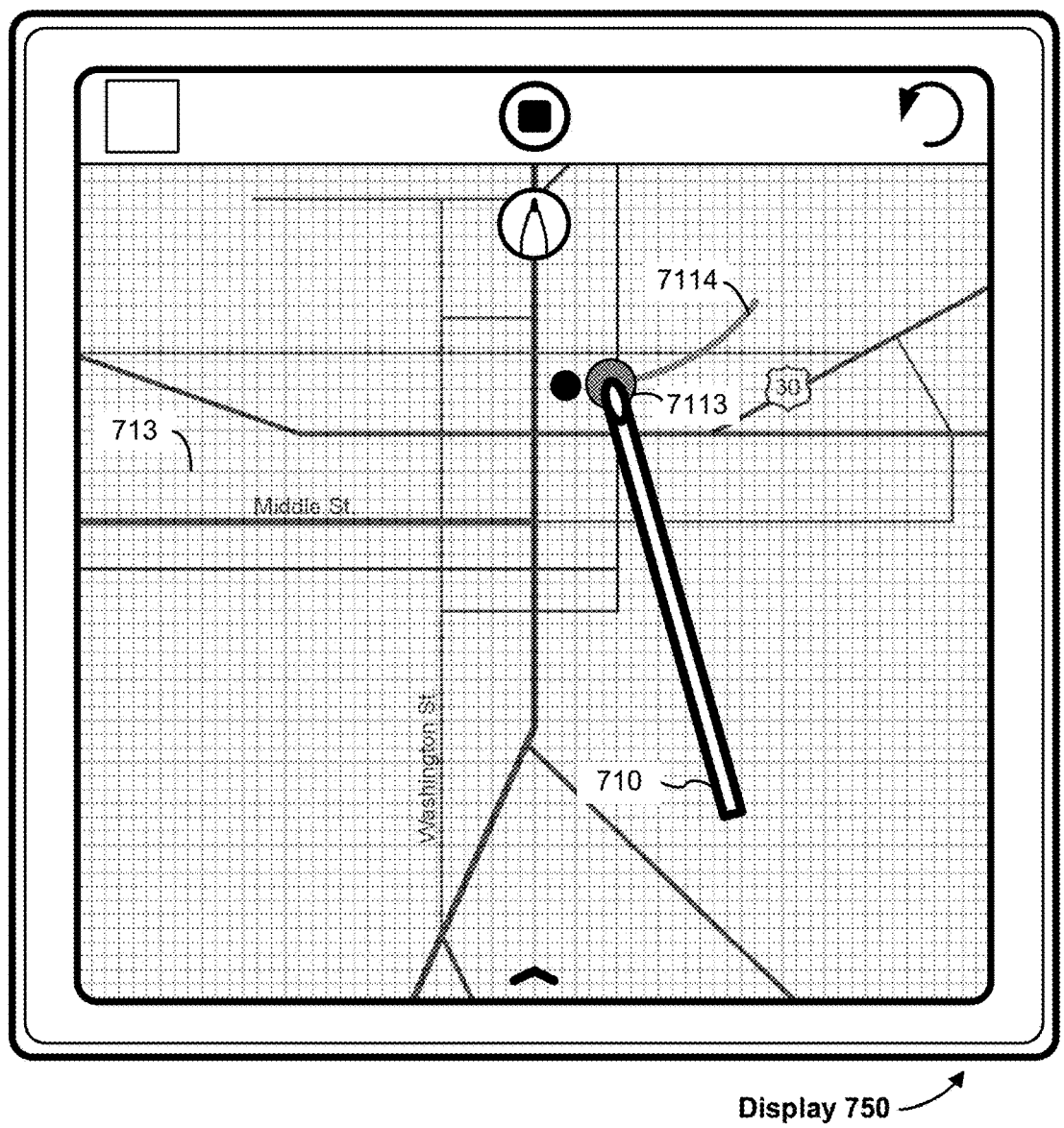
Figure 7Z:
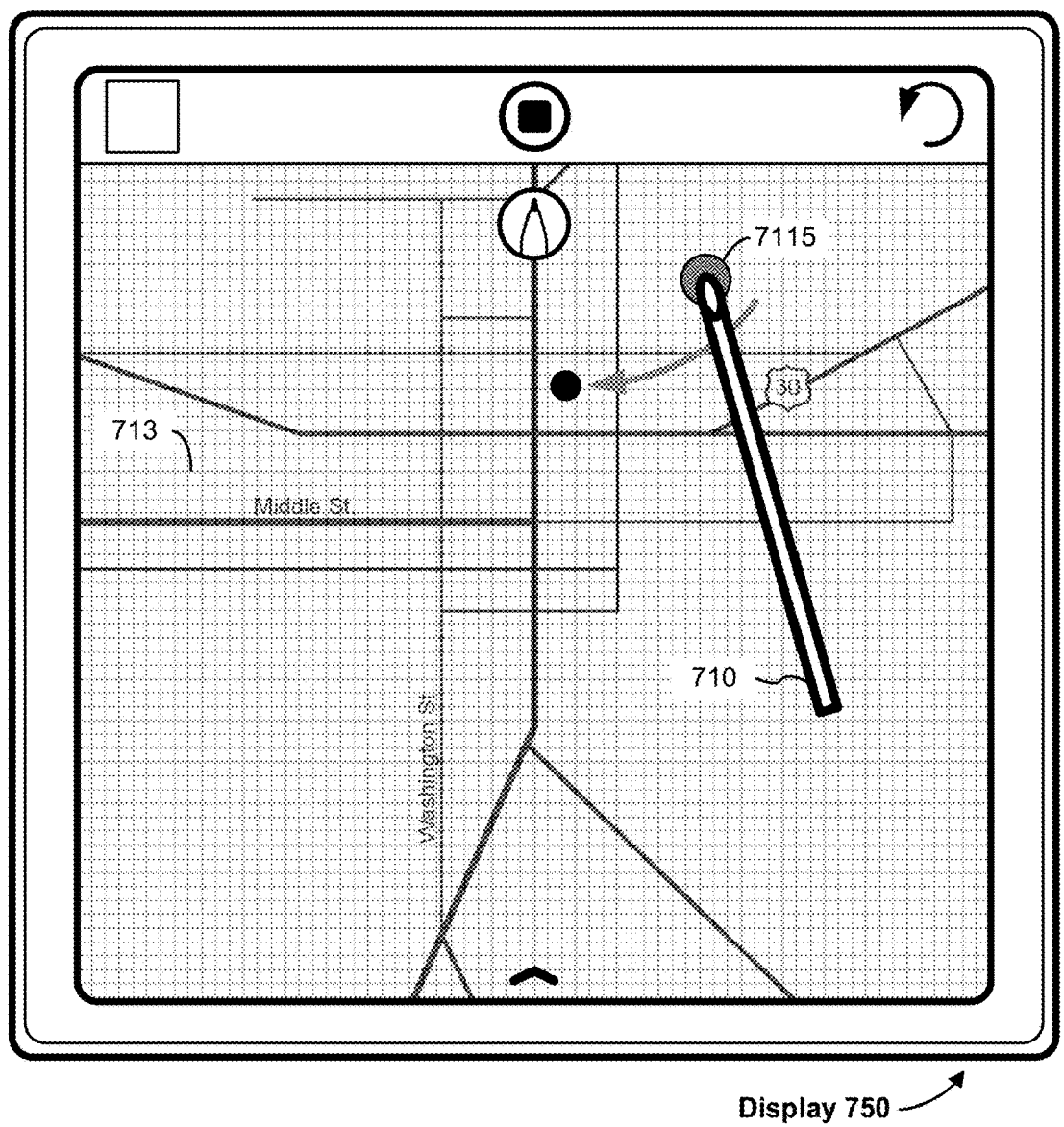

FIGS. 7Z and 7AA-7EE illustrate a sequence of transitions of annotation layer 712 from annotation layer 712 in FIG. 7Y. FIG. 7Z shows that user input 790 (e.g., a contact) is detected at a location corresponding to annotation tool icon 770. FIG. 7AA illustrates that user input 790 ceases to be detected (e.g., in accordance with liftoff of the contact), and further illustrates additional annotation tools displayed in response to detecting user input 790, including tool selection control region 778 (e.g., as described above with reference to FIGS. 7R-7T).

Next, FIG. 7BB shows that user input 791 (e.g., a contact) is detected at a location corresponding to felt tip pen tool icon 771. In response to user input 791, as shown in FIG. 7CC, the felt tip pen tool represented by felt tip pen tool icon 771 becomes the currently selected tool (e.g., displayed in the center position of tool selection control region 778 with the dark ring) and the previously selected tool (e.g., the virtual knife tool represented by virtual knife tool icon 770) is redisplayed in the left half of tool selection control region 778. In addition, color option icon 777 is displayed with a current selection indication (e.g., a white ring) to indicate that it is the currently selected color option for the felt tip pen tool represented by felt tip pen tool icon 771.

Next, FIG. 7DD shows that user input 792 (e.g., a contact) is detected at a location corresponding to slider position 754 (as shown, for example, in FIG. 7CC). In response to the movement of user input 792 as shown in FIG. 7EE, the opacity of annotation layer 712 is increased, and the visibility of the web browser application content displayed underneath annotation layer 712 is decreased.

FIG. 7FF-7NN illustrate a sequence of transitions of annotation layer 712 from annotation layer 712 in FIG. 7EE. In particular, FIGS. 7FF-7HH illustrate the addition of a first annotation to annotation layer 712 in response to detecting first additional user input 793. FIG. 7FF shows the initial position of user input 793 (e.g., a contact) by stylus 710 on annotation layer 712. As described above with reference to FIG. 7U, in some embodiments, the additional controls (e.g., icons 770, 740, 777, 746, 748, and 752 as shown in FIG. 7EE) cease to be displayed in response to detecting user input 793 provided using stylus 710 at a location on annotation layer 712 that does not correspond to any of the control affordances displayed in FIG. 7EE. Such an input (e.g., user input 793 provided using stylus 710 at a location on annotation layer 712 that does not correspond to any of the control affordances displayed in FIG. 7EE) is deemed to be intended for producing annotations on the annotation layer. FIG. 7GG-7HH illustrate the addition of a handwritten annotation (e.g., the phrase "Gettysburg Address") to annotation layer 712 in response to movement of user input 793 provided using stylus 710.

FIGS. 7II-7MM illustrate the addition of a second annotation to annotation layer 712 in response to detecting additional user inputs. In particular, FIG. 7II illustrates a transition of annotation layer 712 from annotation layer 712 in FIG. 7HH and shows the initial position of user input 794 by stylus 710 on annotation layer 712. FIG. 7JJ illustrates that, in response to movement of user input 794 using stylus 710, a first portion of a handwritten annotation 795 (e.g., the partial text "—Nove") having a line color set to a color option represented by color option icon 777 is added to annotation layer 712.

In some embodiments, while detecting movement of stylus 710 to produce handwritten annotation 795, a finger input is detected on a respective one of the annotation controls. For example, FIG. 7KK illustrates that user input 796 is detected at a location corresponding to color option icon 776 (as shown, for example, in FIG. 7JJ) in tool selection control region 778. In response to detecting user input 796 on the color option represented by color option icon 776, the line color of stylus 710 is changed from the color option represented by color option icon 777 to the color option represented by color option icon 776. FIG. 7KK shows that, in accordance with user input 796, color option icon 776 is displayed with a current selection indication (e.g., a white ring) to indicate that the corresponding color (e.g., the color represented by color option icon 776) is the currently selected color. Accordingly, a current selection indication is no longer displayed on color option icon 777. FIG. 7LL illustrates that, in response to continued movement of user input 794 using stylus 710, and in accordance with finger input 796 on color option icon 776, the line color of at least a portion of handwritten annotation 795 is changed to the color represented by color option icon 776.

FIG. 7MM illustrates the completed handwritten annotation 795 (e.g., the phrase "—Nov. 19, 1963") in accordance with ceasing to detect user input 794 (e.g., upon liftoff of the contact by stylus 710). The first portion of handwritten annotation 795 (e.g., the partial text "—Novem") has a line color represented by color option icon 777 (the color option selected for the first portion of handwritten annotation 795), while a second portion of handwritten annotation 795 (e.g., the partial text "ber 19, 1963") has a line color based on color option 776 (the color option selected by user input 796 for the second portion of handwritten annotation 795).

FIG. 7NN illustrates a transition of annotation layer 712 from annotation layer 712 in FIG. 7MM. In some embodiments, handwritten annotations are processed to generate searchable text associated with the handwritten annotation. In some embodiments, the searchable text is stored as metadata for the handwritten annotation or for the annotation layer more generally. In some embodiments, optical character recognition (OCR) is performed on the handwritten annotation to recognize handwritten characters. In some embodiments, display of the handwritten annotations is replaced with digital text (e.g., corresponding to recognized characters) in the annotation layer. In the example shown in FIG. 7NN, the handwritten annotations shown in FIG. 7MM (e.g., the phrases "Gettysburg Address" and "—Nov. 19, 1963") are replaced with digital text annotations that include recognized characters while maintaining other features of the handwritten annotations such as line color and approximate position in annotation layer 712.

FIGS. 7OO-7RR illustrate sharing and collaborative editing of annotation layer 712. FIG. 7OO illustrates annotation layer 712 of FIG. 7NN displayed on display 750 of Device A. In response to a user input from a first user of Device A to share annotation layer 712 (e.g., a user input, such as a tap gesture, is detected at a location corresponding to sharing icon 752), annotation layer 712 is shared with a second user using Device B. FIG. 7PP illustrates that annotation layer 712 is conveyed to a second user with Device B (e.g., by sending or communicating to Device B an object or other data that includes at least annotation layer 712) and displayed on display 751 of Device B. In addition, user icon 7100 labeled "J" (representing the first user of Device A) and user icon 7101 labeled "M" (representing the second user of Device B) are displayed (e.g., in the upper left corner of the respective devices) to indicate which users are participating in the sharing session. In some embodiments, as shown in FIG. 7PP, the user icon representing the respective user of the respective device is displayed in the leftmost user icon position on the respective device (e.g., user icon 7100 labeled "J" representing the first user at Device A is displayed in the leftmost user icon position on display 750 of Device A, whereas user icon 7101 labeled "M" representing the second user at Device B is displayed in the leftmost user icon position on display 751 of Device B).

In some embodiments, the annotation layer is configured to accept inputs from both the first user using Device A and the second user using Device B. For example, FIG. 7QQ illustrates hand-drawn annotation 797 added to the shared annotation layer during the sharing session by second user using stylus 711 at Device B. Accordingly, as illustrated in FIG. 7RR, hand-drawn annotation 797 is conveyed to and displayed during the sharing session in the shared annotation layer on Device A.

FIG. 7SS illustrates an alternate transition of user interface 702 from user interface 702 in FIG. 7A. In particular, FIG. 7SS illustrates user input 798 corresponding to a depinch gesture (e.g., detection of two finger contacts at the initial positions shown in FIG. 7SS and movement of the two contacts away from each other as indicated by the arrows) detected on user interface 702 at a location corresponding to map 706.

FIG. 7TT illustrates user interface 703 on display 750, in accordance with some embodiments. In the example shown in FIG. 7TT, user interface 703 includes a user interface of a map. In some embodiments, the map interface is displayed in response to a depinch gesture on user interface 702 of the web browser application shown in FIG. 7SS. In other embodiments, the map interface is associated with a map application (e.g., map module 154, FIG. 1A). FIG. 7TT also shows an initial position (e.g., an initial contact position) of user input 7102 by stylus 710 detected at or near the upper edge of display 750.

FIG. 7UU illustrates a transition of user interface 703 from user interface 703 in FIG. 7TT, through movement of user input 7102 by stylus 710 from its initial position as shown in FIG. 7TT. While user interface 703 continues to be displayed, annotation layer 713 is gradually displayed over at least a portion of user interface 703 as user input 7102 by stylus 710 moves along the path indicated in FIG. 7UU.

FIG. 7VV illustrates an annotation layer 713 displayed over user interface 703 on display 750, in accordance with some embodiments. In some embodiments, user interface 703 continues to be displayed and is at least partially visible through annotation layer 713. In some embodiments, annotation layer 713 includes one or more control affordances (e.g., annotation tool icon 771 indicating that the felt tip pen tool is the currently selected tool, camera icon 746, texture selection icon 748, opacity slider 749 with slider position 754, sharing icon 752, and annotation layer dismissal affordance 742). In some embodiments, annotation layer 713 includes annotation recording control region 7104 that includes, for example, saved annotations icon 7106, annotation recording button 7108, and reset button 7110.

FIGS. 7WW-7GGG illustrate a recorded sequence of annotations added to annotation layer 713 over a sequence of transitions from annotation layer 713 in FIG. 7VV. In some embodiments, a recorded sequence of annotations may be saved and/or shared with another user. In the example shown in FIGS. 7WW-7GGG, annotations are made on annotation layer 713 and recorded to provide map directions to a recipient of the recorded annotation sequence. In FIG. 7WW, annotation recording button 7108 indicates that annotation recording has been initiated (e.g., in response to a user input, such as a tap gesture, at a location corresponding to annotation recording button 7108). FIG. 7WW also shows that user input 7111 by stylus 710 is detected on annotation layer 713.

FIG. 7XX illustrates that, in response to user input 7111 (e.g., a tap gesture by stylus 710), location annotation 7112 (e.g., to indicate a location or landmark on the map) is added to annotation layer 713. FIG. 7XX further illustrates that user input 7113 by stylus 710 is detected.

FIG. 7YY illustrates that, in response to the movement of user input 7113 by stylus 710, arrow annotation 7114 is added to annotation layer 713.

FIG. 7ZZ illustrates that user input 7115 by stylus 710 is detected. FIG. 7AAA illustrates that, in response to movement of user input 7115 by stylus 710, handwritten annotation 7116 is added to annotation layer 713. In the example shown in FIG. 7AAA, handwritten annotation 7116 includes the phrase "You are here," to indicate a starting location (e.g., of a recipient of the recorded annotation sequence).

FIGS. 7BBB-7CCC illustrate additional annotations added to annotation layer 713. In particular, FIG. 7BBB illustrates annotation layer 713 after the addition of annotations such as route or path annotation 7117 (e.g., to indicate a route from one location to the next), location annotation 7118, route annotation 7119, and route information annotation 7120 (e.g., to provide information about a route, such as distance or duration of travel). FIG. 7CCC illustrates annotation layer 713 after the addition of annotations such as arrow 7121 and handwritten annotation 7122 to provide information about location annotation 7123.

FIGS. 7DDD-7FFF illustrate a transition of annotation layer 713 from annotation layer 713 in FIG. 7CCC. In particular, FIG. 7DDD illustrates a location annotation 7124 near the lower edge of annotation layer 713. FIG. 7DDD also illustrates an initial position of user input 7125 by stylus 710 near location annotation 7123.

FIG. 7EEE illustrates movement of user input 7125 by stylus 710 along the path indicated by dashed line 7126. In some embodiments, the path indicated by dashed line 7126 is displayed on display 750. In some embodiments, the path indicated by dashed line 7126 is not displayed on display 750. As shown in FIG. 7EEE, dashed line 7126 is drawn between approximately location annotation 7123 and location annotation 7124 (e.g., dashed line 7126 starts at a location adjacent to location annotation 7123 and ends at a location adjacent to location annotation 7124), and roughly follows portions of roads on user interface 703 between those location annotations (e.g., dashed line 7126 remains within a predefined distance from particular roads on the map, such as "Washington St.").

FIG. 7FFF illustrates that, in response to user input 7125 (e.g., upon liftoff of the contact by stylus 710), annotations 7127 and 7128 are added to annotation layer 713. In particular, annotation 7127 is a route annotation indicating a route from location annotation 7123 to location annotation 7124. Annotation 7128 is a route information annotation providing information about the route corresponding to route annotation 7127. In some embodiments, a route information annotation is created automatically based on route information determined from data or metadata of the underlying map content. In some embodiments, the route information annotation is added manually by a user.

FIG. 7GGG illustrates annotation layer 713 upon completion of recording the sequence of annotations added to annotation layer 713. In FIG. 7GGG, annotation recording button 7108 indicates that annotation recording has been stopped. Annotation layer 713 illustrates the complete set of annotations added to that layer, which includes the annotations described above with respect to FIGS. 7WW-7FFF. As shown in FIG. 7GGG, the complete set of annotations added to annotation layer 713 also includes arrow annotation 7130 and image annotation 7131, which correspond to and optionally provide information about (e.g., a photograph of) location annotation 7124, and route annotation 7132 and route information annotation 7133, which indicate a route to location annotation 7134 and provide information about that route.

FIGS. 7HHH-7III illustrate sharing a recorded sequence of annotations added to an annotation layer. FIG. 7HHH illustrates the annotation layer 713 of FIG. 7GGG displayed on display 750 of Device A. Annotation layer 713 is set to a lowest opacity 756 with the completed set of added annotations as described above with respect to FIGS. 7WW-7GGG. In addition, FIG. 7HHH illustrates additional annotation controls, including sharing icon 752.

FIG. 7III illustrates annotation layer 713 and its recorded sequence of annotations displayed on display 751 of Device B. In some embodiments, in response to a user input from a first user of Device A to share recorded annotation layer 713 (e.g., a user input at a location corresponding to sharing icon 752), recorded annotation layer 713 is shared with a second user at Device B. Recorded annotation layer 713 is displayed on Device B with play icon 7136, which, when activated (e.g., by a tap on the icon), initiates playback of the recorded sequence of annotations in annotation layer 713 (e.g., as a video) on display 751.

FIG. 7JJJ-7RRR illustrate playback of a recorded sequence of annotations added to an annotation layer. In some embodiments, the recorded sequence of annotations is played back (e.g., a video of the annotations being added to the annotation layer or an animation of the annotations being displayed on the annotation layer in the same order in which the annotations were added). FIG. 7JJJ illustrates user input 799 (e.g., a finger contact) by the second user at Device B at a location corresponding to play icon 7136.

FIG. 7KKK illustrates that, in response to user input 799 (or in response to ceasing to detect user input 799, e.g., in response to detecting liftoff of the finger contact), playback of the recorded sequence of annotations is initiated on display 751. In FIG. 7KKK, location annotation 7112 is displayed first on display 751.

Next, in FIG. 7LLL, arrow annotation 7114 and handwritten annotation 7116 are displayed, corresponding to location annotation 7112.

Next, in FIG. 7MMM, route annotation 7117 is displayed, illustrating a route from location annotation 7112 to location annotation 7118.

Next, in FIG. 7NNN, route annotation 7119 is displayed with route information annotation 7120, illustrating a route from location annotation 7118 to location annotation 7123.

Next, in FIG. 7OOO, arrow annotation 7121 and handwritten annotation 7122 are displayed, corresponding to location annotation 7123.

Next, in FIG. 7PPP, route annotation 7127 is displayed with route information annotation 7128, illustrating a route from location annotation 7123 to location annotation 7124.

Next, in FIG. 7QQQ, arrow annotation 7130 and image 7131 are displayed, corresponding to location annotation 7124.

Finally, in FIG. 7RRR, route annotation 7132 is displayed with route information annotation 7133, illustrating a route from location annotation 7124 to location annotation 7134.

FIG. 8A is a block diagram of an annotation layer application (also referred to herein as an annotation application) 195, in accordance with some embodiments. Annotation application 195 displays annotation layer 818 and updates the annotation layer in accordance with one or more inputs. In some embodiments, annotation application 195 receives content 802 from a user interface application (e.g., a web browser application) independent of the annotation application (e.g., application content underlying the annotation layer), which in some embodiments is performed in response to a user input (e.g., a user input corresponding to camera icon 746, FIG. 7J). Optionally, content 802 is preprocessed (e.g., using a preprocessing module 806) before being added to annotation layer 818. For example, in some embodiments, content 802 to be added to annotation layer 818 is determined based on user selection 804 of a portion of the application content (e.g., as described above with reference to FIGS. 7U-7Y).

In some embodiments, annotation application receives handwritten user input 808 (e.g., including an input provided using a stylus, as described above with reference to FIGS. 7FF-7MM) and adds annotations to annotation layer 818 accordingly. Optionally, handwritten input 808 is converted to text (e.g., using text conversion module 810) before being added to annotation layer 818 (e.g., as described above with reference to FIGS. 7MM-7NN).

In some embodiments, annotation application 195 receives inputs corresponding to tool and/or color selection 812, and updates annotation layer 818 accordingly. Similarly, in some embodiments, annotation application 195 receives inputs corresponding to texture control selection 814 and/or to transparency control selection 816, and updates annotation layer 818 accordingly.

In some embodiments, annotation layer 818 is shared to or with other devices. For example, annotation layer 818, with its respective annotations, may be shared as shared annotation layer 822 with a second device (e.g., for a second user using the second device). In some embodiments, a live and/or collaborative sharing session is established for the shared annotation layer 822 (e.g., as described above with reference to FIGS. 7OO-7RR).

In some embodiments, annotation layer 818 is saved in memory (e.g., memory 102, FIG. 1A) in saved annotations 196, for example. In some embodiments, annotation layer 818 is recorded (e.g., recorded using recording module 820) in conjunction with being saved to saved annotations 196. For example, in some embodiments, a saved annotation layer includes a recorded sequence of annotations (e.g., as described above with reference to FIGS. 7WW-7GGG). In some embodiments, a saved annotation layer can be recalled (e.g., from saved annotations 196) into annotation application 195 and redisplayed. In some embodiments, a saved annotation layer, including one with a recorded sequence of annotations, can be shared from annotation application 195 to another device (e.g., as described above with reference to FIGS. 7HHH-7RRR).

FIG. 8B is a block diagram illustrating example components for saved annotation layers, in accordance with some embodiments. In some embodiments, one or more annotation layers are saved in memory (e.g., memory 102, FIG. 1A) in saved annotations 196, for example. In some embodiments, the one or more saved annotation layers are saved as annotation objects (e.g., annotation objects 850-1 through 850-N) in saved annotations 196.

In some embodiments, respective annotation object 850-1 includes annotation metadata 852-1 as well as annotation data/state 854-1. Annotation data/state 854-1 represents the data and/or state of a saved annotation layer, and includes, in some embodiments, data for captured content 856-1 (e.g., content captured from an application user interface, such as representations 785 and 788, FIG. 7Y, or content 802, FIG. 8A) and annotations 858-1 (e.g., annotations 7112, 7114, 7116, 7118-7124, etc., FIGS. 7XX-7GGG, or handwritten input 808, FIG. 8A). In some embodiments, annotation metadata 852-1 for a saved annotation layer includes metadata for underlying application user interface content even if the content was not added to the annotation layer as captured content.

In some embodiments, respective annotation object 850-1 includes a recorded sequence of annotations added to the annotation layer represented by annotation object 850-1. In some embodiments, respective annotation object 850-1 includes data for the recorded sequence 860-1 of annotations 858-1.

FIGS. 9A-9E are flow diagrams illustrating method 900 of adding annotations to an annotation layer, in accordance with some embodiments. Method 900 is performed at an electronic device (e.g., device 300, FIG. 3, or portable multifunction device 100, FIG. 1A) with a touch-sensitive display. Some operations in method 900 are, optionally, combined and/or the order of some operations is, optionally, changed.

As described below, method 900 provides an intuitive way to add annotations to a unified annotation layer controlled by an independent annotation application, allowing annotation across a plurality of applications and application user interfaces.

Adding a representation of at least a portion of a user interface, concurrently displayed with an annotation layer, to the annotation layer in response to a user input provides a faster transfer of the portion of the user interface to the annotation layer and provides visual feedback to the user indicating that the portion of the user interface will be transferred to the annotation layer. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In addition, the method reduces the number, extent, and/or nature of the inputs from a user when adding annotations to application content, thereby creating a more efficient human-machine interface. For battery-operated electronic devices, enabling a user to enter inputs faster and more efficiently conserves power and increases the time between battery charges.

The device displays (902) a first user interface of a first application (e.g., user interface 702 of a web browser application, FIG. 7A). The first application (e.g., browser module 147, FIG. 1A) is a respective application of a plurality of applications (e.g., applications 136 other than annotation application 195, FIG. 1A), and the first user interface includes first application content.

In some embodiments, the plurality of applications includes (904) at least two applications selected from the set consisting of: a browser application, a photo application, a communications application, and a content editing application. In some embodiments, the plurality of applications also includes a maps application.

While displaying the first user interface of the first application, the device detects (906) a first input (e.g., user input 708, FIG. 7B or user input 732, FIG. 7G). In some embodiments, the first input is a gesture. In some embodiments, the gesture is an application-independent predefined gesture, independent of any of the plurality of distinct software applications. In some embodiments, the gesture is a swipe or pan gesture. In some embodiments, the first input is a tap gesture (e.g., by a finger contact).

In some embodiments, the device further includes (908) one or more sensors to detect signals from a stylus associated with the device, and the first input is a first gesture performed using a stylus and selected from the set consisting of: an edge gesture, which moves from an edge of the touch-sensitive display to an interior position of the touch-sensitive display (e.g., user input 708, FIGS. 7B-7C), a pen flick gesture that includes a flick motion toward the touch-sensitive display, and a gesture on a predefined affordance displayed on the touch-sensitive display. In some embodiments, the predefined affordance is not responsive to touch inputs from a finger contact. In some embodiments, the predefined affordance is smaller than a standard size of touch targets for finger contacts (e.g., because a stylus is more precise and is able to be used to reliably select smaller touch targets).

In some embodiments, detecting the first input includes (910) determining that the first gesture is performed using the stylus. In some embodiments, in response to detecting a non-stylus input that is an edge gesture, the device performs a different operation distinct from displaying the annotation layer. For example, in some embodiments, when an edge gesture performed with a finger is detected, a different user interface is displayed that is distinct from the annotation user interface, such as a control center user interface (that includes controls for controlling functions of the device), a notification center user interface (that includes notifications of communications received by the device), or a previously displayed page user interface (e.g., as a result of performing a navigation operation such as navigating backward by one or more pages). In some embodiments, the device determines upon detecting an edge gesture whether the edge gesture is being performed with a finger or a stylus and displays the annotation user interface if the edge gesture is being performed with a stylus (e.g., as described above with respect to FIGS. 7B-7C) and displays a different user interface if the edge gesture is being performed with a finger (e.g., as described above with respect to FIGS. 7D-7E).

In some embodiments, the first input is detected (912) independently of the plurality of applications. In some embodiments, the first input is detected while executing or displaying any of the plurality of applications.

In response to detecting the first input (e.g., user input 708, FIG. 7C), the device continues (914, FIG. 9B) to display the first application content and, in addition, displays an annotation layer (e.g., annotation layer 712, FIG. 7C) over at least a first portion of the first user interface (e.g., user interface 702 of the web browser application, FIG. 7C). The annotation layer is associated with a user application (e.g., annotation application 195, FIG. 1A) distinct from the plurality of applications.

In some embodiments, the annotation layer has (916) an adjustable opacity (e.g., as described above with respect to FIGS. 7J-7M), and the device changes the opacity of the annotation layer (e.g., as indicated by slider positions 753, 754, 756, or 758, FIGS. 7J-7M) in response to a fifth input, wherein increasing the opacity of the annotation layer decreases the visibility of application content that is displayed underneath the annotation layer.

In some embodiments, the annotation layer has (918) an adjustable texture (e.g., as described above with respect to FIGS. 7P-7Q). In some embodiments, the adjustable texture is solid, ruled, grid, dotted, or semitransparent. In some embodiments, the texture includes fading, blurring, and/or translucency.

While displaying the annotation layer over at least the first portion of the first user interface, the device detects (920) a second input (e.g., user input 782, FIG. 7U).

In some embodiments, in response to detecting the second input (922), the device creates (924) a representation of at least a second portion of the user interface that is added to the annotation layer.

In response to detecting the second input (922), the device adds (926) the representation of the at least a second portion of the first user interface (e.g., representation 785, FIG. 7W) to the annotation layer (e.g., a screen grab or screen capture of application content displayed underneath the annotation layer, for an overlaid annotation layer configuration, or alongside the annotation layer, for a side-by-side configuration in which the annotation layer is displayed alongside the first application content).

In some embodiments, the second input is (928) a gesture having a path, and a boundary of the second portion of the user interface to be represented in the annotation layer is determined based on the path of the second input gesture (e.g., as described above with reference to FIGS. 7U-7W). In some embodiments, the second input corresponds to a virtual knife tool (e.g., virtual knife tool 770, FIG. 7U) for selecting content to add to the annotation layer. In some embodiments, the virtual knife tool is one of the available tools or tool modes for the annotation layer (e.g., as described above with reference to FIG. 7R). In some embodiments, the virtual knife tool is one of the available tools or tool modes for a stylus. In some embodiments, the boundary of the second portion of the user interface (e.g., as indicated by selection indication 784, FIG. 7V) is the boundary of a content region (e.g., the content corresponding to representation 785, FIG. 7W) to be added to the annotation layer. In some embodiments, the boundary is based on the path of the gesture and, optionally, structure of the content (e.g., the underlying application content). In some embodiments, the boundary of the content region is automatically or intelligently determined based on a structure of the content even if the gesture path deviates from the content boundary (e.g., as described above with reference to FIGS. 7X-7Y).

While displaying the representation in the annotation layer, the device detects (930, FIG. 9C) a set of one or more additional inputs (e.g., user input 793 in FIG. 7FF or user input 794 in FIG. 7II).

In response to detecting the set of one or more additional inputs, the device adds (932) annotations to the annotation layer (e.g., annotation 795, FIG. 7MM).

In some embodiments, the representation is added (934) to the annotation layer under control of the user application distinct from the plurality of applications (e.g., annotation application 195, FIG. 1A), and the annotations are added to the annotation layer under control of the user application distinct from the plurality of applications.

In some embodiments, adding annotations to the annotation layer is (936) responsive to both the set of one or more additional inputs and application content that is displayed underneath the annotation layer. In some embodiments, this is accomplished using metadata of the underlying application content. For example, when drawing on the annotation layer over a map, annotation lines may snap to objects on the map such as roads and landmarks (e.g., as described above with reference to FIGS. 7DDD-7FFF).

In some embodiments, the device repeats the method described above for a second application (e.g., distinct from the first application) using a same annotation layer that was previously used with the first application. More specifically, in some embodiments, the representation is (938) a first representation, the set of one or more additional inputs is a first set of one or more additional inputs, and the annotations are a first set of annotations. After adding the first set of annotations to the annotation layer, the device displays a second user interface of a second application (e.g., a maps application, a photo application, a communications application, a content editing application, etc.) of the plurality of applications (e.g., distinct from the first application). The second user interface includes second application content (e.g., distinct from the first application content). While displaying the second user interface of the second application, the device detects a third input. In some embodiments, the third input includes multiple user inputs to select the annotation layer to which the representation of at least the second portion of the first user interface was previously added (e.g., a same annotation layer that was previously used with the first application). In response to detecting the third input, the device continues to display the second application content and, in addition, displays the annotation layer over at least a first portion of the second user interface. While displaying the annotation layer over at least the first portion of the second user interface, the device detects a fourth input. In response to detecting the fourth input, the device adds a second representation of at least a second portion of the second user interface to the annotation layer. While displaying the second representation in the annotation layer, the device detects a second set of one or more additional inputs, and, in response to detecting the second set of one or more additional inputs, the device adds a second set of annotations to the annotation layer.

In some embodiments, the device repeats the method described above for a second application (e.g., distinct from the first application) using a different annotation layer from the annotation layer previously used with the first application (e.g., a blank canvas). More specifically, in some embodiments, the annotation layer is (940, FIG. 9D) a first annotation layer, the representation is a first representation, the set of one or more additional inputs is a first set of one or more additional inputs, the annotations are a first set of annotations. After adding the first set of annotations to the annotation layer, the device displays a second user interface of a second application of the plurality of applications (e.g., distinct from the first application). The second user interface includes second application content (e.g., distinct from the first application content). While displaying the second user interface of the second application, the device detects a third input. In response to detecting the third input, the device continues to display the second application content and, in addition, displays a second annotation layer distinct from the first annotation layer (e.g., a blank canvas) over at least a first portion of the second user interface. While displaying the second annotation layer over at least the first portion of the second user interface, the device detects a fourth input. In response to detecting the fourth input, the device adds a second representation of at least a second portion of the second user interface to the second annotation layer. While displaying the second representation in the second annotation layer, the device detects a second set of one or more additional inputs, and, in response to detecting the second set of one or more additional inputs, the device adds a second set of annotations to the annotation layer.

In some embodiments, the electronic device further includes (942, FIG. 9E) one or more sensors to detect signals from a stylus associated with the device. In some embodiments, the one or more additional inputs include a first additional input, and the first additional input is input to the electronic device using the stylus.

In some embodiments, the one or more additional inputs include (944) a second additional input, and the second additional input includes input from both the stylus and one or more finger contacts (e.g., user input 794 from stylus 710 and user input 796 from a finger contact, FIG. 7KK). For example, in some embodiments, the device detects a finger input on the annotation layer and, in response, displays a set of drawing controls for controlling a line output by the stylus (e.g., as described above with reference to FIGS. 7II-7MM). In some embodiments, the device detects movement of the stylus (e.g., user input 794, FIG. 7KK) to draw an annotation (e.g., a line) and, in conjunction with drawing the annotation based on movement of the stylus, detects a finger input (e.g., user input 796, FIG. 7KK) on a respective one of the drawing controls, and, in response to detecting the finger input on the respective drawing control, changes the annotation output (e.g., a color, style, opacity, or width of the line) as the stylus continues to move on the touch-sensitive display. For example, as described above with respect to FIGS. 7KK-7LL, the color of annotation 795 is changed in response to both continued drawing input 794 by stylus 710 and to finger contact 796 on color option 776.

In some embodiments, at least one of the annotations is (946) a handwritten annotation that is input using the stylus (e.g., handwritten annotation 795, FIG. 7JJ-7MM).

In some embodiments, the device processes (948) the handwritten annotation to generate searchable text associated with the handwritten annotation (e.g., as described above with reference to FIG. 7NN).

In some embodiments, the one or more additional inputs include a third additional input, and, in accordance with a determination that the third additional input is provided using a finger, the device displays (950) a set of annotation controls for the annotation layer (e.g., as described above with reference to FIGS. 7I-7J). In some embodiments, in accordance with a determination that the third additional input is provided using a stylus, the annotation controls are not displayed (e.g., as described above with reference to FIGS. 7U and 7FF).

In some embodiments, the device detects (952) a sixth input, and, in response to the sixth input, sends or communicates an object that includes at least the annotation layer (e.g., as described above with reference to FIGS. 7OO and 7HHH). For example, in some embodiments, the object is a file, such as a note, image file or other document. In some embodiments, the object includes the displayed application content. In some embodiments, the object includes metadata for the displayed application content underlying the annotation layer. In some embodiments, each performance of the methods described herein includes storing the object in memory, or sending or communicating the object to another electronic device. In some embodiments, sending or communicating the object to another electronic device includes sharing the annotation layer with a second user of a second electronic device (e.g., a second user using Device B, FIG. 7OO or 7HHH). In some embodiments, the first device conveys to the second device, for presentation to the second user, annotations added to the annotation layer in response to inputs from the first user at the first device while the annotation layer is being shared. In some embodiments, the annotation layer is configured to accept inputs and/or annotations from both the first user and the second user. In some embodiments, the device displays, at the first device, annotations added to the annotation layer in response to inputs from the second user at the second device while the annotation is being shared (e.g., as a live sharing or virtual whiteboard session, described above with reference to FIGS. 7OO-7RR).

In some embodiments, the device stores (954) an object that includes at least the annotation layer; after storing the object that includes at least the annotation layer, detects a subsequent input; and, in response to detecting the subsequent input, displays at least the annotation layer (e.g., the subsequent input initiates recalling the annotation layer from the stored object, optionally by activating saved annotations icon 7106 shown in FIG. 7VV, and displaying the recalled annotation layer).

In some embodiments, the object that includes at least the annotation layer further includes (956) a sequence of annotations made to produce the annotation layer, and displaying at least the annotation layer in response to detecting the subsequent input (e.g., user input 799, FIG. 7JJJ) includes: playing back the sequence of annotations made to produce the annotation layer (e.g., as described above with reference to FIGS. 7KKK-7RRR), and, after playing back the sequence of annotations, displaying the annotation layer (e.g., as described above with reference to FIG. 7RRR). In some embodiments, after playing back the sequence of annotations, all of the annotations made to produce the annotation layer are concurrently displayed.

It should be understood that the particular order in which the operations in FIGS. 9A-9E have been described is merely an example and is not intended to indicate that the described order is the only order in which the operations could be performed. One of ordinary skill in the art would recognize various ways to reorder the operations described herein.

Figure 10:
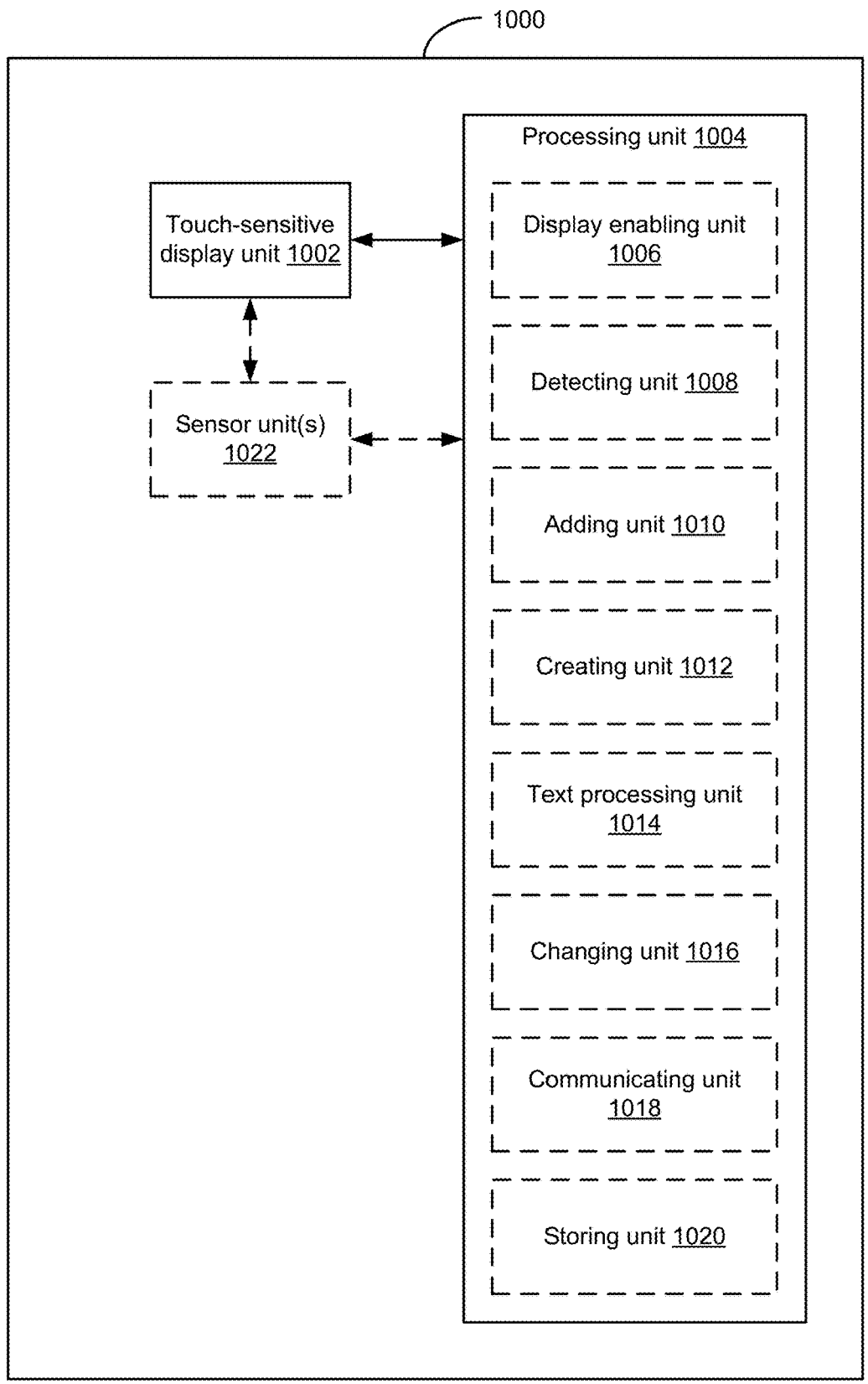
FIG. 10 is a functional block diagram of an electronic device in accordance with some embodiments.

In accordance with some embodiments, FIG. 10 shows a functional block diagram of electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, electronic device 1000 includes touch-sensitive display unit 1002 configured to display a first user interface of a first application and receive user inputs, and processing unit 1004 coupled with touch-sensitive display unit 1002. In some embodiments, processing unit 1004 includes display enabling unit 1006, detecting unit 1008, adding unit 1010, creating unit 1012, text processing unit 1014, changing unit 1016, communicating unit 1018, and storing unit 1020.

Processing unit 1004 is configured to: enable display of the first user interface of the first application (e.g., with display enabling unit 1006), wherein the first application is a respective application of a plurality of applications, and wherein the first user interface includes first application content; while the first user interface of the first application is displayed, detect a first input (e.g., with detecting unit 1008); in response to detecting the first input, enable continued display of the first application content and, in addition, enable display of an annotation layer over at least a first portion of the first user interface (e.g., with display enabling unit 1006), wherein the annotation layer is associated with a user application distinct from the plurality of applications; while the annotation layer is displayed over at least the first portion of the first user interface, detect a second input (e.g., with detecting unit 1008); in response to detecting the second input, add a representation of at least a second portion of the first user interface to the annotation layer (e.g., with adding unit 1010); while the representation is displayed in the annotation layer, detect a set of one or more additional inputs (e.g., with detecting unit 1008); and in response to detecting the set of one or more additional inputs, add annotations to the annotation layer (e.g., with adding unit 1010).

In some embodiments, processing unit 1004 is configured to, in response to detecting the second input, create the representation of at least the second portion of the user interface that is added to the annotation layer (e.g., with creating unit 1012).

In some embodiments, the representation is added to the annotation layer under control of the user application distinct from the plurality of applications, and the annotations are added to the annotation layer under control of the user application distinct from the plurality of applications.

In some embodiments, the second input is a gesture having a path, and a boundary of the second portion of the user interface to be represented in the annotation layer is determined based on the path of the second input gesture.

In some embodiments, the representation is a first representation, the set of one or more additional inputs is a first set of one or more additional inputs, the annotations are a first set of annotations, and processing unit 1004 is configured to, after adding the first set of annotations to the annotation layer: enable display of a second user interface of a second application of the plurality of applications (e.g., with display enabling unit 1006), wherein the second user interface includes second application content; while the second user interface of the second application is displayed, detect a third input (e.g., with detecting unit 1008); in response to detecting the third input, enable continued display of the second application content and, in addition, enable display of the annotation layer over at least a first portion of the second user interface (e.g., with display enabling unit 1006); while the annotation layer is displayed over at least the first portion of the second user interface, detect a fourth input (e.g., with detecting unit 1008); in response to detecting the fourth input, add a second representation of at least a second portion of the second user interface to the annotation layer (e.g., with adding unit 1010); while the second representation is displayed in the annotation layer, detect a second set of one or more additional inputs (e.g., with detecting unit 1008); and in response to detecting the second set of one or more additional inputs, add a second set of annotations to the annotation layer (e.g., with adding unit 1010).

In some embodiments, the annotation layer is a first annotation layer, the representation is a first representation, the set of one or more additional inputs is a first set of one or more additional inputs, the annotations are a first set of annotations, and processing unit 1004 is configured to, after adding the first set of annotations to the annotation layer: enable display of a second user interface of a second application of the plurality of applications (e.g., with display enabling unit 1006), wherein the second user interface includes second application content; while the second user interface of the second application is displayed, detect a third input (e.g., with detecting unit 1008); in response to detecting the third input, enable continued display of the second application content and, in addition, enable display of a second annotation layer distinct from the first annotation layer over at least a first portion of the second user interface (e.g., with display enabling unit 1006); while the second annotation layer is displayed over at least the first portion of the second user interface, detect a fourth input (e.g., with detecting unit 1008); in response to detecting the fourth input, add a second representation of at least a second portion of the second user interface to the second annotation layer (e.g., with adding unit 1010); while the second representation is displayed in the second annotation layer, detect a second set of one or more additional inputs (e.g., with detecting unit 1008); and in response to detecting the second set of one or more additional inputs, add a second set of annotations to the annotation layer (e.g., with adding unit 1010).

In some embodiments, electronic device 1000 further includes one or more sensor units (e.g., sensor unit(s) 1022) configured to detect signals from a stylus associated with the device, wherein the first input is a first gesture performed using a stylus and selected from the set consisting of: an edge gesture, which moves from an edge of touch-sensitive display unit 1002 to an interior position of touch-sensitive display unit 1002, a pen flick gesture that includes a flick motion toward touch-sensitive display unit 1002, and a gesture on a predefined affordance displayed on touch-sensitive display unit 1002.

In some embodiments, detecting the first input includes determining that the first gesture is performed using the stylus.

In some embodiments, electronic device 1000 further includes one or more sensor units (e.g., sensor unit(s) 1022) configured to detect signals from a stylus associated with the device; the one or more additional inputs includes a first additional input; and the first additional input is input to the electronic device using the stylus.

In some embodiments, the one or more additional inputs include a second additional input; and the second additional input includes input from both the stylus and one or more finger contacts.

In some embodiments, at least one of the annotations is a handwritten annotation that is input using the stylus.

In some embodiments, processing unit 1004 is configured to process the handwritten annotation to generate searchable text associated with the handwritten annotation (e.g., with text processing unit 1014).

In some embodiments, the one or more additional inputs includes a third additional input, and processing unit 1004 is configured to, in accordance with a determination that the third additional input is performed using a finger, enable display of a set of annotation controls for the annotation layer (e.g., with display enabling unit 1006).

In some embodiments, the first input is detected independently of the plurality of applications.

In some embodiments, the plurality of applications includes at least two applications selected from the set consisting of: a browser application, a photo application, a communications application, and a content editing application.

In some embodiments, the annotation layer has an adjustable opacity, and processing unit 1004 is configured to change the opacity of the annotation layer in response to a fifth input (e.g., with changing unit 1016), wherein increasing the opacity of the annotation layer decreases the visibility of application content that is displayed underneath the annotation layer.

In some embodiments, the annotation layer has an adjustable texture, and the adjustable texture is solid, ruled, grid, dotted, or semitransparent.

In some embodiments, processing unit 1004 is configured to: detect a sixth input (e.g., with detecting unit 1008); and in response to the sixth input, send or communicate an object that includes at least the annotation layer (e.g., with communicating unit 1018).

In some embodiments, processing unit 1004 is configured to: store an object that includes at least the annotation layer (e.g., with storing unit 1020); after storing the object that includes at least the annotation layer, detect a subsequent input (e.g., with detecting unit 1008); and in response to detecting the subsequent input, enable display of at least the annotation layer (e.g., with display enabling unit 1006).

In some embodiments, the object that includes at least the annotation layer further includes a sequence of annotations made to produce the annotation layer; and displaying at least the annotation layer in response to detecting the subsequent input includes: playing back the sequence of annotations made to produce the annotation layer; and after playing back the sequence of annotations, displaying the annotation layer.

In some embodiments, adding annotations to the annotation layer is responsive to both the set of one or more additional inputs and application content that is displayed underneath the annotation layer.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9E are, optionally, implemented by components depicted in FIGS. 1A-1B or FIG. 10. For example, display operation 902, detection operation 906, and response operation 916 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186, and determines whether a first contact (or near contact) at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at an electronic device in communication with a display device:
        displaying, via the display device, a user interface that includes application content generated by the electronic device;
        while displaying the user interface that includes the application content generated by the electronic device, detecting a first input that moves over a portion of the application content;
        in response to detecting the first input, displaying an annotation user interface concurrently with a representation of the application content over which the first input moved; and
        while displaying the annotation user interface:
            displaying a set of markup tools, including a plurality of tools for adding marks to the application content over which the first input moved, wherein the set of markup tools is displayed concurrently with the representation of the application content over which the first input moved;
            detecting a second input selecting a first markup tool of the set of markup tools;
            while the first markup tool is selected, adding one or more marks on an annotation layer overlaying the application content over which the first input moved, wherein the one or more marks are generated by the electronic device in accordance with one or more additional inputs using the selected first markup tool; and
            changing opacity of the annotation layer, wherein increasing opacity of the annotation layer decreases visibility of application content over which the first input moved relative to the one or more marks on the annotation layer.

2. The method of claim 1, wherein the annotation layer includes an adjustable texture and the method includes, while displaying the annotation layer, changing the texture of the annotation layer in accordance with selection of a respective tool in the set of markup tools.

3. The method of claim 1, further comprising:
    while displaying the annotation layer, detecting a sixth input selecting a portion of the application content; and
    in response to detecting the sixth input, adding a representation of the selected portion of the application content to the annotation layer.

4. The method of claim 1, further comprising:
    displaying, in the user interface, a first affordance for capturing a snapshot of the at least a portion of the application content that is visible through the annotation layer;
    detecting a fourth input selecting the first affordance; and
    in response to detecting the fourth input selecting the first affordance, capturing a snapshot of the at least a portion of the application content that is visible through the annotation layer.

5. The method of claim 1, further comprising, saving the annotation layer, including the one or more marks, and metadata for the at least a portion of the application content that is visible through the annotation layer.

6. The method of claim 1, further comprising:
    displaying, in the user interface, a second affordance for sharing a view of the annotation layer and a portion of the application content that is visible through the annotation layer;
    detecting a fifth input selecting the second affordance; and
    in response to detecting the fifth input, sharing a view of the annotation layer and the portion of the application content that is visible through the annotation layer.

7. The method of claim 1, further comprising:
    detecting the one or more additional inputs, the one or more additional inputs comprising one or more gestures, and
    in response to detecting the one or more additional inputs, adding the one or more marks on the annotation layer based at least in part on metadata of the at least a portion of the application content that is visible through the annotation layer and in accordance with the one or more gestures.

8. The method of claim 1, further comprising, based on a structure of the at least a portion of the application content that is visible through the annotation layer:
    determining a boundary of a content region in the application content; and
    selecting the content region, wherein the selected content region is added to the annotation layer in accordance with the one or more additional inputs.

9. The method of claim 1, wherein:
    the at least a portion of the application content includes one or more objects within the application content; and
    the method further includes:
        detecting the one or more additional inputs; and
        in response to detecting the one or more additional inputs, adding a line to the annotation layer, wherein the line added to the annotation layer is snapped to an object of the one or more objects within the application content.

10. A non-transitory computer readable storage medium storing one or more programs, the one or more programs comprising instructions, which, when executed by an electronic device with a display device, cause the electronic device to:
- display, via the display device, a user interface that includes application content generated by the electronic device;
- while displaying the user interface that includes the application content generated by the electronic device, detect a first input that moves over a portion of the application content; and
- in response to detecting the first input, display an annotation user interface concurrently with a representation of the application content over which the first input moved;
- while displaying the annotation user interface:
  - displaying a set of markup tools, including a plurality of tools for adding marks to the application content over which the first input moved, wherein the set of markup tools is displayed concurrently with the representation of the application content over which the first input moved;
  - detecting a second input selecting a first markup tool of the set of markup tools;
  - while the first markup tool is selected, adding one or more marks on an annotation layer overlaying the application content over which the first input moved, wherein the one or more marks are generated by the electronic device in accordance with one or more additional inputs using the selected first markup tool; and
  - changing opacity of the annotation layer, wherein increasing opacity of the annotation layer decreases visibility of application content over which the first input moved relative to the one or more marks on the annotation layer.

11. An electronic device, comprising:
a display device;
one or more processors;
memory; and
one or more programs, wherein the one or more programs are stored in the memory and configured to be executed by the one or more processors, the one or more programs including instructions for:
- displaying, via the display device, a user interface that includes application content generated by the electronic device;
- while displaying the user interface that includes the application content generated by the electronic device, detecting a first input that moves over a portion of the application content;
- in response to detecting the first input, displaying an annotation user interface concurrently with a representation of the application content over which the first input moved; and
- while displaying the annotation user interface:
  - displaying a set of markup tools, including a plurality of tools for adding marks to the application content over which the first input moved, wherein the set of markup tools is displayed concurrently with the representation of the application content over which the first input moved;
  - detecting a second input selecting a first markup tool of the set of markup tools;
  - while the first markup tool is selected, adding one or more marks on an annotation layer overlaying the application content over which the first input moved, wherein the one or more marks are generated by the electronic device in accordance with one or more additional inputs using the selected first markup tool; and
  - changing opacity of the annotation layer, wherein increasing opacity of the annotation layer decreases visibility of application content over which the first input moved relative to the one or more marks on the annotation layer.

12. The electronic device of claim 11, wherein the annotation layer includes an adjustable texture and the one or more programs include instructions for, while displaying the annotation layer, changing the texture of the annotation layer in accordance with selection of a respective tool in the set of markup tools.

13. The electronic device of claim 11, wherein the one or more programs include instructions for:
- while displaying the annotation layer, detecting a sixth input selecting a portion of the application content; and
- in response to detecting the sixth input, adding a representation of the selected portion of the application content to the annotation layer.

14. The electronic device of claim 11, wherein the one or more programs include instructions for:
- displaying, in the user interface, a first affordance for capturing a snapshot of the at least a portion of the application content that is visible through the annotation layer;
- detecting a fourth input selecting the first affordance; and
- in response to detecting the fourth input selecting the first affordance, capturing a snapshot of the at least a portion of the application content that is visible through the annotation layer.

15. The electronic device of claim 11, wherein the one or more programs include instructions for saving the annotation layer, including the one or more marks, and metadata for the at least a portion of the application content that is visible through the annotation layer.

16. The electronic device of claim 11, wherein the one or more programs include instructions for:
- displaying, in the user interface, a second affordance for sharing a view of the annotation layer and a portion of the application content that is visible through the annotation layer;
- detecting a fifth input selecting the second affordance; and
- in response to detecting the fifth input, sharing a view of the annotation layer and the portion of the application content that is visible through the annotation layer.

17. The electronic device of claim 11, wherein the one or more programs include instructions for:
- detecting the one or more additional inputs, the one or more additional inputs comprising one or more gestures, and
- in response to detecting the one or more additional inputs, adding the one or more marks on the annotation layer based at least in part on metadata of the at least a portion of the application content that is visible through the annotation layer and in accordance with the one or more gestures.

18. The electronic device of claim 11, wherein the one or more programs include instructions for, based on a structure of the at least a portion of the application content that is visible through the annotation layer:
- determining a boundary of a content region in the application content; and
- selecting the content region, wherein the selected content region is added to the annotation layer in accordance with the one or more additional inputs.

19. The electronic device of claim 11, wherein:

the at least a portion of the application content includes one or more objects within the application content; and the one or more programs include instructions for:
  detecting the one or more additional inputs; and
  in response to detecting the one or more additional inputs, adding a line to the annotation layer, wherein the line added to the annotation layer is snapped to an object of the one or more objects within the application content.

20. The non-transitory computer readable storage medium of claim 10, wherein the annotation layer includes an adjustable texture and the one or more programs include instructions for, while displaying the annotation layer, changing the texture of the annotation layer in accordance with selection of a respective tool in the set of markup tools.

21. The method of claim 1, wherein;

the display device includes a touch-screen display;

the user interface that includes application content generated by the electronic device is displayed on the touch-screen display;

the first input is detected on the touch-screen display;

the annotation user interface is displayed on the touch-screen display in response to detecting the first input;

the second input that selects the first markup tool is detected on the touch-screen display; and changing opacity of the annotation layer, which is displayed on the touch-screen display and overlays the application content generated by the electronic device, includes varying visibility of the application content generated by the electronic device, which is displayed on the touch-screen display underneath the annotation layer, relative to the one or more marks on the annotation layer.

22. The method of claim 1, including:

while displaying the user interface that includes the application content generated by the electronic device, detecting a third input;

in response to detecting the third input:
  in accordance with a determination that the third input begins at an upper edge of the display device and moves to an interior position of the display device, displaying a notifications user interface; and
  in accordance with a determination that the third input begins at a lower edge of the display device and moves to an interior position of the display device, displaying the annotation user interface concurrently with the representation of the application content generated by the electronic device; and while displaying the annotation user interface in response to the third input:
  displaying, in the annotation user interface, a set of markup tools, including a plurality of tools for adding marks to the annotation layer.

23. The electronic device of claim 11, wherein:

the display device includes a touch-screen display;

the user interface that includes application content generated by the electronic device is displayed on the touch-screen display;

the first input is detected on the touch-screen display;

the annotation user interface is displayed on the touch-screen display in response to detecting the first input;

the second input that selects the first markup tool is detected on the touch-screen display; and changing opacity of the annotation layer, which is displayed on the touch-screen display and overlays the application content generated by the electronic device includes varying visibility of the application content generated by the electronic device, which is displayed on the touch-screen display underneath the annotation layer, relative to the one or more marks on the annotation layer.

24. The electronic device of claim 11, wherein the one or more programs include instructions for, while displaying the user interface that includes the application content generated by the electronic device, detecting a third input;

in response to detecting the third input:
  in accordance with a determination that the third input begins at an upper edge of the display device and moves to an interior position of the display device, displaying a notifications user interface; and
  in accordance with a determination that the third input begins at a lower edge of the display device and moves to an interior position of the display device, displaying the annotation user interface concurrently with the representation of the application content generated by the electronic device; and while displaying the annotation user interface in response to the third input:
  displaying, in the annotation user interface, a set of markup tools, including a plurality of tools for adding marks to the annotation layer.

25. The non-transitory computer readable storage medium of claim 10, wherein the instructions, when executed, cause the electronic device to:

while displaying the annotation layer, detect a sixth input selecting a portion of the application content; and in response to detecting the sixth input, add a representation of the selected portion of the application content to the annotation layer.

26. The non-transitory computer readable storage medium of claim 10, wherein the one or more programs include instructions that when executed by the electronic device cause the electronic device to:

display, in the user interface, a first affordance for capturing a snapshot of the at least a portion of the application content that is visible through the annotation layer;

detect a fourth input selecting the first affordance; and in response to detecting the fourth input selecting the first affordance, capture a snapshot of the at least a portion of the application content that is visible through the annotation layer.

27. The non-transitory computer readable storage medium of claim 10, wherein the one or more programs include instructions that when executed by the electronic device cause the electronic device to save the annotation layer, including the one or more marks, and metadata for the at least a portion of the application content that is visible through the annotation layer.

28. The non-transitory computer readable storage medium of claim 10, wherein the one or more programs include instructions that when executed by the electronic device cause the electronic device to:

display, in the user interface, a second affordance for sharing a view of the annotation layer and a portion of the application content that is visible through the annotation layer;

detect a fifth input selecting the second affordance; and
in response to detecting the fifth input, share a view of the annotation layer and the portion of the application content that is visible through the annotation layer.

29. The non-transitory computer readable storage medium of claim 10, wherein the one or more programs include instructions that when executed by the electronic device cause the electronic device to:
detect the one or more additional inputs, the one or more additional inputs comprising one or more gestures, and
in response to detecting the one or more additional inputs, add the one or more marks on the annotation layer based at least in part on metadata of the at least a portion of the application content that is visible through the annotation layer and in accordance with the one or more gestures.

30. The non-transitory computer readable storage medium of claim 10, wherein the one or more programs include instructions that when executed by the electronic device cause the electronic device to:
based on a structure of the at least a portion of the application content that is visible through the annotation layer:
determine a boundary of a content region in the application content; and
select the content region, wherein the selected content region is added to the annotation layer in accordance with the one or more additional inputs.

31. The non-transitory computer readable storage medium of claim 10, wherein the at least a portion of the application content includes one or more objects within the application content, and the one or more programs include instructions that when executed by the electronic device cause the electronic device to:
detect the one or more additional inputs; and
in response to detecting the one or more additional inputs, add a line to the annotation layer, wherein the line added to the annotation layer is snapped to an object of the one or more objects within the application content.

32. The non-transitory computer readable storage medium of claim 10, wherein:
the display device includes a touch-screen display;
the user interface that includes application content generated by the electronic device is displayed on the touch-screen display;
the first input is detected on the touch-screen display;
the annotation user interface is displayed on the touch-screen display in response to detecting the first input;
the second input that selects the first markup tool is detected on the touch-screen display; and
changing opacity of the annotation layer, which is displayed on the touch-screen display and overlays the application content generated by the electronic device includes varying visibility of the application content generated by the electronic device, which is displayed on the touch-screen display underneath the annotation layer, relative to the one or more marks on the annotation layer.

33. The non-transitory computer readable storage medium of claim 10, wherein the one or more programs include instructions that when executed by the electronic device cause the electronic device to:
while displaying the user interface that includes the application content generated by the electronic device, detect a third input;
in response to detecting the third input:
in accordance with a determination that the third input begins at an upper edge of the display device and moves to an interior position of the display device, display a notifications user interface; and
in accordance with a determination that the third input begins at a lower edge of the display device and moves to an interior position of the display device, display the annotation user interface concurrently with the representation of the application content generated by the electronic device; and
while displaying the annotation user interface in response to the third input:
display, in the annotation user interface, a set of markup tools, including a plurality of tools for adding marks to the annotation layer.

* * * * *